(12) United States Patent
Tsukuba

(10) Patent No.: US 12,549,752 B2
(45) Date of Patent: Feb. 10, 2026

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 122 days.

(21) Appl. No.: 18/561,298

(22) PCT Filed: Jun. 1, 2022

(86) PCT No.: PCT/JP2022/022248
§ 371 (c)(1),
(2) Date: Nov. 16, 2023

(87) PCT Pub. No.: WO2022/255395
PCT Pub. Date: Dec. 8, 2022

(65) Prior Publication Data
US 2025/0071307 A1    Feb. 27, 2025

Related U.S. Application Data

(60) Provisional application No. 63/196,283, filed on Jun. 3, 2021.

(51) Int. Cl.
*H04N 19/46* (2014.01)
*H04N 19/60* (2014.01)
(Continued)

(52) U.S. Cl.
CPC ............ *H04N 19/46* (2014.11); *H04N 19/60* (2014.11); *H04N 19/70* (2014.11); *H04N 19/91* (2014.11)

(58) Field of Classification Search
None
See application file for complete search history.

(56) References Cited

U.S. PATENT DOCUMENTS

2021/0021841 A1 * 1/2021 Xu .................. H04N 19/157

FOREIGN PATENT DOCUMENTS

WO    WO2022070470 A1 * 4/2022

OTHER PUBLICATIONS

International Search Report and Written Opinion mailed on Aug. 23, 2022, received for PCT Application PCT/JP2022/022248, filed on Jun. 1, 2022, 8 pages including English Translation.
(Continued)

*Primary Examiner* — Christopher Braniff
(74) *Attorney, Agent, or Firm* — XSENSUS LLP

(57) ABSTRACT

The present disclosure relates to an image processing device and method that enable the use of an encoding tool for bit-depth extension while maintaining compatibility with a specification that does not extend a bit depth of an image. An operation-range extension flag is encoded in accordance with a bit depth of an image, and operation-range extension tool control information is encoded in accordance with the operation-range extension flag. Alternatively, the operation-range extension flag is encoded, and the operation-range extension tool control information is encoded in accordance with a bit depth of an image. The present disclosure can be applied to, for example, an image processing device, an image encoding device, an image decoding device, a transmission device, a reception device, a transmission/reception device, an information processing device, an imaging device, a reproduction device, an electronic device, an image processing method, an information processing method, and the like.

17 Claims, 29 Drawing Sheets

(51) Int. Cl.
*H04N 19/70* (2014.01)
*H04N 19/91* (2014.01)

(56) References Cited

OTHER PUBLICATIONS

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v2, Oct. 7-16, 2020, pp. 1-511.
Rusanovskyy et al., "CE-related: On history-enhanced method of Rice parameter derivation for regular residual coding (RRC) at high bit depths", Joint Video Experts Team (JVET) of ITU-T SG 16 WP 3 and ISO/IEC JTC 1/SC 29, JVET-V0106, Apr. 20-28, 2021, pp. 1-9.
Bossen et al., "VVC operation range extensions (Draft 3)", Joint Video Experts Team (JVET) of ITU-T SG 16 WP 3 and ISO/IEC JTC 1/SC 29, JVET-V2005-v1, Apr. 20-28, 2021, pp. 1-19.
Jhu et al., "CE-2.1: Slice based Rice parameter selection for transform skip residual coding", Joint Video Experts Team (JVET) of ITU-T SG 16 WP 3 and ISO/IEC JTC 1/SC 29, JVET-V0054-r1, Apr. 20-28, 2021, pp. 1-6.
Chen et al., "Algorithm description for Versatile Video Coding and Test Model 11 (VTM 11)", Joint Video Experts Team (JVET) of ITU-T SG 16 WP 3 and ISO/IEC JTC 1/SC 29, JVET-T2002-v1, Oct. 7-16, 2020, pp. 1-102.
Zhou et al., "CE-3.1 and CE-3.2: Transform coefficients range extension for high bit-depth coding", Joint Video Experts Team (JVET) of ITU-T SG 16 WP 3 and ISO/IEC JTC 1/SC 29, JVET-V0047, Apr. 20-28, 2021, pp. 1-9.
"Advanced video coding for generic audiovisual services", ITU-T H.264, Apr. 2017, pp. 1-787.
"High efficiency video coding", ITU-T H.265, Feb. 2018, pp. 1-671.
"Text of ISO/IEC 23090-3:2021 CDAM 1 Operation range extensions", 134. MPEG Meeting; Apr. 26, 2021-Apr. 30, 2021; Online; (Motion Picture Expert Group or ISO/IEC JTC1 /SC29/WG11), No. n20233 May 14, 2021(May 14, 2021), XP030294535.
Flynn David et al: "Overview of the Range Extensions for the HEVC Standard: Tools, Profiles, and Performance", IEEE Transactions on Circuits and Systems for Video Technology, IEEE, USA, vol. 26, No. 1, Jan. 1, 2016 (Jan. 1, 2016), pp. 4-19, XP011592176, ISSN: 1051-8215, DOI: 10.1109/TCSVT.2015.2478707.

* cited by examiner

FIG. 1

| | |
|---|---|
| if( sps_extension_flag ) { | |
| sps_range_extension_flag | u(1) |
| sps_extension_7bits | u(7) |
| if(sps_range_extension_flag) | |
| sps_range_extension() | |
| } | |
| if(sps_extension_7bits) | |
| while(more_rbsp_data()) | |
| sps_extension_data_flag | u(1) |
| rbsp_trailing_bits() | |

FIG. 2 sps_extension_flag equal to 0 specifies that no sps_extension_data_flag syntax elements are present in the SPS RBSP syntax structure. sps_extension_flag equal to 1 specifies that sps_extension_data_flag syntax elements might be present in the SPS RBSP syntax structure. sps_extension_flag shall be equal to 0 in bitstreams conforming to this version of this Specification. However, some use of sps_extension_flag equal to 1 could be specified in some future version of this Specification, and decoders conforming to this version of this Specification shall allow the value of sps_extension_flag equal to 1 to appear in the syntax.

sps_extension_data_flag could have any value. Its presence and value do not affect the decoding process specified in this version of this Specification. Decoders conforming to this version of this Specification shall ignore all sps_extension_data_flag syntax elements.

*with the following:* sps_extension_flag equal to 1 specifies that the syntax elements sps_range_extension_flag and sps_extension_7bits are present in the SPS RBSP syntax structure. sps_extension_flag equal to 0 specifies that these syntax elements are not present.

sps_range_extension_flag equal to 1 specifies that the sps_range_extension( ) syntax structure is present in the SPS RBSP syntax structure. sps_range_extension_flag equal to 0 specifies that this syntax structure is not present. When not present, the value of sps_range_extension_flag is inferred to be equal to 0.

sps_extension_7bits equal to 0 specifies that no sps_extension_data_flag syntax elements are present in the SPS RBSP syntax structure. When present, sps_extension_7bits shall be equal to 0 in bitstreams conforming to this version of this Specification. Values of sps_extension_7bits not equal to 0 are reserved for future use by ITU-T | ISO/IEC. Decoders shall allow the value of sps_extension_7bits not equal to 0 to appear in the syntax. When not present, the value of sps_extension_7bits is inferred to be equal to 0.

sps_extension_data_flag may have any value. Its presence and value do not affect the decoding process specified in this version of this Specification. Decoders conforming to this version of this Specification shall ignore all sps_extension_data_flag syntax elements.

FIG. 3

| | Descriptor |
|---|---|
| sps_range_extension( ) { | |
| extended_precision_processing_flag | u(1) |
| sps_ts_residual_coding_rice_present_in_sh_flag | u(1) |
| sps_rrc_rice_extension_flag | u(1) |
| sps_persistent_rice_adaptation_enabled_flag | u(1) |
| } | | extended_precision_processing_flag equal to 1 specifies that an extended dynamic range may be used for transform coefficients and transform processing. extended_precision_processing_flag equal to 0 specifies that the extended dynamic range is not used. When not present, the value of extended_precision_processing_flag is inferred to be equal to 0.

The variable ExtendedPrecisionFlag is derived as follows:
- If extended_precision_processing_flag is equal to 1 and BitDepth is greater than 10, ExtendedPrecisionFlag is set equal to 1.
- Otherwise (extended_precision_processing_flag is equal to 0 or BitDepth is less than or equal to 10), ExtendedPrecisionFlag is set equal to 0.

The variable Log2TransformRange is derived as follows:

$$\text{Log2TransformRange} = \text{ExtendedPrecisionFlag ? Max}(15, \text{Min}(20, \text{BitDepth} + 6)) : 15 \quad (X)$$

sps_ts_residual_coding_rice_present_in_sh_flag equal to 1 specifies that sh_ts_residual_coding_rice_idx_minus1 may be present in slice_header() syntax structures referring to the SPS. sps_ts_residual_coding_rice_present_in_sh_flag equa 1 to 0 specifies that sh_ts_residual_coding_rice_idx_minus1 is not present in slice_header() syntax structures referring to the SPS. When not present, the value of sps_ts_residual_coding_rice_present_in_sh_flag is inferred to be equal to 0.

sps_rrc_rice_extension_flag equal to 1 specifies that an extension of Rice parameter derivation for the binarization of abs_remaining[ ] and dec_abs_level[ ] is enabled. sps_rrc_rice_extension_flag equal to 0 specifies that the extension of Rice parameter derivation for the binarization of abs_remaining[ ] and dec_abs_level[ ] is disabled. When not present, the value of sps_rrc_rice_extension_flag is inferred to be equal to 0.

sps_persistent_rice_adaptation_enabled_flag equal to 1 specifies that Rice parameter derivation for the binarization of abs_remainder [ ] and dec_abs_level [ ] is initialized at the start of each TU using statistics accumulated from previous TUs . sps_persistent_rice_adaptation_enabled_flag equal to 0 specifies that no previous TU state is used in Rice parameter derivation. When not present, the value of sps_persistent_rice_adaptation_enabled_flag is inferred to be equal to 0.

| | CONTROL INFORMATION REGARDING OPERATION-RANGE EXTENSION ON BASIS OF BIT DEPTH |
|---|---|
| 1 | CONTROL VALUE OF OPERATION-RANGE EXTENSION FLAG ON BASIS OF BIT DEPTH |
| 1-1 | CHECK FOR CONSTRAINT VIOLATION DURING DECODING |
| 2 | CONTROL VALUE OF OPERATION-RANGE EXTENSION TOOL CONTROL INFORMATION ON BASIS OF BIT DEPTH |
| 2-1 | CHECK FOR CONSTRAINT VIOLATION DURING DECODING |
| 3 | CONTROL TRANSMISSION OF OPERATION-RANGE EXTENSION TOOL CONTROL INFORMATION ON BASIS OF BIT DEPTH |

FIG. 6 sps_extension_flag equal to 1 specifies that the syntax elements sps_range_extension_flag and sps_extension_7bits are present in the SPS RBSP syntax structure. sps_extension_flag equal to 0 specifies that these syntax elements are not present.

sps_range_extension_flag equal to 1 specifies that the sps_range_extension( ) syntax structure is present in the SPS RBSP syntax structure. sps_range_extension_flag equal to 0 specifies that this syntax structure is not present. When not present, the value of sps_range_extension_flag is inferred to be equal to 0.

It is a requirement of bitstream conformance that the value of sps_range_extension_flag shall be equal to 0 when BitDepth is less than or equal to 10. ⟵ 11 sps_extension_7bits equal to 0 specifies that no sps_extension_data_flag syntax elements are present in the SPS RBSP syntax structure. When present, sps_extension_7bits shall be equal to 0 in bitstreams conforming to this version of this Specification. Values of sps_extension_7bits not equal to 0 are reserved for future use by ITU-T | ISO/IEC. Decoders shall allow the value of sps_extension_7bits not equal to 0 to appear in the syntax. When not present, the value of sps_extension_7bits is inferred to be equal to 0.

sps_extension_data_flag may have any value. Its presence and value do not affect the decoding process specified in this version of this Specification. Decoders conforming to this version of this Specification shall ignore all sps_extension_data_flag syntax elements.

FIG. 7 extended_precision_processing_flag equal to 1 specifies that an extended dynamic range may be used for transform coefficients and transform processing. extended_precision_processing_flag equal to 0 specifies that the extended dynamic range is not used. When not present, the value of extended_precision_processing_flag is inferred to be equal to 0.

The variable ExtendedPrecisionFlag is set equal to extended_precision_processing_flag. ⎯ 12

The variable Log2TransformRange is derived as follows:

Log2TransformRange = ExtendedPrecisionFlag ? Max( 15, Min( 20, BitDepth + 6 ) ) : 15    (X)

sps_ts_residual_coding_rice_present_in_sh_flag equal to 1 specifies that sh_ts_residual_coding_rice_idx_minus1 may be present in slice_header( ) syntax structures referring to the SPS. sps_ts_residual_coding_rice_present_in_sh_flag equal to 0 specifies that sh_ts_residual_coding_rice_idx_minus1 is not present in slice_header( ) syntax structures referring to the SPS. When not present, the value of sps_ts_residual_coding_rice_present_in_sh_flag is inferred to be equal to 0.

sps_rrc_rice_extension_flag equal to 1 specifies that an extension of Rice parameter derivation for the binarization of abs_remaining[ ] and dec_abs_level[ ] is enabled. sps_rrc_rice_extension_flag equal to 0 specifies that the extension of Rice parameter derivation for the binarization of abs_remaining[ ] and dec_abs_level[ ] is disabled. When not present, the value of sps_rrc_rice_extension_flag is inferred to be equal to 0.

sps_persistent_rice_adaptation_enabled_flag equal to 1 specifies that Rice parameter derivation for the binarization of abs_remainder[ ] and dec_abs_level[ ] is initialized at the start of each TU using statistics accumulated from previous TUs. sps_persistent_rice_adaptation_enabled_flag equal to 0 specifies that no previous TU state is used in Rice parameter derivation. When not present, the value of sps_persistent_rice_adaptation_enabled_flag is inferred to be equal to 0.

FIG. 14 extended_precision_processing_flag equal to 1 specifies that an extended dynamic range may be used for transform coefficients and transform processing. extended_precision_processing_flag equal to 0 specifies that the extended dynamic range is not used. When not present, the value of extended_precision_processing_flag is inferred to be equal to 0.

It is a requirement of bitstream conformance that the value of extended_precision_processing_flag shall be equal to 0 when BitDepth is less than or equal to 10. ⎯ 251

The variable ExtendedPrecisionFlag is set equal to extended_precision_processing_flag. ⎯ 252

The variable Log2TransformRange is derived as follows:
Log2TransformRange = ExtendedPrecisionFlag ? Max( 15, Min( 20, BitDepth + 6 ) ) : 15    (X)

sps_ts_residual_coding_rice_present_in_sh_flag equal to 1 specifies that sh_ts_residual_coding_rice_idx_minus1 may be present in slice_header( ) syntax structures referring to the SPS. sps_ts_residual_coding_rice_present_in_sh_flag equal to 0 specifies that sh_ts_residual_coding_rice_idx_minus1 is not present in slice_header( ) syntax structures referring to the SPS. When not present, the value of sps_ts_residual_coding_rice_present_in_sh_flag is inferred to be equal to 0.

It is a requirement of bitstream conformance that the value of sps_ts_residual_coding_rice_present_in_sh_flag shall be equal to 0 when BitDepth is less than or equal to 10. ⎯ 253

FIG. 15 sps_rrc_rice_extension_flag equal to 1 specifies that an extension of Rice parameter derivation for the binarization of abs_remaining[ ] and dec_abs_level[ ] is enabled. sps_rrc_rice_extension_flag equal to 0 specifies that the extension of Rice parameter derivation for the binarization of abs_remaining[ ] and dec_abs_level[ ] is disabled. When not present, the value of sps_rrc_rice_extension_flag is inferred to be equal to 0.

It is a requirement of bitstream conformance that the value of sps_rrc_rice_extension_flag shall be equal to 0 when BitDepth is less than or equal to 10. — 254 sps_persistent_rice_adaptation_enabled_flag equal to 1 specifies that Rice parameter derivation for the binarization of abs_remainder[ ] and dec_abs_level[ ] is initialized at the start of each TU using statistics accumulated from previous TUs. sps_persistent_rice_adaptation_enabled_flag equal to 0 specifies that no previous TU state is used in Rice parameter derivation. When not present, the value of sps_persistent_rice_adaptation_enabled_flag is inferred to be equal to 0.

It is a requirement of bitstream conformance that the value of sps_persistent_rice_adaptation_enabled_flag shall be equal to 0 when BitDepth is less than or equal to 10. — 255

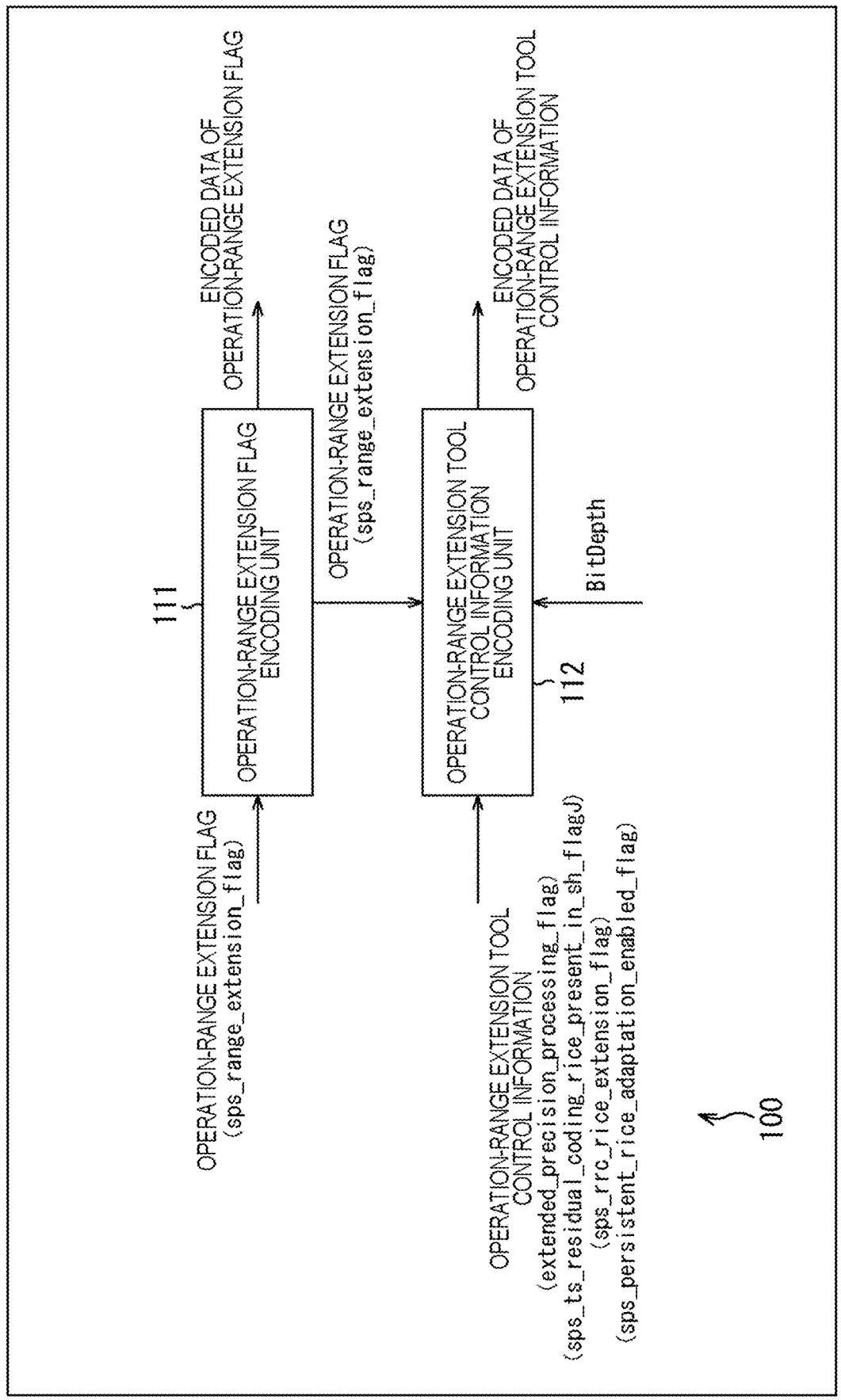

FIG. 19

| | Descriptor |
|---|---|
| sps_range_extension( ) { | |
|   if (BitDepth>10) { | |
|     extended_precision_processing_flag | u(1) |
|     sps_ts_residual_coding_rice_present_in_sh_flag | u(1) |
|     sps_rrc_rice_extension_flag | u(1) |
|     sps_persistent_rice_adaptation_enabled_flag | u(1) |
|   } | |
| } | |

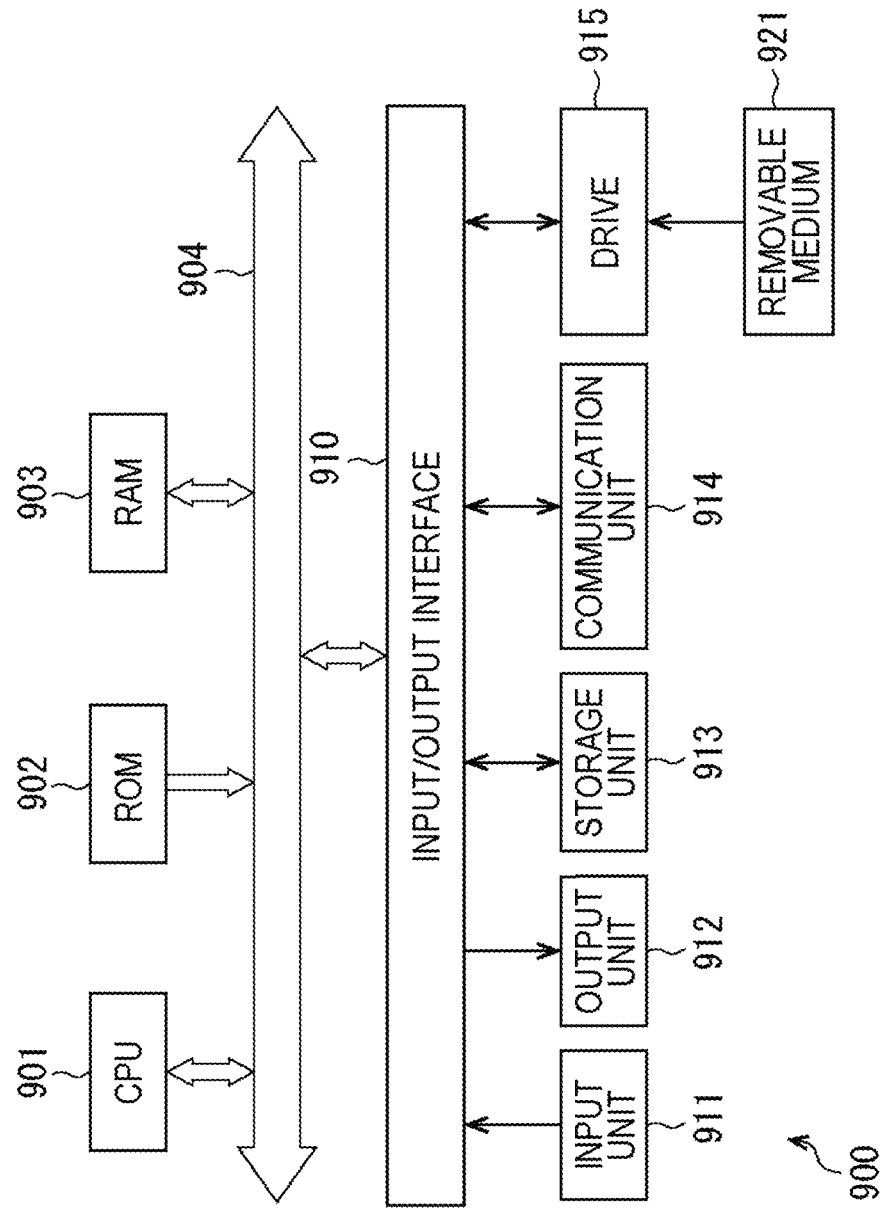

IMAGE PROCESSING DEVICE AND METHOD

CROSS-REFERENCE TO RELATED APPLICATIONS

The present application is based on PCT filing PCT/JP2022/022248, filed Jun. 1, 2022, which claims priority from U.S. Provisional Patent Application No. 63/196,283, filed Jun. 3, 2021, the entire contents of each are incorporated herein by reference.

TECHNICAL FIELD

The present disclosure relates to an image processing device and method, and more particularly, to an image processing device and method that enable the use of an encoding tool for bit-depth extension while maintaining compatibility with a specification that does not extend a bit depth of an image.

BACKGROUND ART

Conventionally, there has been proposed an encoding method of deriving a prediction residual of a moving image and performing coefficient transform and quantization for encoding (e.g., see Non-Patent Documents 1 and Non-Patent Document 2). Furthermore, in such image encoding, it has been proposed to support extending a bit depth of an image to be processed by extending an operation range (also referred to as a dynamic range) (e.g., see Non-Patent Document 3). In addition, an encoding tool (operation-range extension tool) as a function for a high bit depth and a high bit rate has been proposed (e.g., see Non-Patent Documents 4 to 6). By applying the method described in Non-Patent Document 3, an operation range (dynamic range) of each of an encoder and a decoder conforming to the encoding/decoding methods described in Non-Patent Document 1 and Non-Patent Document 2 can be extended, and the operation-range extension tools described in Non-Patent Documents 4 to 6 can be used.

CITATION LIST

Non-Patent Document

Non-Patent Document 1: Benjamin Bross, Jianle Chen, Shan Liu, "Versatile Video Coding (Draft 10)", JVET-T2001-v2, Joint Video Experts Team (JVET) of ITU-T SG 16 WP 3 and ISO/IEC JTC 1/SC 29, version 1—date 2020-10-27

Non-Patent Document 2: Jianle Chen, Yan Ye, Seung Hwan Kim, "Algorithm description for Versatile Video Coding and Test Model 11 (VTM 11)", JVET-T2002-v1, Joint Video Experts Team (JVET) of ITU-T SG 16 WP 3 and ISO/IEC JTC 1/SC 29, version 1—date 2020-10-27

Non-Patent Document 3: Frank Bossen, Benjamin Bross, Tomohiro Ikai, Dmytro Rusanovskyy, Ye-Kui Wang, "VVC operation-range extensions (Draft 3)", JVET-V2005-v1, Joint Video Experts Team (JVET) of ITU-T SG 16 WP 3 and ISO/IEC JTC 1/SC 29, version 1- date 2021-05-07

Non-Patent Document 4: Dmytro Rusanovskyy, Marta Karczewicz, Luong Pham Van, Muhammed Coban, "CE-related: On history-enhanced method of Rice parameter derivation for regular residual coding (RRC) at high bit depths", JVET-V0106, Joint Video Experts Team (JVET) of ITU-T SG 16 WP 3 and ISO/IEC JTC 1/SC 29, 2021-04-19

Non-Patent Document 5: Hong-Jheng Jhu, Xiaoyu Xiu, Yi-Wen Chen, Wei Chen, Che-Wei Kuo, Xianglin Wang, "CE-2.1: Slice based Rice parameter selection for transform skip residual coding", JVET-V0054-r1, Joint Video Experts Team (JVET) of ITU-T SG 16 WP 3 and ISO/IEC JTC 1/SC 29, 2021-04-29

Non-Patent Document 6: Tianyang Zhou, Takeshi Chujoh, Tomohiro Ikai, "CE-3.1 and CE-3.2: Transform coefficients range extension for high bit depth coding", JVET-V0047, Joint Video Experts Team (JVET) of ITU-T SG 16 WP 3 and ISO/IEC JTC 1/SC 29, 2021-04-13

SUMMARY OF THE INVENTION

Problems to be Solved by the Invention

However, the operation-range extension tools described in Non-Patent Document 4 to Non-Patent Document 6 are encoding tools for processing an image with an extended bit depth, and are not used in a case where the operation range is not extended. In the method described in Non-Patent Document 3, there has been a possibility of generating a bitstream that is not compatible with the image encoding method in a case where the operation range described in Non-Patent Document 1 and Non-Patent Document 2 is not extended. Therefore, there has been a possibility that a decoder conforming to the decoding methods described in Non-Patent Document 1 and Non-Patent Document 2 cannot decode the bitstream.

The present disclosure has been made in view of such a situation, and enables the use of an encoding tool for bit-depth extension while maintaining compatibility with a specification that does not extend a bit depth of an image.

Solutions to Problems

An image processing device according to one aspect of the present technology is an image processing device including: an operation-range extension flag encoding unit that encodes an operation-range extension flag in accordance with a bit depth of an image; and an operation-range extension tool control information encoding unit that encodes operation-range extension tool control information in accordance with the operation-range extension flag. The operation-range extension flag is flag information regarding extension of an operation range of the image, and the operation-range extension tool control information is control information of an operation-range extension tool used in a case where the operation range is extended.

An image processing method according to one aspect of the present technology is an image processing method including: encoding an operation-range extension flag in accordance with a bit depth of an image; and encoding operation-range extension tool control information in accordance with the operation-range extension flag. The operation-range extension flag is flag information regarding extension of an operation range of the image, and the operation-range extension tool control information is control information of an operation-range extension tool used in a case where the operation range is extended.

An image processing device according to another aspect of the present technology is an image processing device including: an operation-range extension flag encoding unit that encodes an operation-range extension flag; and an operation-range extension tool control information encoding unit that encodes operation-range extension tool control information in accordance with a bit depth of an image. The operation-range extension flag is flag information regarding extension of an operation range of the image, and the operation-range extension tool control information is control information of an operation-range extension tool used in a case where the operation range is extended.

An image processing method according to another aspect of the present technology is an image processing method including: encoding an operation-range extension flag; and encoding operation-range extension tool control information in accordance with a bit depth of an image. The operation-range extension flag is flag information regarding extension of an operation range of the image, and the operation-range extension tool control information is control information of an operation-range extension tool used in a case where the operation range is extended.

In the image processing device and method according to one aspect of the present technology, the operation-range extension flag is encoded in accordance with a bit depth of an image, and the operation-range extension tool control information is encoded in accordance with the operation-range extension flag.

In an image processing device and method according to another aspect of the present technology, an operation-range extension flag is encoded, and operation-range extension tool control information is encoded in accordance with a bit depth of an image.

BRIEF DESCRIPTION OF DRAWINGS

FIG. 1 is a diagram illustrating an example of syntax.
FIG. 2 is a diagram illustrating an example of semantics.
FIG. 3 is a diagram illustrating an example of syntax.
FIG. 4 is a diagram illustrating an example of semantics.
FIG. 5 is a diagram for explaining a control method for operation-range extension information.
FIG. 6 is a diagram illustrating an example of semantics.
FIG. 7 is a diagram illustrating an example of semantics.
FIG. 14 is a diagram illustrating an example of semantics.
FIG. 15 is a diagram illustrating an example of semantics.
FIG. 16 is a block diagram illustrating an example of the main configuration of the operation-range extension information encoding device.
FIG. 19 is a diagram illustrating an example of syntax.
FIG. 29 is a block diagram illustrating an example of a main configuration of a computer.

MODE FOR CARRYING OUT THE INVENTION

Figure 8:
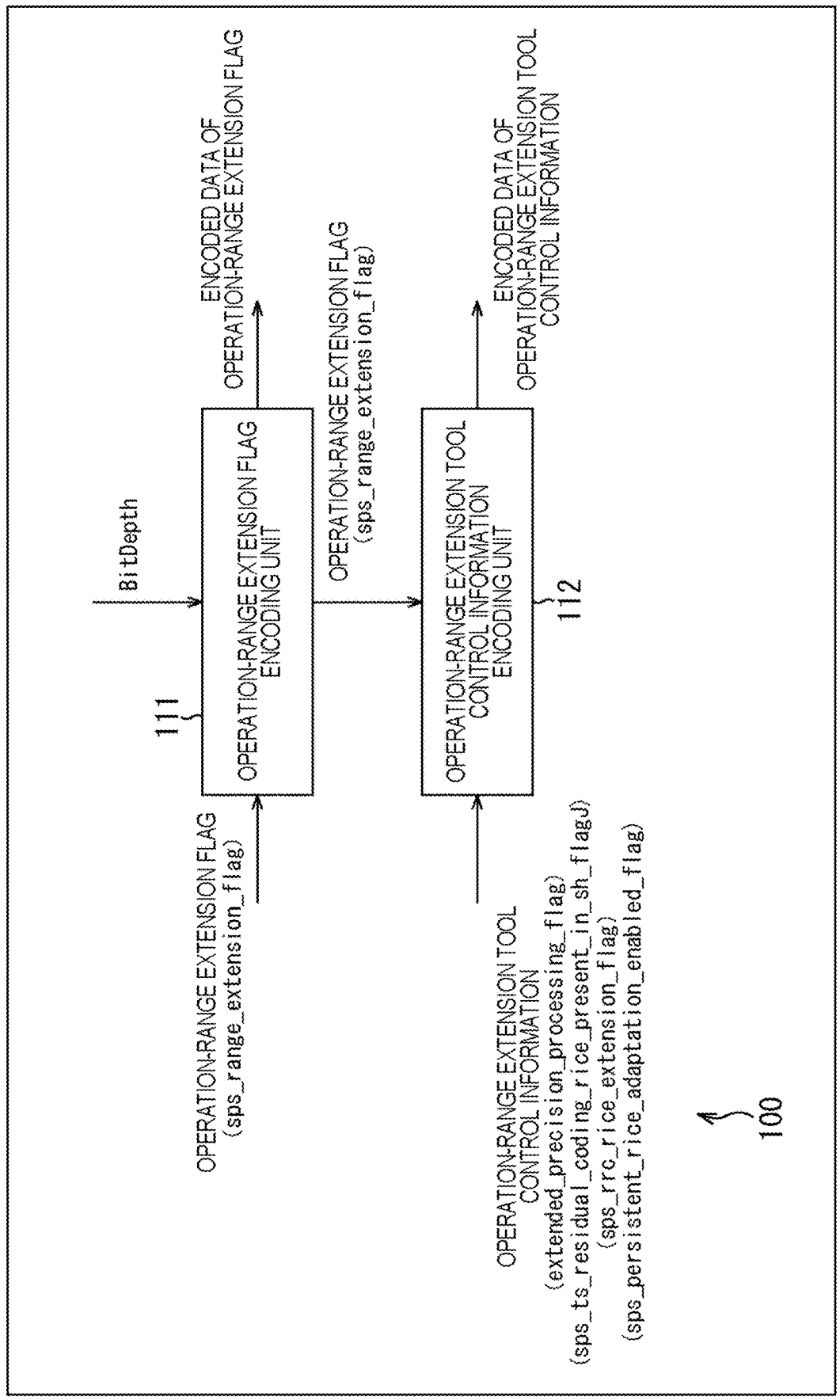
FIG. 8 is a block diagram illustrating an example of a main configuration of an operation-range extension information encoding device.

Hereinafter, modes for carrying out the present disclosure (hereinafter referred to as embodiments) will be described. Note that a description will be given in the following order.

1. Documents and the like supporting technical content and technical terms
2. Extension for high bit depth and high bit-rate
3. Control of operation-range extension flag
4. Control of value of operation-range extension tool control information
5. Transmission control of operation-range extension tool control information
6. Embodiment (image encoding device)
7. Embodiment (image decoding device)
8. Appendix 1. Documents and the Like Supporting Technical Content and Technical Terms The scope disclosed in the present technology includes not only the content described in the embodiments but also the content described in the following non-patent documents and the like that are known at the time of filing, the content of other documents referred to in the following non-patent documents, and the like.

Non-Patent Document 1: (described above)
Non-Patent Document 2: (described above)
Non-Patent Document 3: (described above)
Non-Patent Document 4: (described above)
Non-Patent Document 5: (described above)
Non-Patent Document 6: (described above)
Non-Patent Document 7: Recommendation ITU-T H.264 (04/2017) "Advanced video coding for generic audiovisual services", April 2017
Non-Patent Document 8: Recommendation ITU-T H.265 (02/2018) "High efficiency video coding", February 2018

That is, the content described in the above-described non-patent documents also serves as a basis for determining a support requirement. For example, even in a case where the quad-tree block structure and the quad-tree plus binary tree (QTBT) block structure described in the above-described non-patent documents are not directly described in the embodiments, they are within the scope of disclosure of the present technology and are assumed to satisfy the support requirements of the claims. In addition, for example, technical terms such as parsing, syntax, and semantics are also within the scope of disclosure of the present technology even in a case where there is no direct description in the embodiments, and are assumed to meet the support requirements of the claims.

Furthermore, in the present description, a "block" (not a block indicating a processing unit) used in the description as a partial area or a unit of processing in an image (picture) indicates an arbitrary partial area in the picture unless otherwise specified, and does not limit its size, shape, characteristics, and the like. For example, examples of the "block" include an arbitrary partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a sub-block, a macroblock, a tile, or a slice described in an above-described Non-Patent Document.

Furthermore, when a size of such a block is specified, the block size may be specified not only directly but also indirectly. For example, the block size may be specified using identification information that identifies the size. Furthermore, for example, the block size may be specified by a ratio or difference with the size of the reference block (e.g., LCU, SCU, etc.). For example, in a case where information for specifying the block size as a syntax element or the like is transmitted, information for indirectly specifying the size as described above may be used as the information. In this manner, the information amount of the information can be reduced, and encoding efficiency may be improved. In addition, the specification of a block size also includes specification of an area of the block size (e.g., specification of an area of an allowable block size, etc.).

2. Extension for High Bit Depth, High Bit-Rate

Conventionally, for example, as described in Non-Patent Document 1 and Non-Patent Document 2, there has been an encoding method of deriving a prediction residual of a moving image, performing coefficient transform, quantizing, and encoding. Furthermore, as described in Non-Patent Document 3, in such image encoding, there has been a method of supporting extension of a bit depth of an image to be processed by extending an operation range (also referred to as a dynamic range). In addition, for example, as described in Non-Patent Documents 4 to 6, there has been an encoding tool (operation-range extension tool) as a function for a high bit depth and a high bit rate. By applying the method described in Non-Patent Document 3, an operation range (dynamic range) of each of an encoder and a decoder conforming to the encoding/decoding methods described in Non-Patent Document 1 and Non-Patent Document 2 can be extended, and the operation-range extension tools described in Non-Patent Documents 4 to 6 can be used.

Note that, in the present specification, extending the operation range (dynamic range) means extending a bit depth of an image that can be processed (supported) by an encoder or a decoder. This bit depth may be any number of bits. For example, it may be assumed that the encoder or the decoder can process an image having a bit depth of 10 bits or less in the basic specification, and it may be assumed that the encoder or the decoder can process an image having a bit depth (e.g., 12 bits, etc.) greater than 10 bits by extending the operation range. In this case, the operation-range extension tool is a tool that can be used in a case where the encoder or the decoder processes (encodes or decodes) an image having a bit depth greater than 10 bits (high bit-depth, high bit-rate image). Note that the extended operation range is also referred to as an extended dynamic range.

The operation-range extension tools described in Non-Patent Documents 4 to 6 are encoding tools for processing an image with an extended bit depth, and are not used in a case where the operation range of the encoder or the decoder is not extended.

FIG. 1 is a diagram illustrating an example of syntax related to the operation-range extension tool described in Non-Patent Document 3. FIG. 2 is a diagram illustrating an example of semantics of each syntax element illustrated in FIG. 1.

In a case where sps_extension_flag is true (e.g., "1"), it indicates that an operation-range extension flag (sps_range_extension_flag) exists in a sequence parameter set (sequence parameter set (SPS)) or the like. Furthermore, in a case where sps_extension_flag is false (e.g., "0"), it indicates that the operation-range extension flag (sps_range_extension_flag) does not exist in the sequence parameter set or the like.

The operation-range extension flag (sps_range_extension_flag) is flag information regarding the extension of the operation range of the image. In a case where sps_range_extension_flag is true (e.g., "1"), it indicates that operation-range extension tool control information (sps_range_extension( )) exists in the sequence parameter set or the like. In a case where sps_range_extension_flag is false (e.g., "0"), it indicates that sps_range_extension( ) does not exist in the sequence parameter set or the like.

The operation-range extension tool control information (sps_range_extension( )) is control information of the operation-range extension tool used in a case where the operation range is extended. FIG. 3 illustrates an example of syntax of sps_range_extension( ). FIG. 4 is a diagram illustrating an example of semantics of each syntax element illustrated in FIG. 3.

As illustrated in FIG. 3, the operation-range extension tool control information (sps_range_extension( )) may include, for example, a control flag (extended_precision_processing_flag) related to the extension of the internal calculation precision of the orthogonal transform. This control flag is flag information for controlling whether or not to apply the encoding tool for extending the internal calculation precision of the orthogonal transform described in Non-Patent Document 6. For example, in a case where extended_precision_processing_flag is true (e.g., "1"), it indicates that the extended dynamic range can be used for transform coefficients and transform. Furthermore, in a case where extended_precision_processing_flag is false (e.g., "0"), it indicates that the extended dynamic range cannot be used for transform coefficients and transform.

Furthermore, the operation-range extension tool control information (sps_range_extension( )) may include, for example, a control flag (sps_ts_residual_coding_rice_present_in_sh_flag) related to extension of a Rice parameter of transform skip residual coding (TSRC). This control flag is flag information for controlling whether or not to apply the encoding tool for extending the Rice parameter of TSRC described in Non-Patent Document 5. For example, in a case where sps_ts_residual_coding_rice_present_in_sh_flag is true (e.g., "1"), it indicates that sh_ts_residual_coding_rice_idx_minus1 can exist in the slice header that refers to the sequence parameter set. Furthermore, in a case where sps_ts_residual_coding_rice_present_in_sh_flag is false (e.g., "0"), it indicates that sh_ts_residual_coding_rice_idx_minus1 does not exist in the slice header that refers to the sequence parameter set.

Furthermore, the operation-range extension tool control information (sps_range_extension( )) may include, for example, a control flag (sps_rrc_rice_extension_flag, sps_persistent_rice_adaptation_enabled_flag) related to extension of a Rice parameter of regular residual coding (RRC). These control flags are flag information for controlling the encoding tool for extending the Rice parameter of the RRC described in Non-Patent Document 4. For example, in a case where sps_rrc_rice_extension_flag is true (e.g., "1"), it indicates that extension of derivation of a Rice parameter for binarization of abs_remaining[ ] and dec_abs_level[ ] is valid. Furthermore, in a case where sps_rrc_rice_extension_flag is false (e.g., "0"), it indicates that the extension of the derivation of the Rice parameter is invalid. Also, in a case where sps_persistent_rice_adaptation_enabled_flag is true (e.g., "1"), it indicates that the derivation of the Rice parameter for binarization of abs remainder[ ] and dec_abs_level[ ] is initialized at the start of each TU using statistics accumulated from the previous TU. Furthermore, in a case where sps_persistent_rice_adaptation_enabled_flag is false (e.g., "0"), it indicates that a previous TU state is not used in the derivation of the Rice parameter.

As described above, in a case where the operation-range extension flag (sps_range_extension_flag) is true (e.g., "1"), the operation-range extension tool control information (sps_range_extension( )) is encoded and transmitted.

However, in such a method, there has been a possibility of generating a bitstream that is not compatible with the image encoding method in a case where the operation range described in Non-Patent Document 1 and Non-Patent Document 2 is not extended. For example, even in a case where the bit depth of the image to be processed is 10 bits or less (i.e., in a case where the operation range is not extended), (when the operation-range extension flag is true,) there has been a possibility that the operation-range extension tool control information having a value that enables the use of the operation-range extension tool is encoded and transmitted. Such a bitstream is not compatible with the image encoding methods described in Non-Patent Document 1 and Non-Patent Document 2, and may not be correctly decoded by a decoder that does not support the extension of the operation range.

Therefore, as illustrated in the uppermost row of the table in FIG. 5, the operation-range extension information regarding the operation-range extension is controlled on the basis of the bit depth. In the present specification, the operation-range extension information can include, for example, an operation-range extension flag and operation-range extension tool control information.

3. Control of Operation-Range Extension Flag

<Method 1>

For example, as illustrated in the second row from the top of the table in FIG. 5, the value of the operation-range extension flag may be controlled on the basis of the bit depth (method 1). FIG. 6 is a diagram illustrating an example of semantics in that case. As indicated in a square frame 11 in FIG. 6, it has been set as the bitstream constraint that in a case where a bit depth (BitDepth) of an image is 10 bits or less, the value of sps_range_extension_flag is equal to false (e.g., "0").

By complying with such a constraint, (the encoded data of) the operation-range extension tool control information is not stored in the bitstream in a case where the operation range is not extended. Thus, the bitstream can maintain compatibility with the image encoding methods described in Non-Patent Documents 1 and 2. Therefore, even a decoder that does not support the extension of the operation range can correctly decode the bitstream. That is, it is possible to use an encoding tool for bit-depth extension while maintaining compatibility with a specification that does not extend a bit depth of an image.

FIG. 7 is a diagram illustrating an example of semantics in that case. As illustrated in a square frame 12 in FIG. 7, an internal variable (ExtendedPrecisionFlag) related to the extension of the internal calculation precision of the orthogonal transform may be set to the value of the control flag (extended_precision_processing_flag) related to the extension of the internal calculation precision of the orthogonal transform. That is, the value of the internal variable (ExtendedPrecisionFlag) may be equal to the value of the control flag (extended_precision_processing_flag). That is, in this case, control based on the bit depth (BitDepth) of the image is unnecessary for setting the value of the internal variable (ExtendedPrecisionFlag).

<Operation-Range Extension Information Encoding Device>

FIG. 8 is a block diagram illustrating an example of a configuration of an operation-range extension information encoding device that is one aspect of an image processing device to which the present technology is applied. An operation-range extension information encoding device 100 illustrated in FIG. 8 is a device that performs processing related to encoding of operation-range extension information. For example, the operation-range extension information encoding device 100 acquires operation-range extension information such as an operation-range extension flag and operation-range extension tool control information. Furthermore, the operation-range extension information encoding device 100 acquires a parameter BitDepth indicating a bit depth of an image. The operation-range extension information encoding device 100 uses these pieces of information to perform processing related to the encoding of the operation-range extension information.

The operation-range extension information encoding device 100 appropriately outputs encoded data of the operation-range extension information and the like as a processing result. The encoded data is supplied to, for example, an encoder that encodes an image. The encoder encodes an image on the basis of the operation-range extension information and generates a bitstream including the encoded data of the image. The encoded data of the operation-range extension information is supplied to the decoding side, for example, by being stored in the bitstream.

Note that, in FIG. 8, main processing units, main data flows, and the like are illustrated, and those illustrated in FIG. 8 are not necessarily all. That is, the operation-range extension information encoding device 100 may include a processing unit not illustrated as a block in FIG. 8. Furthermore, the operation-range extension information encoding device 100 may have processing or a data flow that is not illustrated as an arrow or the like in FIG. 8.

As illustrated in FIG. 8, the operation-range extension information encoding device 100 includes an operation-range extension flag encoding unit 111 and an operation-range extension tool control information encoding unit 112.

The operation-range extension flag encoding unit 111 performs processing related to the encoding of the operation-range extension flag (sps_range_extension_flag). For example, the operation-range extension flag encoding unit 111 may acquire the operation-range extension flag (sps_range_extension_flag). Furthermore, the operation-range extension flag encoding unit 111 may acquire a parameter (BitDepth) indicating a bit depth of an image (encoding target).

The operation-range extension flag encoding unit 111 encodes the operation-range extension flag (sps_range_extension_flag) in accordance with the bit depth (BitDepth) of the image. For example, the operation-range extension flag encoding unit 111 may set the operation-range extension flag to false and encode the operation-range extension flag in a case where the bit depth of the image is not extended, and may encode the operation-range extension flag in a case where the bit depth of the image is extended. For example, the operation-range extension flag encoding unit 111 may set the operation-range extension flag to false and encode the operation-range extension flag in a case where the bit depth of the image is 10 bits or less, and may encode the operation-range extension flag in a case where the bit depth of the image is greater than 10 bits.

The operation-range extension flag encoding unit 111 may output the encoded data of the operation-range extension flag to the outside of the operation-range extension information encoding device 100 as a processing result. Furthermore, the operation-range extension flag encoding unit 111 may supply the operation-range extension flag (sps_range_extension_flag) to the operation-range extension tool control information encoding unit 112.

The operation-range extension tool control information encoding unit 112 performs processing related to the encoding of the operation-range extension tool control information (sps_range_extension( )). For example, the operation-range extension tool control information encoding unit 112 may acquire the operation-range extension tool control information (sps_range_extension( )). Furthermore, the operation-range extension tool control information encoding unit 112 may acquire the operation-range extension flag (sps_range_extension_flag) supplied from the operation-range extension flag encoding unit 111.

The operation-range extension tool control information encoding unit 112 encodes the operation-range extension tool control information in accordance with the operation-range extension flag. For example, in a case where the operation-range extension flag is false, the operation-range extension tool control information encoding unit 112 may skip (omit) encoding the operation-range extension tool control information. In addition, the operation-range extension tool control information encoding unit 112 may set the operation-range extension tool control information, for which encoding has been skipped, to a value indicating the unavailability of the operation-range extension tool. Furthermore, in a case where the operation-range extension flag is true, the operation-range extension tool control information encoding unit 112 may encode the operation-range extension tool control information.

Note that the operation-range extension tool control information (sps_range_extension( )) may include a control flag (extended_precision_processing_flag) related to the extension of the internal calculation precision of the orthogonal transform. In this case, the operation-range extension tool control information encoding unit 112 may set the internal variable (ExtendedPrecisionFlag) related to the extension of the internal calculation precision of the orthogonal transform in the encoder to the value of the control flag (extended_precision_processing_flag) related to the extension of the internal calculation precision of the orthogonal transform. That is, as described with reference to FIG. 7, the value of the internal variable (ExtendedPrecisionFlag) may be equal to the value of the control flag (extended_precision_processing_flag).

Furthermore, the operation-range extension tool control information (sps_range_extension( )) may include a control flag (sps_ts_residual_coding_rice_present_in_sh_flag) related to the extension of the Rice parameter of TSRC. Also, the operation-range extension tool control information (sps_range_extension( )) may include a control flag (sps_rrc_rice_extension_flag, sps_persistent_rice_adaptation_enabled_flag) related to the extension of the Rice parameter of regular residual coding (RRC).

The operation-range extension tool control information encoding unit 112 may output the encoded data of the operation-range extension tool control information to the outside of the operation-range extension information encoding device 100 as a processing result.

With such a configuration, the operation-range extension information encoding device 100 can encode the operation-range extension information in compliance with the constraint illustrated in FIG. 6. That is, the operation-range extension information encoding device 100 can generate a bitstream that does not violate the constraint illustrated in FIG. 6 by supplying the encoded data of the generated operation-range extension information to the encoder. In other words, the operation-range extension information encoding device 100 can generate a bitstream that maintains compatibility with the image encoding methods described in Non-Patent Documents 1 and 2. That is, the operation-range extension information encoding device 100 encodes the operation-range extension information in this manner, whereby the encoder and the decoder can use an encoding tool for bit-depth extension while maintaining compatibility with a specification that does not extend the bit depth of the image.

<Flow of Operation-Range Extension Information Encoding Processing>

An example of a flow of operation-range extension information encoding processing executed by the operation-range extension information encoding device 100 will be described with reference to a flowchart of FIG. 9.

In the operation-range extension information encoding processing, the operation-range extension information encoding device 100 encodes an operation-range extension flag in accordance with the bit depth of the image, and encodes the operation-range extension tool control information in accordance with the operation-range extension flag.

For example, the operation-range extension flag encoding unit 111 may set the operation-range extension flag to false and encode the operation-range extension flag in a case where the bit depth of the image is not extended, and may encode the operation-range extension flag in a case where the bit depth of the image is extended. For example, the operation-range extension flag encoding unit 111 may set the operation-range extension flag to false and encode the operation-range extension flag in a case where the bit depth of the image is 10 bits or less, and may encode the operation-range extension flag in a case where the bit depth of the image is greater than 10 bits.

Figure 9:
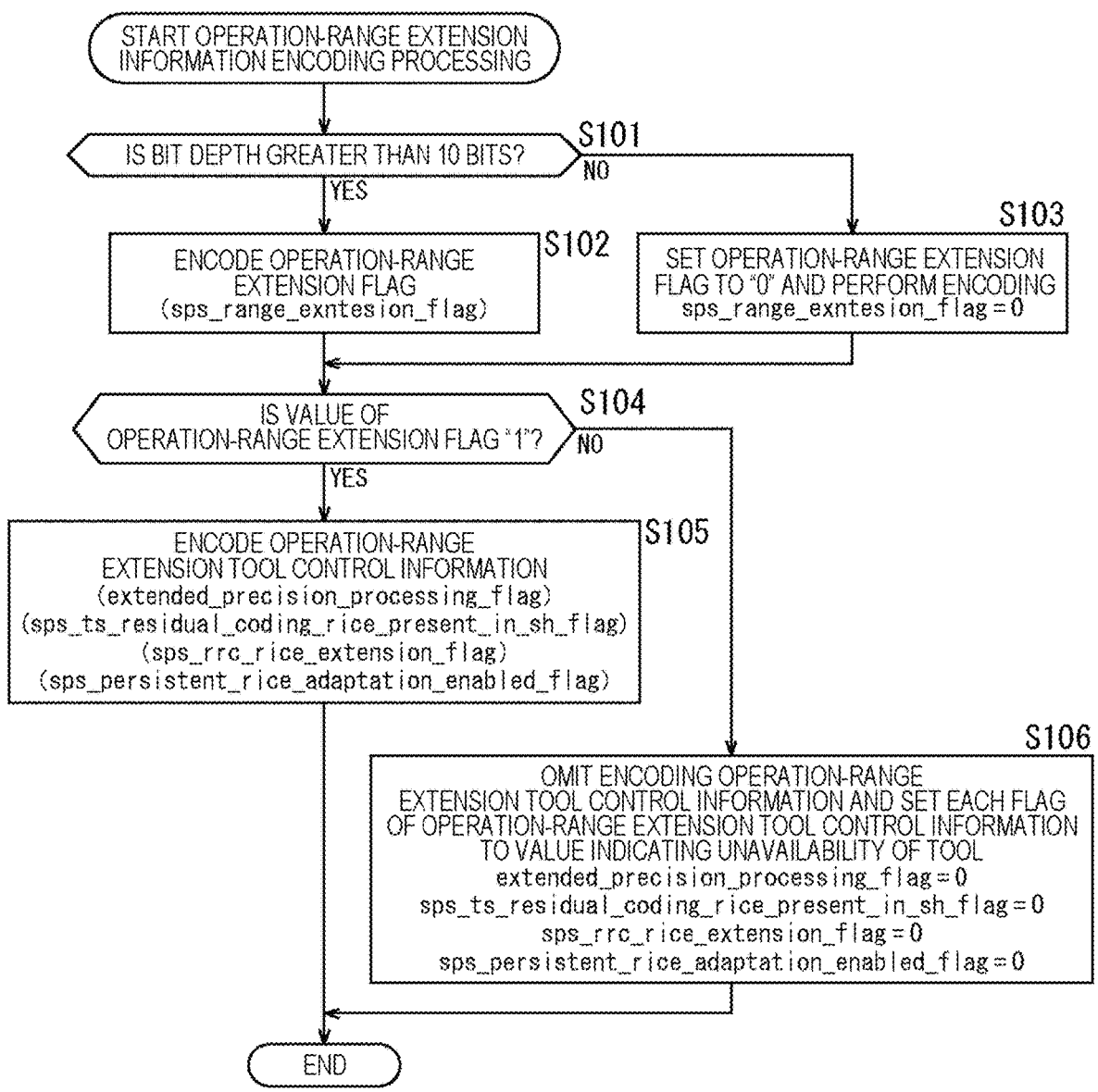
FIG. 9 is a flowchart illustrating an example of a flow of operation-range extension information encoding processing.

When the operation-range extension information encoding processing is started, in step S101 of FIG. 9, the operation-range extension flag encoding unit 111 determines whether or not the bit depth (BitDepth) of the image is greater than 10 bits.

In a case where it is determined that the bit depth (BitDepth) of the image is greater than 10 bits, the procedure proceeds to step S102. In that case, in step S102, the operation-range extension flag encoding unit 111 encodes the operation-range extension flag (sps_range_extension_flag). When the processing at step S102 is finished, the procedure shifts to step S104.

Furthermore, in a case where it is determined in step S101 that the bit depth (BitDepth) of the image is 10 bits or less, the procedure proceeds to step S103. In that case, in step S103, the operation-range extension flag encoding unit 111 sets the operation-range extension flag (sps_range_extension_flag) to false (e.g., "0") and encodes the operation-range extension flag (sps_range_extension_flag=0). When the processing in step S103 ends, the procedure proceeds to step S104.

For example, in a case where the operation-range extension flag is false, the operation-range extension tool control information encoding unit 112 may skip encoding the operation-range extension tool control information. In this case, the operation-range extension tool control information encoding unit 112 may set the operation-range extension tool control information, for which encoding has been skipped, to a value indicating the unavailability of the operation-range extension tool. Furthermore, in a case where the operation-range extension flag is true, the operation-range extension tool control information encoding unit 112 may encode the operation-range extension tool control information.

In step S104, the operation-range extension tool control information encoding unit 112 determines whether or not the operation-range extension flag is true (e.g., "1"). In a case where it is determined that the operation-range extension flag is true, the procedure proceeds to step S105. In step S105, the operation-range extension tool control information encoding unit 112 encodes the operation-range extension tool control information. When the processing in step S105 ends, the operation-range extension information encoding processing ends.

Furthermore, in a case where it is determined in step S104 that the operation-range extension flag is false, the procedure proceeds to step S106. In step S106, the operation-range extension tool control information encoding unit 112 skips encoding the operation-range extension tool control information. Furthermore, the operation-range extension tool control information encoding unit 112 sets (each control flag of) the operation-range extension tool control information to a value indicating the unavailability of the operation-range extension tool. When the processing in step S106 ends, the operation-range extension information encoding processing ends.

By executing each processing as described above, the operation-range extension information encoding device 100 can encode the operation-range extension information in compliance with the constraint illustrated in FIG. 6.

That is, the operation-range extension information encoding device 100 can generate a bitstream that does not violate the constraint illustrated in FIG. 6 by supplying the encoded data of the generated operation-range extension information to the encoder. Therefore, the encoder and the decoder can use the encoding tool for bit-depth extension while maintaining compatibility with the specification that does not extend the bit depth of the image.

<Operation-Range Extension Information Decoding Device>

Figure 10:
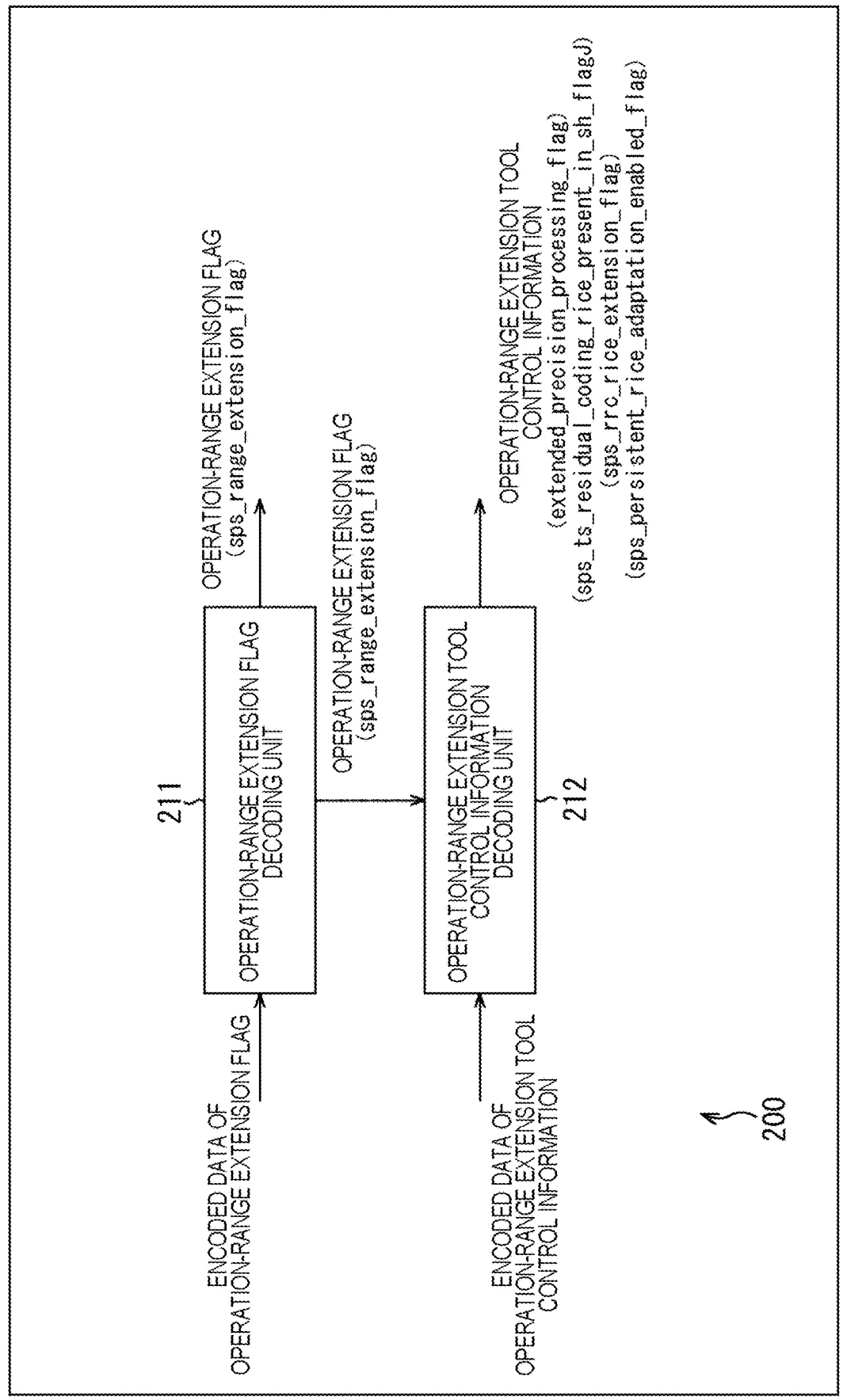
FIG. 10 is a block diagram illustrating an example of a main configuration of an operation-range extension information decoding device.

FIG. 10 is a block diagram illustrating an example of a configuration of an operation-range extension information decoding device that is one aspect of an image processing device to which the present technology is applied. An operation-range extension information decoding device 200 illustrated in FIG. 10 is a device that performs processing related to the decoding of the encoded data of the operation-range extension information. For example, the operation-range extension information decoding device 200 acquires the encoded data of the operation-range extension information (such as the operation-range extension flag and the operation-range extension tool control information) generated by the operation-range extension information encoding device 100.

The operation-range extension information maintains compatibility with the image encoding methods described in Non-Patent Documents 1 and 2. That is, the bitstream of the image encoded using the operation-range extension information can be correctly decoded even by a decoder that does not support the extension of the operation range.

The operation-range extension information decoding device 200 performs processing related to the decoding of the encoded data of the operation-range extension information. The operation-range extension information decoding device 200 appropriately outputs the operation-range extension information as a processing result. The operation-range extension information is supplied to, for example, a decoder that decodes encoded data of an image. The decoder decodes the encoded data on the basis of the operation-range extension information and generates (restores) an image.

Note that, in FIG. 10, main processing units, main data flows, and the like are illustrated, and those illustrated in FIG. 10 are not necessarily all. That is, the operation-range extension information decoding device 200 may include a processing unit not illustrated as a block in FIG. 10. Furthermore, the operation-range extension information decoding device 200 may have processing or a data flow that is not illustrated as an arrow or the like in FIG. 10.

As illustrated in FIG. 10, the operation-range extension information decoding device 200 includes an operation-range extension flag decoding unit 211 and an operation-range extension tool control information decoding unit 212.

The operation-range extension flag decoding unit 211 performs processing related to the decoding of the encoded data of an operation-range extension flag (sps_range_extension_flag). For example, the operation-range extension flag decoding unit 211 may acquire the encoded data of the operation-range extension flag. Furthermore, the operation-range extension flag decoding unit 211 may decode the encoded data and generate (restore) the operation-range extension flag. Also, the operation-range extension flag decoding unit 211 may output the operation-range extension flag to the outside of the operation-range extension information decoding device 200 as a processing result. Furthermore, the operation-range extension flag decoding unit 211 may supply the operation-range extension flag to the operation-range extension tool control information decoding unit 212.

The operation-range extension tool control information decoding unit 212 performs processing related to the decoding of the encoded data of the operation-range extension tool control information (sps_range_extension( )). For example, the operation-range extension tool control information decoding unit 212 may acquire the encoded data of the operation-range extension tool control information. Furthermore, the operation-range extension tool control information decoding unit 212 may acquire the operation-range extension flag supplied from the operation-range extension flag decoding unit 211. The operation-range extension tool control information decoding unit 212 may decode the encoded data of the operation-range extension tool control information in accordance with the operation-range extension flag. Furthermore, the operation-range extension tool control information decoding unit 212 may output the operation-range extension tool control information to the outside of the operation-range extension information decoding device 200 as a processing result.

Note that the operation-range extension tool control information may include a control flag (extended_precision_processing_flag) related to the extension of the internal calculation precision of the orthogonal transform. In that case, the internal variable (ExtendedPrecisionFlag) related to the extension of the internal calculation precision of the orthogonal transform in the decoder may be set to the value of the control flag (extended_precision_processing_flag) related to the extension of the internal calculation precision of the orthogonal transform. Furthermore, the operation-range extension tool control information may include a control flag (sps_ts_residual_coding_rice_present_in_sh_flag) related to the extension of the Rice parameter of the TSRC. Also, the operation-range extension tool control information may include a control flag (sps_rrc_rice_extension_flag, sps_persistent_rice_adaptation_enabled_flag) related to the extension of the Rice parameter of the RRC.

With such a configuration, the operation-range extension information decoding device 200 can correctly decode the encoded data of the operation-range extension information generated by the operation-range extension information encoding device 100. That is, the decoder can use the encoding tool for bit-depth extension while maintaining compatibility with the specification that does not extend the bit depth of the image.

<Flow of Operation-Range Extension Information Decoding Processing>

An example of a flow of operation-range extension information decoding processing executed by the operation-range extension information decoding device 200 will be described with reference to a flowchart of FIG. 11.

Figure 11:
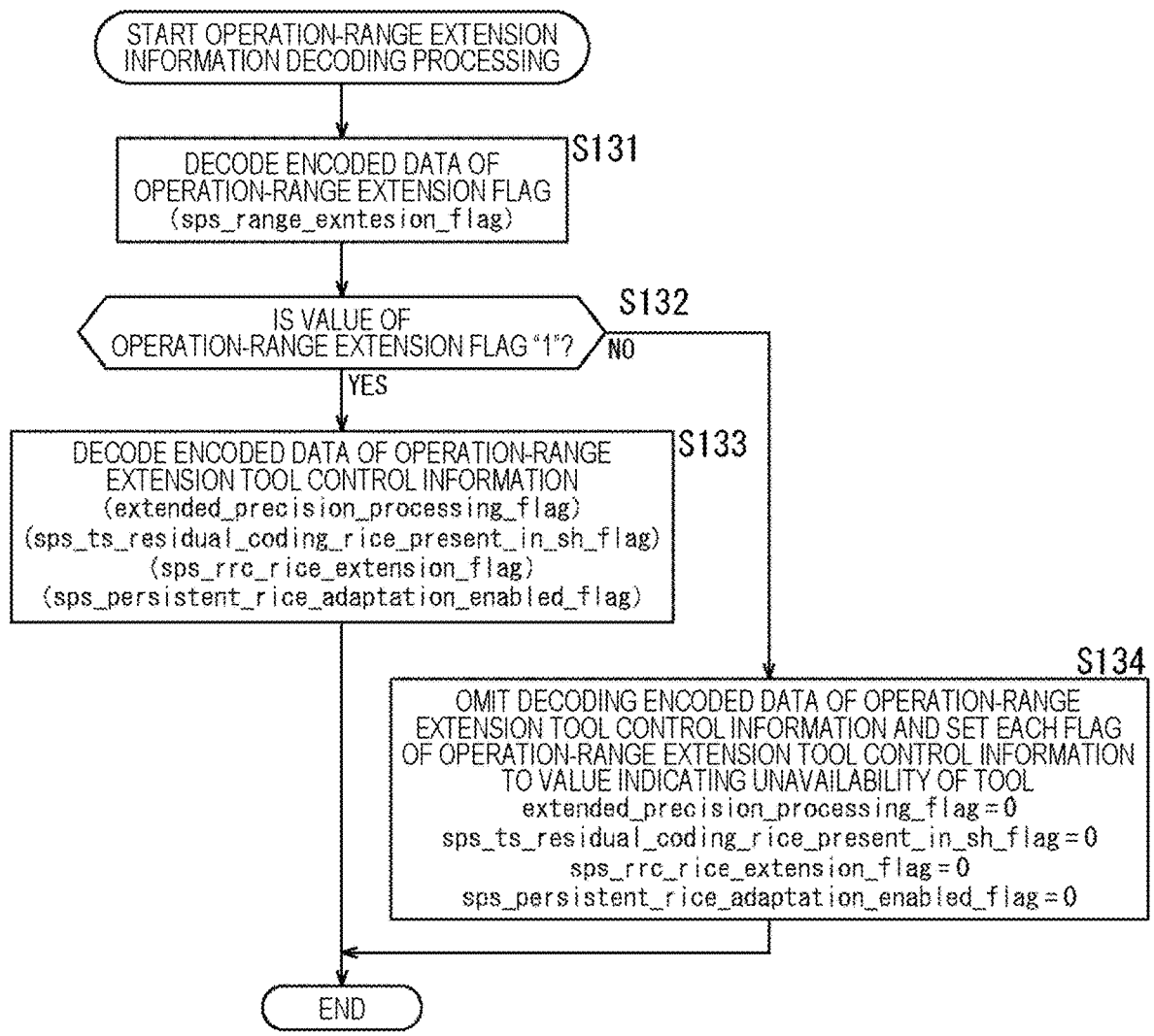
FIG. 11 is a flowchart illustrating an example of the flow of the operation-range extension information decoding processing.

When the operation-range extension information decoding processing is started, the operation-range extension flag decoding unit 211 decodes the encoded data of the operation-range extension flag (sps_range_extension_flag) and generates (restores) the operation-range extension flag in step S131 of FIG. 11.

In step S132, the operation-range extension tool control information decoding unit 212 determines whether or not the operation-range extension flag is true (e.g., "1").

In a case where it is determined that the operation-range extension flag is true, the procedure proceeds to step S133. In step S133, the operation-range extension tool control information decoding unit 212 decodes the encoded data of the operation-range extension tool control information (sps_range_extension( )). When the processing in step S133 ends, the operation-range extension information decoding processing ends.

Furthermore, in a case where it is determined in step S132 that the operation-range extension flag is false (e.g., "0"), the procedure proceeds to step S134. As described with reference to the flowchart in FIG. 9, in a case where the operation-range extension flag is false, the operation-range extension tool control information is not transmitted (not encoded). Therefore, in step S134, the operation-range extension tool control information decoding unit 212 skips (omits) decoding the operation-range extension tool control information. Then, the operation-range extension tool control information decoding unit 212 sets (each control flag of) the operation-range extension tool control information to a value indicating the unavailability of the operation-range extension tool. When the processing in step S134 ends, the operation-range extension information decoding processing ends.

By executing each processing as described above, the operation-range extension information decoding device 200 can correctly decode the encoded data of the operation-range extension information generated by the operation-range extension information encoding device 100. That is, the decoder can use the encoding tool for bit-depth extension while maintaining compatibility with the specification that does not extend the bit depth of the image.

<Method 1-1>

Note that, from the viewpoint of the decoder, there may be a case where a bitstream that violates the above-described constraint is input. Therefore, as illustrated in the third row from the top of the table in FIG. 5, it may be checked for a constraint violation in the bitstream during decoding (Method 1-1). Then, the decoder may decode the bitstream only in a case where there is no constraint violation in the bitstream, and may end or suspend decoding (further perform notification, etc.) in a case where there is a constraint violation. In this manner, the decoder can prevent the decoding of an invalid bitstream and can more safely decode the bitstream (prevent the occurrence of failure, etc.).

Another Example of Operation-Range Extension Information Decoding Device

Figure 12:
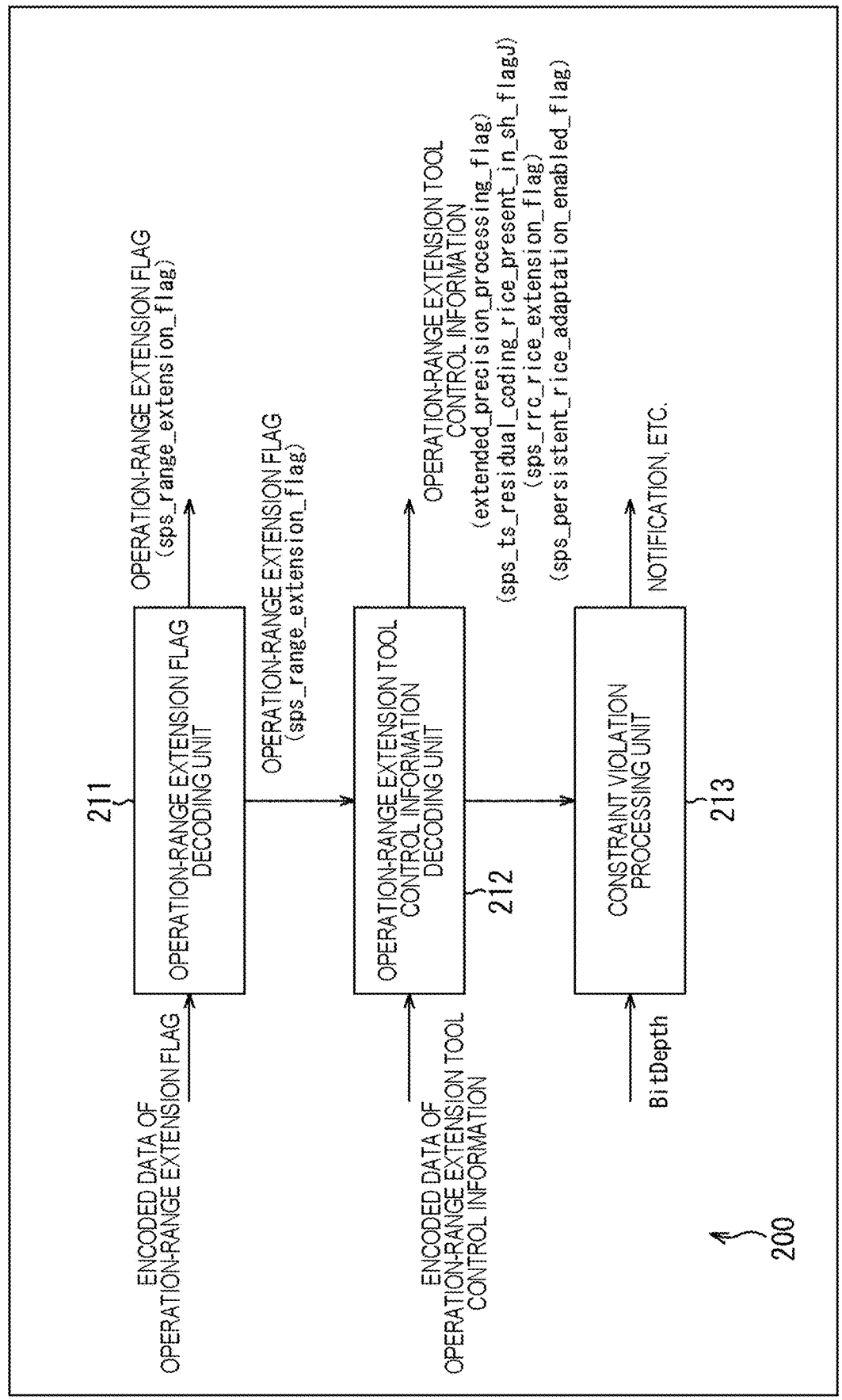
FIG. 12 is a block diagram illustrating an example of the main configuration of the operation-range extension information decoding device.

FIG. 12 is a block diagram illustrating an example of the main configuration of the operation-range extension information decoding device 200 in that case. Also in this case, the operation-range extension information decoding device 200 acquires and decodes the encoded data of the operation-range extension information generated by the operation-range extension information encoding device 100. The operation-range extension information decoding device 200 appropriately outputs the operation-range extension information as a processing result. The operation-range extension information is supplied to, for example, a decoder that decodes encoded data of an image. The decoder decodes the encoded data on the basis of the operation-range extension information and generates (restores) an image.

As illustrated in FIG. 12, the operation-range extension information decoding device 200 in this case includes a constraint violation processing unit 213 in addition to the configuration (operation-range extension flag decoding unit 211 and operation-range extension tool control information decoding unit 212) described with reference to FIG. 10.

The operation-range extension flag decoding unit 211 and the operation-range extension tool control information decoding unit 212 in this case each execute processing as in the case of FIG. 10. For example, the operation-range extension flag decoding unit 211 decodes the encoded data of the operation-range extension flag (sps_range_extension_flag). Furthermore, the operation-range extension tool control information decoding unit 212 decodes the encoded data of the operation-range extension tool control information (sps_range_extension( )) in accordance with the operation-range extension flag. For example, in a case where the operation-range extension flag is false, the operation-range extension tool control information decoding unit 212 may skip decoding the encoded data of the operation-range extension tool control information and set the operation-range extension tool control information to a value indicating the unavailability of the operation-range extension tool.

However, in a case where the operation-range extension flag is true (e.g., "1"), the operation-range extension tool control information decoding unit 212 may control the constraint violation processing unit 213 so as to determine whether or not there is a constraint violation in the bitstream. Furthermore, the operation-range extension tool control information decoding unit 212 may acquire the determination result. Moreover, the operation-range extension tool control information decoding unit 212 may decode the encoded data of the operation-range extension tool control information on the basis of the determination result.

For example, in a case where it is determined that there is no constraint violation in the bitstream, the operation-range extension tool control information decoding unit 212 may decode the encoded data of the operation-range extension tool control information. Furthermore, in a case where it is determined that there is a constraint violation in the bitstream, the operation-range extension tool control information decoding unit 212 may skip (omit) the decoding. Also, in that case, the operation-range extension tool control information decoding unit 212 may end or suspend the decoding of the bitstream by the decoder.

The constraint violation processing unit 213 performs processing related to the bitstream constraint. For example, the constraint violation processing unit 213 acquires the parameter (BitDepth) indicating the bit depth of the image. Furthermore, the constraint violation processing unit 213 may check whether there is a constraint violation in the bitstream under the control of the operation-range extension tool control information decoding unit 212. That is, the constraint violation processing unit 213 can also be referred to as a checking unit.

For example, in a case where the operation-range extension flag is true, the constraint violation processing unit 213 checks whether there is a constraint violation in the bitstream. As the checking as to whether there is a constraint violation in the bitstream, the constraint violation processing unit 213 may check whether the bit depth of the image has been extended in the bitstream. For example, the constraint violation processing unit 213 may check whether the bit depth of the image is greater than 10 bits in the bitstream.

The constraint violation processing unit 213 may supply the checking result (determination result as to whether or not there is a constraint violation in the bitstream) obtained as described above to the operation-range extension tool control information decoding unit 212. Furthermore, in a case where it is determined that there is a constraint violation in the bitstream, the constraint violation processing unit 213 may provide notification that the bitstream does not satisfy the constraint. For example, the constraint violation processing unit 213 may notify the user, the application, or the like of the fact.

Note that, also in this case, the operation-range extension tool control information (sps_range_extension( )) may include a control flag (extended_precision_processing_flag) related to the extension of the internal calculation precision of the orthogonal transform. In this case, the operation-range extension tool control information decoding unit 212 may set the internal variable (ExtendedPrecisionFlag) related to the extension of the internal calculation precision of the orthogonal transform to the value of the control flag (extended_precision_processing_flag) related to the extension of the internal calculation precision of the orthogonal transform. That is, as described with reference to FIG. 7, the value of the internal variable (ExtendedPrecisionFlag) may be made equal to the value of the control flag (extended_precision_processing_flag).

Furthermore, the operation-range extension tool control information (sps_range_extension( )) may include a control flag (sps_ts_residual_coding_rice_present_in_sh_flag) related to the extension of the Rice parameter of TSRC. Also, the operation-range extension tool control information (sps_range_extension( )) may include a control flag (sps_rrc_rice_extension_flag, sps_persistent_rice_adaptation_enabled_flag) related to the extension of the Rice parameter of regular residual coding (RRC).

With such a configuration, the operation-range extension information decoding device 200 can prevent the decoding of an invalid bitstream. As a result, the decoder can decode the bitstream more safely (prevent the occurrence of failure, etc.).

Another Example of Flow of Operation-Range Extension Information Decoding Processing An example of the flow of the operation-range extension information decoding processing executed by the operation-range extension information decoding device 200 illustrated in FIG. 12 will be described with reference to a flowchart in FIG. 13.

In the operation-range extension information decoding processing, the operation-range extension information decoding device 200 decodes the encoded data of the operation-range extension flag, and decodes the encoded data of the operation-range extension tool control information in accordance with the operation-range extension flag.

Figure 13:
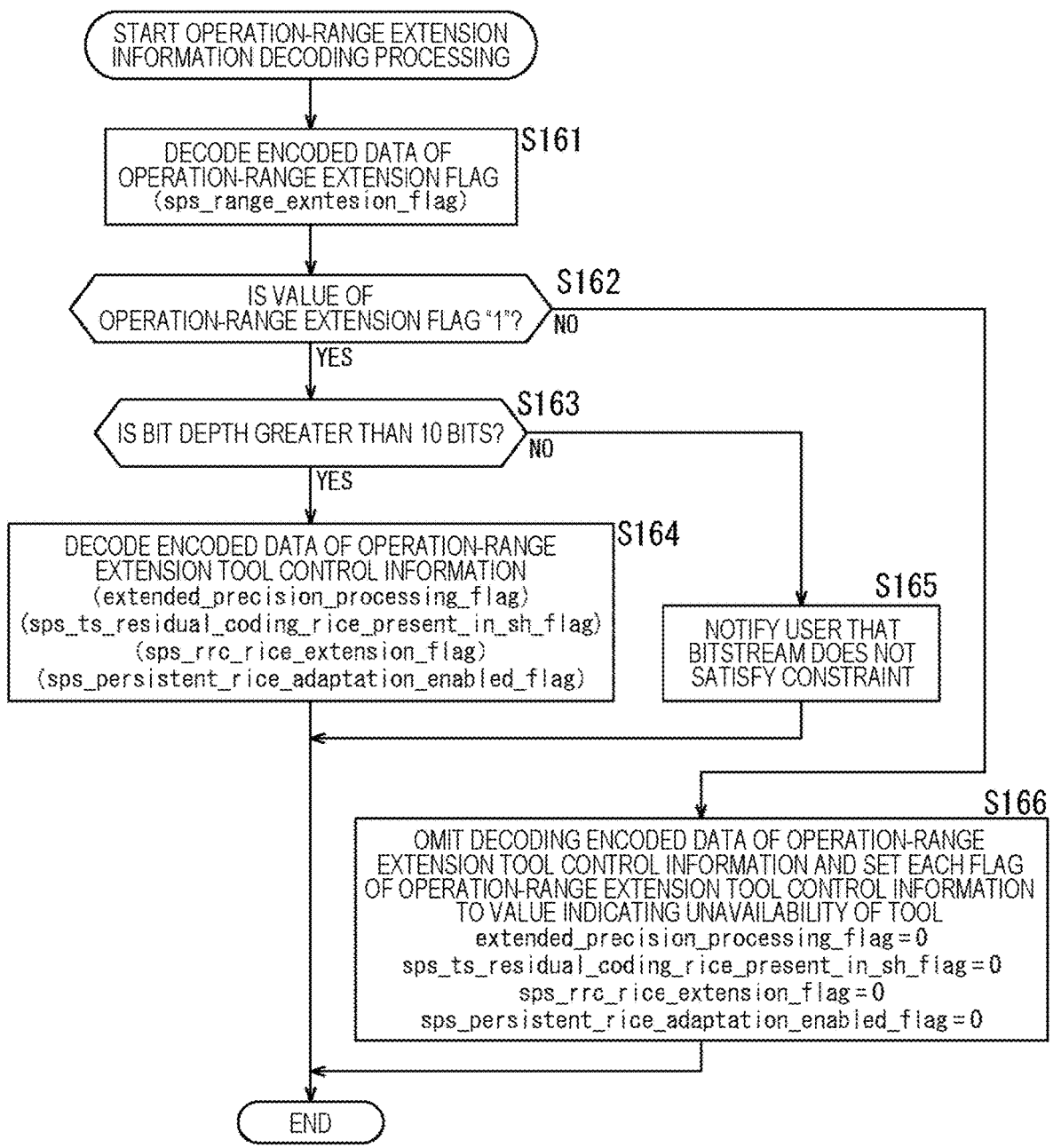
FIG. 13 is a flowchart illustrating an example of the flow of the operation-range extension information decoding processing.

When the operation-range extension information decoding processing is started, in step S161 of FIG. 13, the operation-range extension flag decoding unit 211 decodes the encoded data of the operation-range extension flag (sps_range_extension_flag).

In step S162, the operation-range extension tool control information decoding unit 212 determines whether or not the operation-range extension flag is true (e.g., "1"). In a case where it is determined that the operation-range extension flag is true, the procedure proceeds to step S163.

In a case where the operation-range extension flag is true, the constraint violation processing unit 213 may check whether or not there is a constraint violation in the bitstream. For example, the constraint violation processing unit 213 may check whether or not the bit depth of the image is extended in the bitstream. For example, the constraint violation processing unit 213 may check whether or not the bit depth of the image is greater than 10 bits in the bitstream. For example, in step S163, the constraint violation processing unit 213 determines whether or not the bit depth of the image is greater than 10 bits. In a case where it is determined that the bit depth of the image is greater than 10 bits, the procedure proceeds to step S164.

That the operation-range extension flag is true and the bit depth of the image is greater than 10 bits does not violate the constraint described with reference to FIG. 6. As described above, in a case where there is no constraint violation in the bitstream, the operation-range extension tool control information decoding unit 212 may decode the encoded data of the operation-range extension tool control information. For example, in step S164, the operation-range extension tool control information decoding unit 212 decodes the encoded data of the operation-range extension tool control information and generates (restores) the operation-range extension tool control information. When the processing in step S164 ends, the operation-range extension information decoding processing ends.

Furthermore, in a case where it is determined in step S163 that the bit depth of the image is 10 bits or less, the procedure proceeds to step S165. That the operation-range extension flag is true and the bit depth of the image is 10 bits or less violates the constraint described with reference to FIG. 6. In a case where there is a constraint violation in the bitstream as described above, the constraint violation processing unit 213 may provide notification that the bitstream does not satisfy the constraint. For example, in step S165, the constraint violation processing unit 213 notifies the user (or application, etc.) that the bitstream does not satisfy the constraint. When the processing in step S165 ends, the operation-range extension information decoding processing ends.

Furthermore, in a case where it is determined in step S162 that the operation-range extension flag is false, the procedure proceeds to step S166. In this case, the operation-range extension tool control information decoding unit 212 may skip decoding the encoded data of the operation-range extension tool control information and set the operation-range extension tool control information to a value indicating the unavailability of the operation-range extension tool. For example, in step S166, the operation-range extension tool control information decoding unit 212 omits the decoding of the encoded data of the operation-range extension tool control information, and sets each control flag of the operation-range extension tool control information to a value indicating the unavailability of the tool. When the processing in step S166 ends, the operation-range extension information decoding processing ends.

By executing each processing in this manner, the operation-range extension information decoding device 200 can prevent the decoding of an invalid bitstream. As a result, the decoder can decode the bitstream more safely (prevent the occurrence of failure, etc.).

4. Control of Value of Operation-Range Extension Tool Control Information

<Method 2>

For example, as illustrated in the fourth row from the top of the table in FIG. 5, the value of the operation-range extension tool control information may be controlled on the basis of the bit depth (method 2). FIGS. 14 and 15 are diagrams illustrating examples of semantics in that case. As illustrated in a square frame 251 in FIG. 14, it has been set as the bitstream constraint that in a case where the bit depth (BitDepth) of the image is 10 bits or less, the value of extended_precision_processing_flag is equal to false (e.g., "0"). Furthermore, as illustrated in a square frame 253 in FIG. 14, it has been set as the bitstream constraint that in a case where the bit depth (BitDepth) of the image is 10 bits or less, the value of sps_ts_residual_coding_rice_present_in_sh_flag is equal to false (e.g., "0"). Also, as illustrated in a square frame 254 in FIG. 15, it has been set as the bitstream constraint that in a case where the bit depth (BitDepth) of the image is 10 bits or less, the value of sps_rrc_rice_extension_flag is equal to false (e.g., "0"). Furthermore, as illustrated in a square frame 255 in FIG. 15, it has been set as the bitstream constraint that in a case where the bit depth (BitDepth) of the image is 10 bits or less, the value of sps_persistent_rice_adaptation_enabled_flag is equal to false (e.g., "0").

By complying with such a constraint, (the encoded data of) the operation-range extension tool control information is not stored in the bitstream in a case where the operation range is not extended. Thus, the bitstream can maintain compatibility with the image encoding methods described in Non-Patent Documents 1 and 2. Therefore, even a decoder that does not support the extension of the operation range can correctly decode the bitstream. That is, it is possible to use the encoding tool for bit-depth extension while maintaining compatibility with the specification that does not extend a bit depth of an image.

Furthermore, as illustrated in a square frame 252 in FIG. 14, the internal variable (ExtendedPrecisionFlag) related to the extension of the internal calculation precision of the orthogonal transform may be set to the value of the control flag (extended_precision_processing_flag) related to the extension of the internal calculation precision of the orthogonal transform. That is, the value of the internal variable (ExtendedPrecisionFlag) may be equal to the value of the control flag (extended_precision_processing_flag). That is, in this case, control based on the bit depth (BitDepth) of the image is unnecessary for setting the value of the internal variable (ExtendedPrecisionFlag).

<Operation-Range Extension Information Encoding Device>

FIG. 16 is a block diagram illustrating an example of the main configuration of the operation-range extension information encoding device 100 in this case. Also in this case, the operation-range extension information encoding device 100 is a device that performs processing related to the encoding of the operation-range extension information. For example, the operation-range extension information encoding device 100 acquires operation-range extension information such as an operation-range extension flag and operation-range extension tool control information. Furthermore, the operation-range extension information encoding device 100 acquires a parameter BitDepth indicating a bit depth of an image. The operation-range extension information encoding device 100 uses these pieces of information to perform processing related to the encoding of the operation-range extension information.

The operation-range extension information encoding device 100 appropriately outputs encoded data of the operation-range extension information and the like as a processing result. The encoded data is supplied to, for example, an encoder that encodes an image. The encoder encodes an image on the basis of the operation-range extension information and generates a bitstream including the encoded data of the image. The encoded data of the operation-range extension information is supplied to the decoding side, for example, by being stored in the bitstream.

Note that, in FIG. 16, main processing units, main data flows, and the like are illustrated, and those illustrated in FIG. 16 are not necessarily all. That is, the operation-range extension information encoding device 100 may include a processing unit not illustrated as a block in FIG. 16. Furthermore, the operation-range extension information encoding device 100 may have processing or a data flow that is not illustrated as an arrow or the like in FIG. 16.

As illustrated in FIG. 16, the operation-range extension information encoding device 100 in this case has a configuration similar to the configuration (operation-range extension flag encoding unit 111 and operation-range extension tool control information encoding unit 112) illustrated in FIG. 8. However, the parameter (BitDepth) indicating the bit depth of the image is supplied to the operation-range extension tool control information encoding unit 112.

Also in this case, the operation-range extension flag encoding unit 111 performs processing related to the encoding of the operation-range extension flag (sps_range_extension_flag). For example, the operation-range extension flag encoding unit 111 may acquire the operation-range extension flag. However, the operation-range extension flag encoding unit 111 encodes the operation-range extension flag regardless of the bit depth of the image. Furthermore, the operation-range extension flag encoding unit 111 may output the encoded data of the operation-range extension flag to the outside of the operation-range extension information encoding device 100 as a processing result. Also, the operation-range extension flag encoding unit 111 may supply the operation-range extension flag to the operation-range extension tool control information encoding unit 112.

Also in this case, the operation-range extension tool control information encoding unit 112 performs processing related to the encoding of the operation-range extension tool control information (sps_range_extension( )). For example, the operation-range extension tool control information encoding unit 112 may acquire the operation-range extension tool control information. Furthermore, the operation-range extension tool control information encoding unit 112 may acquire the operation-range extension flag supplied from the operation-range extension flag encoding unit 111. Moreover, the operation-range extension tool control information encoding unit 112 may acquire the parameter (BitDepth) indicating the bit depth of the image.

The operation-range extension tool control information encoding unit 112 encodes the operation-range extension tool control information in accordance with the bit depth (and the operation-range extension flag) of the image. For example, in a case where the operation-range extension flag is true and the bit depth is not extended, the operation-range extension tool control information encoding unit 112 may set the operation-range extension tool control information to a value indicating the unavailability of the operation-range extension tool, and encode the operation-range extension tool control information. Furthermore, in a case where the operation-range extension flag is true and the bit depth is extended, the operation-range extension tool control information encoding unit 112 may encode the operation-range extension tool control information. For example, in a case where the operation-range extension flag is true and the bit depth of the image is 10 bits or less, the operation-range extension tool control information encoding unit 112 may set the operation-range extension tool control information to a value indicating the unavailability of the operation-range extension tool, and encode the operation-range extension tool control information. Furthermore, in a case where the operation-range extension flag is true and the bit depth of the image is greater than 10 bits, the operation-range extension tool control information encoding unit 112 may encode the operation-range extension tool control information.

Furthermore, in a case where the operation-range extension flag is false, the operation-range extension tool control information encoding unit 112 may skip encoding the operation-range extension tool control information. Also, in that case, the operation-range extension tool control information encoding unit 112 may set the operation-range extension tool control information to a value indicating the unavailability of the operation-range extension tool.

Note that the operation-range extension tool control information (sps_range_extension( )) may include a control flag (extended_precision_processing_flag) related to the extension of the internal calculation precision of the orthogonal transform. In this case, the operation-range extension tool control information encoding unit 112 may set the internal variable (ExtendedPrecisionFlag) related to the extension of the internal calculation precision of the orthogonal transform in the encoder to the value of the control flag (extended_precision_processing_flag) related to the extension of the internal calculation precision of the orthogonal transform. That is, as described with reference to FIG. 14, the value of the internal variable (ExtendedPrecisionFlag) may be equal to the value of the control flag (extended_precision_processing_flag).

Furthermore, the operation-range extension tool control information (sps_range_extension( )) may include a control flag (sps_ts_residual_coding_rice_present_in_sh_flag) related to the extension of the Rice parameter of TSRC. Also, the operation-range extension tool control information (sps_range_extension( )) may include a control flag (sps_rrc_rice_extension_flag, sps_persistent_rice_adaptation_enabled_flag) related to the extension of the Rice parameter of regular residual coding (RRC).

The operation-range extension tool control information encoding unit 112 may output the encoded data of the operation-range extension tool control information to the outside of the operation-range extension information encoding device 100 as a processing result.

With such a configuration, the operation-range extension information encoding device 100 can encode the operation-range extension information in compliance with the constraints illustrated in FIGS. 14 and 15. That is, the operation-range extension information encoding device 100 can generate a bitstream that does not violate the constraints illustrated in FIGS. 14 and 15 by supplying the encoded data of the generated operation-range extension information to the encoder. In other words, the operation-range extension information encoding device 100 can generate a bitstream that maintains compatibility with the image encoding methods described in Non-Patent Documents 1 and 2. That is, the operation-range extension information encoding device 100 encodes the operation-range extension information in this manner, whereby the encoder and the decoder can use an encoding tool for bit-depth extension while maintaining compatibility with a specification that does not extend the bit depth of the image.

<Flow of Operation-Range Extension Information Encoding Processing>

An example of the flow of the operation-range extension information encoding processing executed by the operation-range extension information encoding device 100 of FIG. 16 will be described with reference to a flowchart of FIG. 17.

In the operation-range extension information encoding processing, the operation-range extension information encoding device 100 encodes an operation-range extension flag, and encodes the operation-range extension tool control information in accordance with the bit depth of the image.

Figure 17:
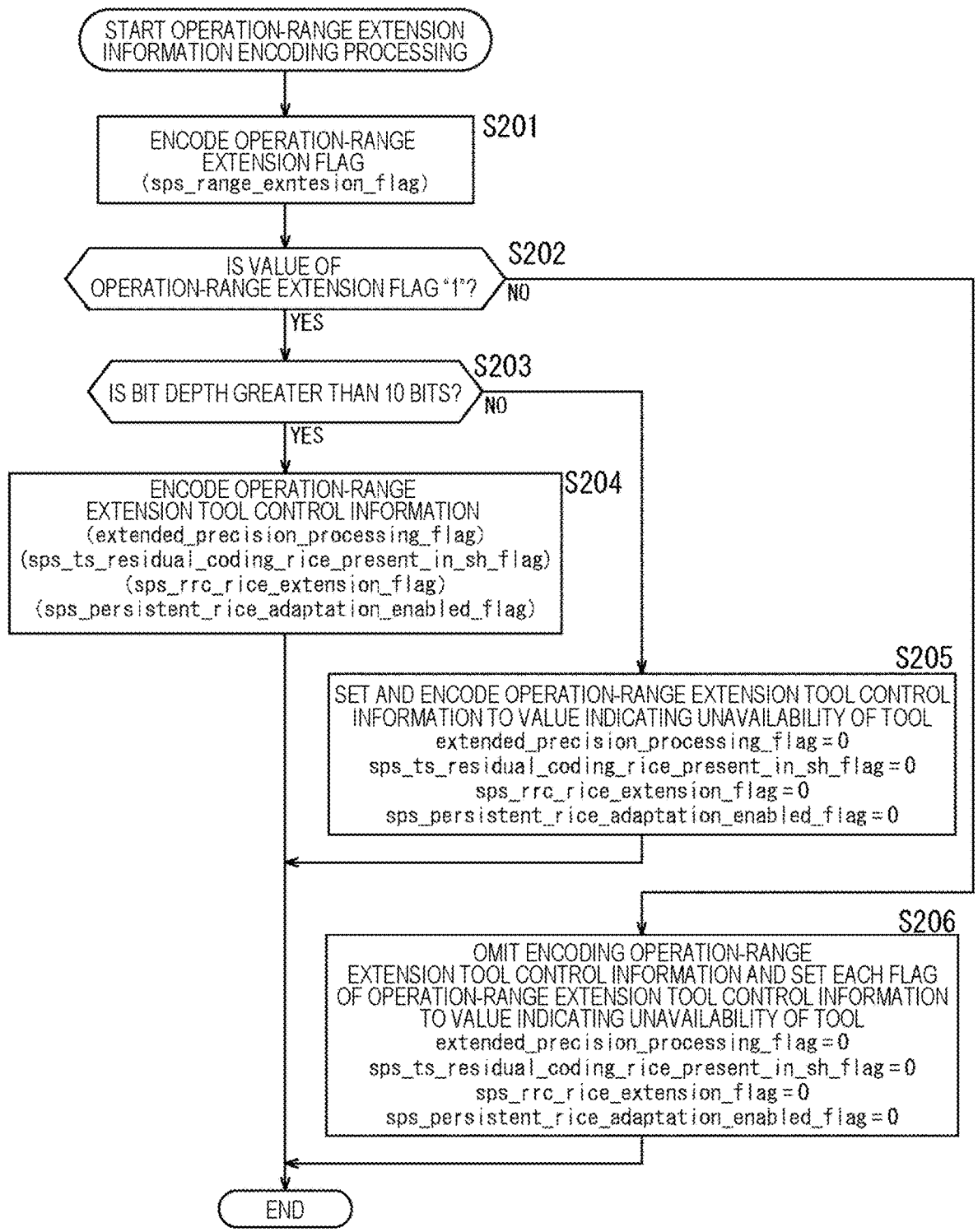
FIG. 17 is a flowchart illustrating an example of the flow of the operation-range extension information encoding processing.

When the operation-range extension information encoding processing is started, in step S201 of FIG. 17, the operation-range extension flag encoding unit 111 encodes an operation-range extension flag (sps_range_extension_flag).

In step S202, the operation-range extension tool control information encoding unit 112 determines whether or not the operation-range extension flag is true (e.g., "1"). In a case where it is determined that the operation-range extension flag is true, the procedure proceeds to step S203.

In that case, when the bit depth of the image is not to be extended, the operation-range extension tool control information encoding unit 112 may set the operation-range extension tool control information to a value indicating the unavailability of the operation-range extension tool, and encode the operation-range extension tool control information. Furthermore, when the bit depth of the image is to be extended, the operation-range extension tool control information encoding unit 112 may encode the operation-range extension tool control information. For example, in a case where the bit depth of the image is 10 bits or less, the operation-range extension tool control information encoding unit 112 may set the operation-range extension tool control information to a value indicating the unavailability of the operation-range extension tool, and encode the operation-range extension tool control information. Furthermore, in a case where the bit depth of the image is greater than 10 bits, the operation-range extension tool control information encoding unit 112 may encode the operation-range extension tool control information.

In step S203, the operation-range extension tool control information encoding unit 112 determines whether or not the bit depth (BitDepth) of the image is greater than 10 bits. In a case where it is determined that the bit depth (BitDepth) of the image is greater than 10 bits, the procedure proceeds to step S204. In step S204, the operation-range extension tool control information encoding unit 112 encodes the operation-range extension tool control information. When the processing in step S204 ends, the operation-range extension information encoding processing ends.

Furthermore, in a case where it is determined in step S203 that the bit depth (BitDepth) of the image is 10 bits or less, the procedure proceeds to step S205. In step S205, the operation-range extension tool control information encoding unit 112 sets (each control flag of) the operation-range extension tool control information to a value indicating the unavailability of the operation-range extension tool, and encodes the operation-range extension tool control information. When the processing in step S205 ends, the operation-range extension information encoding processing ends.

Furthermore, in a case where it is determined in step S202 that the operation-range extension flag is false, the procedure proceeds to step S206. In step S206, the operation-range extension tool control information encoding unit 112 skips encoding the operation-range extension tool control information. Furthermore, the operation-range extension tool control information encoding unit 112 sets (each control flag of) the operation-range extension tool control information to a value indicating the unavailability of the operation-range extension tool. When the processing in step S206 ends, the operation-range extension information encoding processing ends.

By executing each processing as described above, the operation-range extension information encoding device 100 can encode the operation-range extension information in compliance with the constraints illustrated in FIGS. 14 and 15. That is, the operation-range extension information encoding device 100 can generate a bitstream that does not violate the constraints illustrated in FIGS. 14 and 15 by supplying the encoded data of the generated operation-range extension information to the encoder. Therefore, the encoder and the decoder can use the encoding tool for bit-depth extension while maintaining compatibility with the specification that does not extend the bit depth of the image.

<Operation-Range Extension Information Decoding Device>

The main configuration of the operation-range extension information decoding device 200 that acquires and decodes the encoded data of the operation-range extension information (the operation-range extension flag, the operation-range extension tool control information, etc.) generated by the operation-range extension information encoding device 100 of FIG. 16 is similar to the example described with reference to FIG. 10. Therefore, its description is omitted.

<Flow of Operation-Range Extension Information Decoding Processing>

Furthermore, the operation-range extension information decoding processing executed by the operation-range extension information decoding device 200 is executed by a flow similar to the example described with reference to the flowchart of FIG. 11. Therefore, its description is omitted.

<Method 2-1>

Note that, from the viewpoint of the decoder, there may be a case where a bitstream that violates the above-described constraint is input. Therefore, as illustrated in the fifth row from the top of the table in FIG. 5, it may be checked for a constraint violation in the bitstream during decoding (Method 2-1). Then, the decoder may decode the bitstream only in a case where there is no constraint violation in the bitstream, and may end or suspend decoding (further perform notification, etc.) in a case where there is a constraint violation. In this manner, the decoder can prevent the decoding of an invalid bitstream and can more safely decode the bitstream (prevent the occurrence of failure, etc.).

Another Example of Operation-Range Extension Information Decoding Device

The operation-range extension information decoding device 200 in this case has a configuration similar to that of the example described with reference to FIG. 12. That is, the operation-range extension information decoding device 200 includes the operation-range extension flag decoding unit 211, the operation-range extension tool control information decoding unit 212, and the constraint violation processing unit 213.

The operation-range extension flag decoding unit 211 in this case decodes the encoded data of the operation-range extension flag (sps_range_extension_flag). Furthermore, the operation-range extension tool control information decoding unit 212 decodes the encoded data of the operation-range extension tool control information (sps_range_extension( )) in accordance with the operation-range extension flag. For example, in a case where the operation-range extension flag is false, the operation-range extension tool control information decoding unit 212 may skip decoding the encoded data of the operation-range extension tool control information and set the operation-range extension tool control information to a value indicating the unavailability of the operation-range extension tool.

On the other hand, in a case where the operation-range extension flag is true, the operation-range extension tool control information decoding unit 212 may decode the encoded data of the operation-range extension tool control information. Then, the operation-range extension tool control information decoding unit 212 may control the constraint violation processing unit 213 so as to determine whether or not there is a constraint violation in the bitstream. That is, the constraint violation processing unit 213 may check whether or not there is a constraint violation in the bitstream.

For example, the constraint violation processing unit 213 may check whether the bit depth of the image has not been extended in the bitstream and whether the operation-range extension tool control information is not a value indicating the unavailability of the operation-range extension tool. For example, the constraint violation processing unit 213 may check whether the bit depth is 10 bits or less in the bitstream and whether the operation-range extension tool control information is not a value indicating the unavailability of the operation-range extension tool. Then, in a case where there is a constraint violation in the bitstream, the constraint violation processing unit 213 may provide notification that the bitstream does not satisfy the constraint. For example, the constraint violation processing unit 213 may notify the user, the application, or the like of the fact.

Note that, also in this case, the operation-range extension tool control information (sps_range_extension( )) may include a control flag (extended_precision_processing_flag) related to the extension of the internal calculation precision of the orthogonal transform. In this case, the operation-range extension tool control information decoding unit 212 may set the internal variable (ExtendedPrecisionFlag) related to the extension of the internal calculation precision of the orthogonal transform to the value of the control flag (extended_precision_processing_flag) related to the extension of the internal calculation precision of the orthogonal transform. That is, as described with reference to FIG. 7, the value of the internal variable (ExtendedPrecisionFlag) may be made equal to the value of the control flag (extended_precision_processing_flag).

Furthermore, the operation-range extension tool control information (sps_range_extension( )) may include a control flag (sps_ts_residual_coding_rice_present_in_sh_flag) related to the extension of the Rice parameter of TSRC. Also, the operation-range extension tool control information (sps_range_extension( )) may include a control flag (sps_rrc_rice_extension_flag, sps_persistent_rice_adaptation_enabled_flag) related to the extension of the Rice parameter of regular residual coding (RRC).

With such a configuration, the operation-range extension information decoding device 200 can prevent the decoding of an invalid bitstream. As a result, the decoder can decode the bitstream more safely (prevent the occurrence of failure, etc.).

Another Example of Flow of Operation-Range Extension Information Decoding Processing An example of the flow of the operation-range extension information decoding processing executed by the operation-range extension information decoding device 200 (FIG. 12) in this case will be described with reference to a flowchart in FIG. 18.

In the operation-range extension information decoding processing, the operation-range extension information decoding device 200 decodes the encoded data of the operation-range extension flag, and decodes the encoded data of the operation-range extension tool control information in accordance with the operation-range extension flag.

Figure 18:
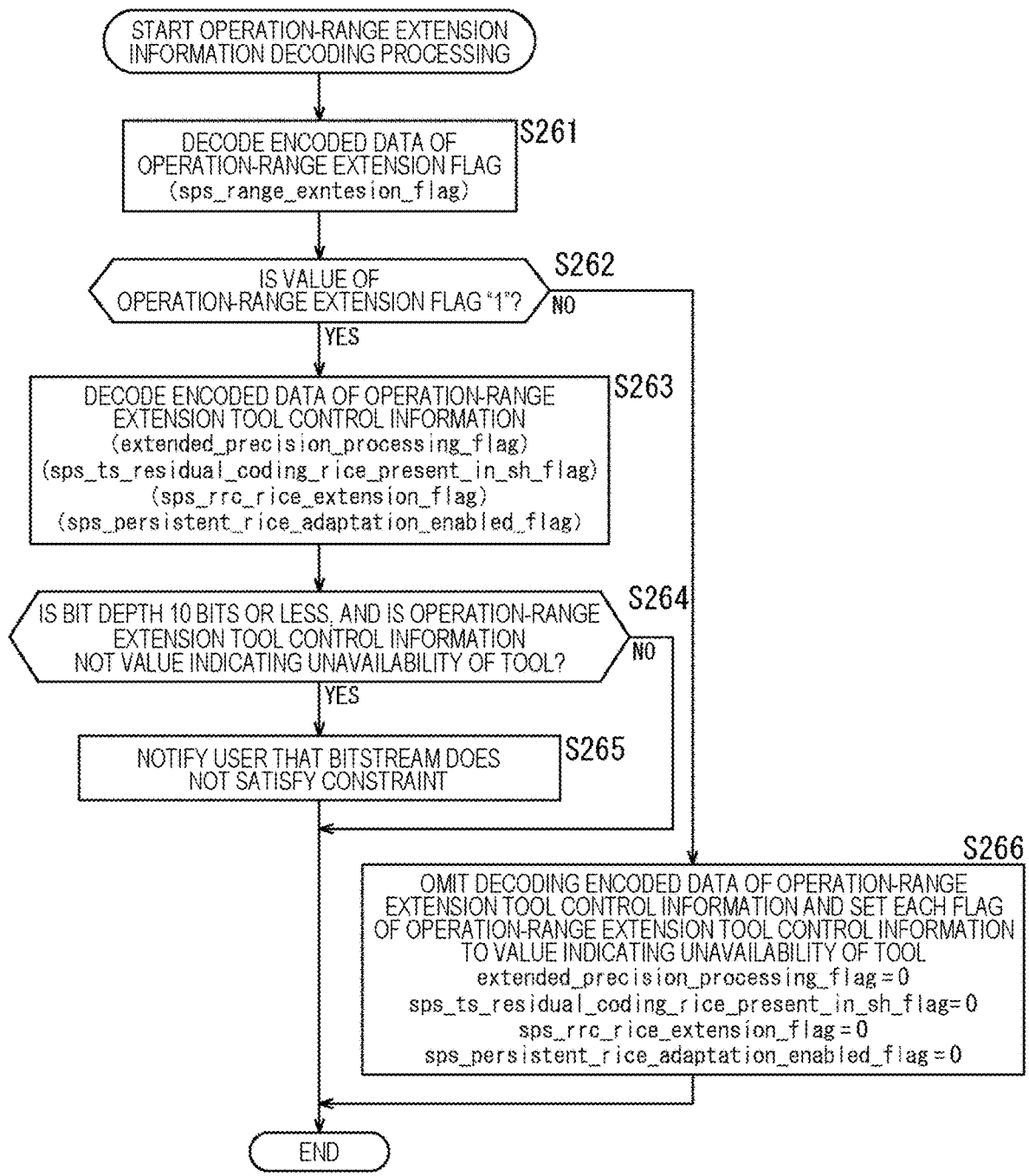
FIG. 18 is a flowchart illustrating an example of the flow of the operation-range extension information decoding processing.

When the operation-range extension information decoding processing is started, in step S261 of FIG. 18, the operation-range extension flag decoding unit 211 decodes the encoded data of the operation-range extension flag (sps_range_extension_flag).

In step S262, the operation-range extension tool control information decoding unit 212 determines whether or not the operation-range extension flag is true (e.g., "1"). In a case where it is determined that the operation-range extension flag is true, the procedure proceeds to step S263. In step S263, the operation-range extension tool control information decoding unit 212 decodes the encoded data of the operation-range extension tool control information, and generates (restores) the operation-range extension tool control information.

In this case, the constraint violation processing unit 213 may check whether there is a constraint violation in the bitstream by using the operation-range extension tool control information. For example, the constraint violation processing unit 213 may check whether the bit depth of the image has not been extended in the bitstream and whether the operation-range extension tool control information is not a value indicating the unavailability of the operation-range extension tool. Furthermore, the constraint violation processing unit 213 may check whether the bit depth is 10 bits or less in the bitstream and whether the operation-range extension tool control information is not a value indicating the unavailability of the operation-range extension tool. Then, in a case where there is a constraint violation in the bitstream, the constraint violation processing unit 213 may provide notification that the bitstream does not satisfy the constraint. For example, the constraint violation processing unit 213 may notify the user, the application, or the like of the fact.

For example, in step S264, the constraint violation processing unit 213 determines whether the bit depth is 10 bits or less in the bitstream and whether the operation-range extension tool control information is not a value indicating the unavailability of the operation-range extension tool. In a case where it is determined that the bit depth is 10 bits or less in the bitstream and the operation-range extension tool control information is not a value indicating the unavailability of the operation-range extension tool, the procedure proceeds to step S265. In step S265, the constraint violation processing unit 213 notifies the user (or application, etc.) that the bitstream does not satisfy the constraint. When the processing in step S265 ends, the operation-range extension information decoding processing ends.

Furthermore, in a case where it is determined in step S264 that the bit depth is greater than 10 bits in the bitstream or the operation-range extension tool control information is a value indicating the unavailability of the operation-range extension tool, the processing of step S265 is omitted, and the operation-range extension information decoding processing ends.

Note that in a case where it is determined in step S262 that the operation-range extension flag is false, the procedure proceeds to step S266. In this case, the operation-range extension tool control information decoding unit 212 may skip decoding the encoded data of the operation-range extension tool control information and set the operation-range extension tool control information to a value indicating the unavailability of the operation-range extension tool. For example, in step S266, the operation-range extension tool control information decoding unit 212 omits the decoding of the encoded data of the operation-range extension tool control information, and sets each control flag of the operation-range extension tool control information to a value indicating the unavailability of the tool. When the processing in step S266 ends, the operation-range extension information decoding processing ends.

By executing each processing in this manner, the operation-range extension information decoding device 200 can prevent the decoding of an invalid bitstream. As a result, the decoder can decode the bitstream more safely (prevent the occurrence of failure, etc.).

5. Transmission Control of Operation-Range Extension Tool Control Information

<Method 3>

For example, as illustrated in the bottom row of the table in FIG. 5, the transmission of the operation-range extension tool control information may be controlled on the basis of the bit depth (method 3). FIG. 19 is a diagram illustrating an example of syntax related to the operation-range extension tool control information in that case. In this case, compared to the example of FIG. 3, a row indicated by gray is added. That is, an if statement with a bit depth as a condition is added. That is, each control flag of the operation-range extension tool control information (sps_range_extension( )) is encoded and transmitted only in a case where the bit depth of the image is greater than 10 bits.

By controlling the transmission of the operation-range extension tool control information in this manner, (the encoded data of) the operation-range extension tool control information is not stored in the bitstream in a case where the operation range is not extended. Thus, the bitstream can maintain compatibility with the image encoding methods described in Non-Patent Documents 1 and 2. Therefore, even a decoder that does not support the extension of the operation range can correctly decode the bitstream. That is, it is possible to use the encoding tool for bit-depth extension while maintaining compatibility with the specification that does not extend a bit depth of an image. Furthermore, in this manner, in a case where the bit depth of the image is not extended (in a case where the bit depth is 10 bits or less), the transmission of the control flag of the encoding tool for high bit depth and high bit rate in the parameter set can be omitted. This can reduce an increase in the code amount.

<Operation-Range Extension Information Encoding Device>

Also in this case, the operation-range extension information encoding device 100 is a device that performs processing related to the encoding of the operation-range extension information. For example, the operation-range extension information encoding device 100 acquires operation-range extension information such as an operation-range extension flag and operation-range extension tool control information. Furthermore, the operation-range extension information encoding device 100 acquires a parameter BitDepth indicating a bit depth of an image. The operation-range extension information encoding device 100 uses these pieces of information to perform processing related to the encoding of the operation-range extension information.

The operation-range extension information encoding device 100 appropriately outputs encoded data of the operation-range extension information and the like as a processing result. The encoded data is supplied to, for example, an encoder that encodes an image. The encoder encodes an image on the basis of the operation-range extension information and generates a bitstream including the encoded data of the image. The encoded data of the operation-range extension information is supplied to the decoding side, for example, by being stored in the bitstream.

The main configuration of the operation-range extension information encoding device 100 in this case is similar to the example described with reference to FIG. 16. That is, the operation-range extension information encoding device 100 in this case includes the operation-range extension flag encoding unit 111 and the operation-range extension tool control information encoding unit 112.

Also in this case, the operation-range extension flag encoding unit 111 encodes the operation-range extension flag regardless of the bit depth of the image. However, the operation-range extension tool control information encoding unit 112 encodes the operation-range extension tool control information in accordance with the operation-range extension flag and the bit depth of the image. For example, in a case where the operation-range extension flag is false or the bit depth is not extended, the operation-range extension tool control information encoding unit 112 may skip (omit) encoding the operation-range extension tool control information. Furthermore, in a case where the operation-range extension flag is true and the bit depth is extended, the operation-range extension tool control information encoding unit 112 may encode the operation-range extension tool control information. For example, in a case where the operation-range extension flag is false or the bit depth of the image is 10 bits or less, the operation-range extension tool control information encoding unit 112 may skip (omit) encoding the operation-range extension tool control information. Furthermore, in a case where the operation-range extension flag is true and the bit depth of the image is greater than 10 bits, the operation-range extension tool control information encoding unit 112 may encode the operation-range extension tool control information.

Furthermore, in a case where the operation-range extension flag is false or the bit depth of the image is not extended, the operation-range extension tool control information encoding unit 112 may further set the operation-range extension tool control information to a value indicating the unavailability of the operation-range extension tool. Furthermore, in a case where the operation-range extension flag is false or the bit depth of the image is 10 bits or less, the operation-range extension tool control information encoding unit 112 may further set the operation-range extension tool control information to a value indicating the unavailability of the operation-range extension tool.

Note that the operation-range extension tool control information (sps_range_extension( )) may include a control flag (extended_precision_processing_flag) related to the extension of the internal calculation precision of the orthogonal transform. In this case, the operation-range extension tool control information encoding unit 112 may set the internal variable (ExtendedPrecisionFlag) related to the extension of the internal calculation precision of the orthogonal transform in the encoder to the value of the control flag (extended_precision_processing_flag) related to the extension of the internal calculation precision of the orthogonal transform. That is, as described with reference to FIG. 14, the value of the internal variable (ExtendedPrecisionFlag) may be equal to the value of the control flag (extended_precision_processing_flag).

Furthermore, the operation-range extension tool control information (sps_range_extension( )) may include a control flag (sps_ts_residual_coding_rice_present_in_sh_flag) related to the extension of the Rice parameter of TSRC. Also, the operation-range extension tool control information (sps_range_extension( )) may include a control flag (sps_rrc_rice_extension_flag, sps_persistent_rice_adaptation_enabled_flag) related to the extension of the Rice parameter of regular residual coding (RRC).

The operation-range extension tool control information encoding unit 112 may output the encoded data of the operation-range extension tool control information to the outside of the operation-range extension information encoding device 100 as a processing result.

With such a configuration, the operation-range extension information encoding device 100 can prevent (the encoded data of) the operation-range extension tool control information from being stored in the bitstream in a case where the operation range is not extended. Thus, the bitstream can maintain compatibility with the image encoding methods described in Non-Patent Documents 1 and 2. Therefore, even a decoder that does not support the extension of the operation range can correctly decode the bitstream. Therefore, the encoder and the decoder can use the encoding tool for bit-depth extension while maintaining compatibility with the specification that does not extend the bit depth of the image. Furthermore, in this manner, in a case where the bit depth of the image is not extended (in a case where the bit depth is 10 bits or less), the transmission of the control flag of the encoding tool for high bit depth and high bit rate in the parameter set can be omitted. This can reduce an increase in the code amount.

Another Example of Flow of Operation-Range Extension Information Encoding Processing An example of the flow of the operation-range extension information encoding processing executed by the operation-range extension information encoding device 100 in this case will be described with reference to a flowchart in FIG. 20.

In the operation-range extension information encoding processing, the operation-range extension information encoding device 100 encodes the operation-range extension flag, and encodes the operation-range extension tool control information in accordance with the operation-range extension flag and the bit depth of the image.

Figure 20:
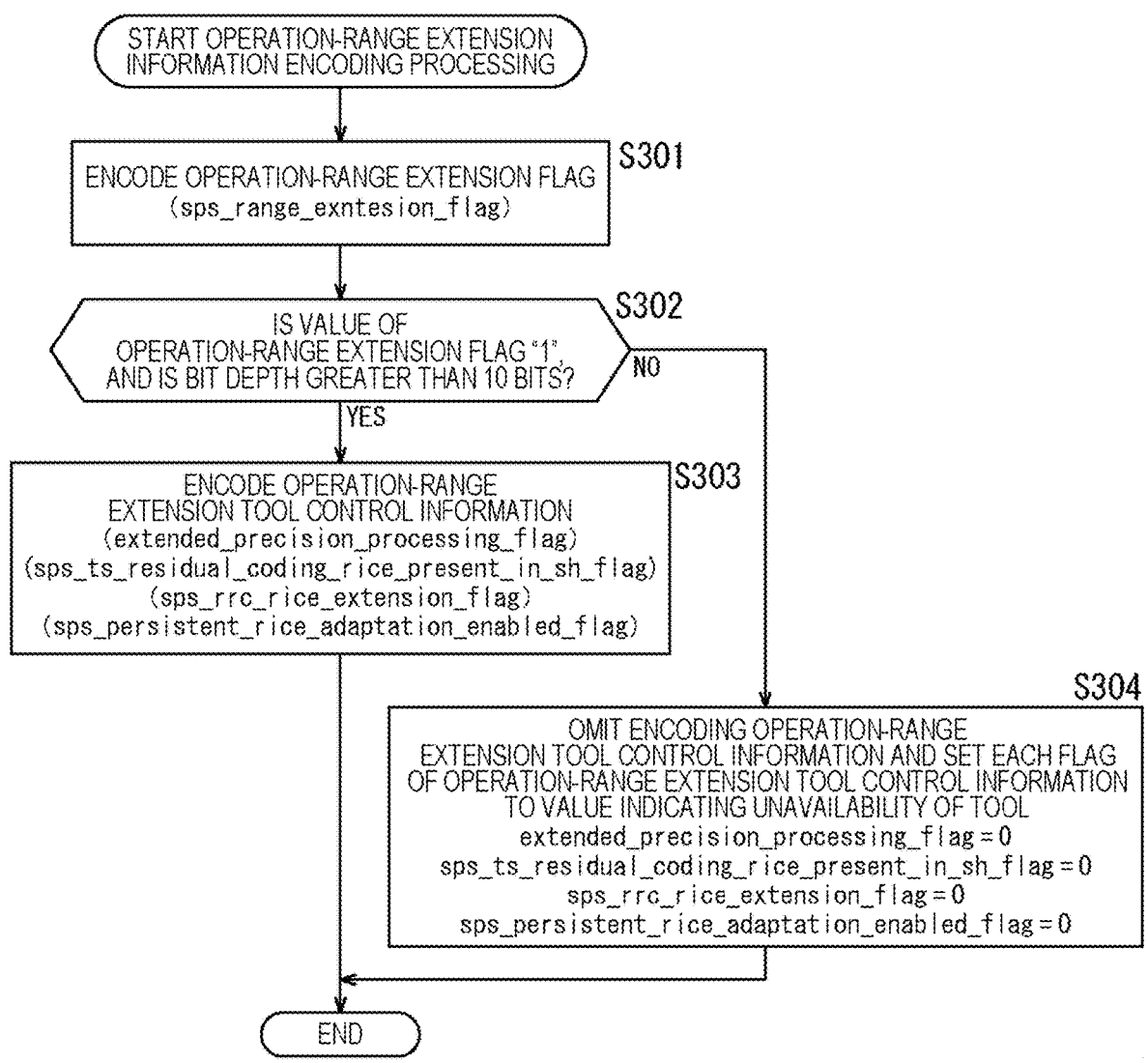
FIG. 20 is a flowchart illustrating an example of the flow of the operation-range extension information encoding processing.

When the operation-range extension information encoding processing is started, the operation-range extension flag encoding unit 111 encodes an operation-range extension flag (sps_range_extension_flag) in step S301 of FIG. 20.

In a case where the operation-range extension flag is false or the bit depth of the image is not extended, the operation-range extension tool control information encoding unit 112 may skip (omit) encoding the operation-range extension tool control information. Furthermore, in a case where the operation-range extension flag is true and the bit depth of the image is extended, the operation-range extension tool control information encoding unit 112 may encode the operation-range extension tool control information. For example, in a case where the operation-range extension flag is false or the bit depth of the image is not extended, the operation-range extension tool control information encoding unit 112 may further set the operation-range extension tool control information to a value indicating the unavailability of the operation-range extension tool. For example, in a case where the operation-range extension flag is false or the bit depth is 10 bits or less, the operation-range extension tool control information encoding unit 112 may further set the operation-range extension tool control information to a value indicating the unavailability of the operation-range extension tool.

In step S302, the operation-range extension tool control information encoding unit 112 determines whether or not the operation-range extension flag is true and the bit depth of the image is greater than 10 bits. In a case where it is determined that the operation-range extension flag is true and the bit depth of the image is greater than 10 bits, the procedure proceeds to step S303. In step S303, the operation-range extension tool control information encoding unit 112 encodes the operation-range extension tool control information. When the processing in step S303 ends, the operation-range extension information encoding processing ends.

Furthermore, in a case where it is determined in step S302 that the operation-range extension flag is false or the bit depth of the image is 10 bits or less, the procedure proceeds to step S304. In step S304, the operation-range extension tool control information encoding unit 112 skips (omits) encoding the operation-range extension tool control information. Furthermore, the operation-range extension tool control information encoding unit 112 sets the operation-range extension tool control information to a value indicating the unavailability of the operation-range extension tool. For example, when the processing in step S303 ends, the operation-range extension information encoding processing ends.

By executing each processing in this manner, the operation-range extension information encoding device 100 can prevent (the encoded data of) the operation-range extension tool control information from being stored in the bitstream in a case where the operation range is not extended. Therefore, the encoder and the decoder can use the encoding tool for bit-depth extension while maintaining compatibility with the specification that does not extend the bit depth of the image. Furthermore, in this manner, in a case where the bit depth of the image is not extended (in a case where the bit depth is 10 bits or less), the transmission of the control flag of the encoding tool for high bit depth and high bit rate in the parameter set can be omitted. This can reduce an increase in the code amount.

<Operation-Range Extension Information Decoding Device>

Figure 21:
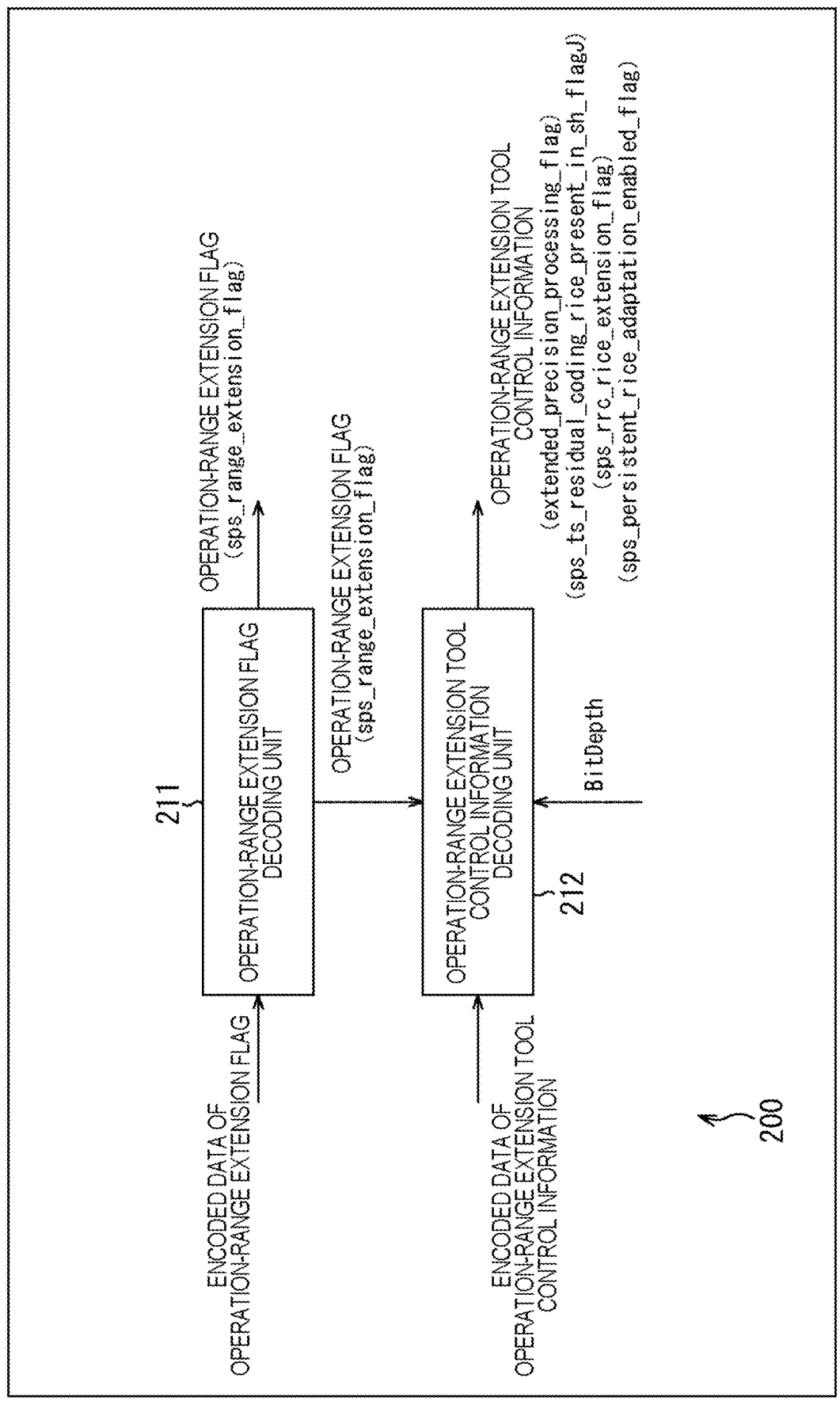
FIG. 21 is a block diagram illustrating an example of the main configuration of the operation-range extension information decoding device.

FIG. 21 is a block diagram illustrating an example of the main configuration of the operation-range extension information decoding device 200 in that case. Also in this case, the operation-range extension information decoding device 200 performs processing related to the decoding of the encoded data of the operation-range extension information.

For example, the operation-range extension information decoding device 200 acquires the encoded data of the operation-range extension information generated by the operation-range extension information encoding device 100. Furthermore, the operation-range extension information decoding device 200 acquires the parameter (BitDepth) indicating the bit depth of the image.

The operation-range extension information maintains compatibility with the image encoding methods described in Non-Patent Documents 1 and 2. That is, the bitstream of the image encoded using the operation-range extension information can be correctly decoded even by a decoder that does not support the extension of the operation range.

The operation-range extension information decoding device 200 decodes the encoded data of the operation-range extension information by using the parameter (BitDepth) indicating the bit depth of the image. The operation-range extension information decoding device 200 appropriately outputs the operation-range extension information as a processing result. The operation-range extension information is supplied to, for example, a decoder that decodes encoded data of an image. The decoder decodes the encoded data on the basis of the operation-range extension information and generates (restores) an image.

As illustrated in FIG. 21, the operation-range extension information decoding device 200 in this case has a configuration similar to the configuration described with reference to FIG. 10. That is, the operation-range extension information decoding device 200 includes the operation-range extension flag decoding unit 211 and the operation-range extension tool control information decoding unit 212.

The operation-range extension flag decoding unit 211 performs processing related to the decoding of the encoded data of an operation-range extension flag (sps_range_extension_flag). For example, the operation-range extension flag decoding unit 211 may acquire the encoded data of the operation-range extension flag. Furthermore, the operation-range extension flag decoding unit 211 may decode the encoded data and generate (restore) the operation-range extension flag. Also, the operation-range extension flag decoding unit 211 may output the operation-range extension flag to the outside of the operation-range extension information decoding device 200 as a processing result. Furthermore, the operation-range extension flag decoding unit 211 may supply the operation-range extension flag to the operation-range extension tool control information decoding unit 212.

The operation-range extension tool control information decoding unit 212 performs processing related to the decoding of the encoded data of the operation-range extension tool control information (sps_range_extension( )). For example, the operation-range extension tool control information decoding unit 212 may acquire the encoded data of the operation-range extension tool control information. Furthermore, the operation-range extension tool control information decoding unit 212 may acquire the operation-range extension flag supplied from the operation-range extension flag decoding unit 211. Moreover, the operation-range extension tool control information decoding unit 212 may acquire the parameter (BitDepth) indicating the bit depth of the image.

The operation-range extension tool control information decoding unit 212 may decode the encoded data of the operation-range extension tool control information in accordance with the operation-range extension flag and the bit depth (BitDepth) of the image. For example, in a case where the operation-range extension flag is false or the bit depth of the image is not extended, the operation-range extension tool control information decoding unit 212 may skip (omit) decoding the encoded data of the operation-range extension tool control information. Furthermore, the operation-range extension tool control information decoding unit 212 may set the operation-range extension tool control information to a value indicating the unavailability of the operation-range extension tool. For example, in a case where the operation-range extension flag is true and the bit depth of the image is extended, the operation-range extension tool control information decoding unit 212 may decode the encoded data of the operation-range extension tool control information.

For example, in a case where the operation-range extension flag is false or the bit depth is 10 bits or less, the operation-range extension tool control information decoding unit 212 may skip (omit) decoding the encoded data of the operation-range extension tool control information. Furthermore, the operation-range extension tool control information decoding unit 212 may set the operation-range extension tool control information to a value indicating the unavailability of the operation-range extension tool. For example, in a case where the operation-range extension flag is true and the bit depth of the image is greater than 10 bits, the operation-range extension tool control information decoding unit 212 may decode the encoded data of the operation-range extension tool control information.

Furthermore, the operation-range extension tool control information decoding unit 212 may output the operation-range extension tool control information to the outside of the operation-range extension information decoding device 200 as a processing result.

Note that the operation-range extension tool control information may include a control flag (extended_precision_processing_flag) related to the extension of the internal calculation precision of the orthogonal transform. In that case, the internal variable (ExtendedPrecisionFlag) related to the extension of the internal calculation precision of the orthogonal transform in the decoder may be set to the value of the control flag (extended_precision_processing_flag) related to the extension of the internal calculation precision of the orthogonal transform. Furthermore, the operation-range extension tool control information may include a control flag (sps_ts_residual_coding_rice_present_in_sh_flag) related to the extension of the Rice parameter of the TSRC. Also, the operation-range extension tool control information may include a control flag (sps_rrc_rice_extension_flag, sps_persistent_rice_adaptation_enabled_flag) related to the extension of the Rice parameter of the RRC.

With such a configuration, the operation-range extension information decoding device 200 can correctly decode the encoded data of the operation-range extension information generated by the operation-range extension information encoding device 100. That is, the decoder can use the encoding tool for bit-depth extension while maintaining compatibility with the specification that does not extend the bit depth of the image. In addition, an increase in the code amount can be reduced.

<Flow of Operation-Range Extension Information Decoding Processing>

An example of the flow of the operation-range extension information decoding processing executed by the operation-range extension information decoding device 200 of FIG. 21 will be described with reference to a flowchart of FIG. 22.

In the operation-range extension information decoding processing, the operation-range extension information decoding device 200 decodes the encoded data of the operation-range extension flag, and decodes the encoded data of the operation-range extension tool control information in accordance with the operation-range extension flag and the bit depth of the image.

Figure 22:
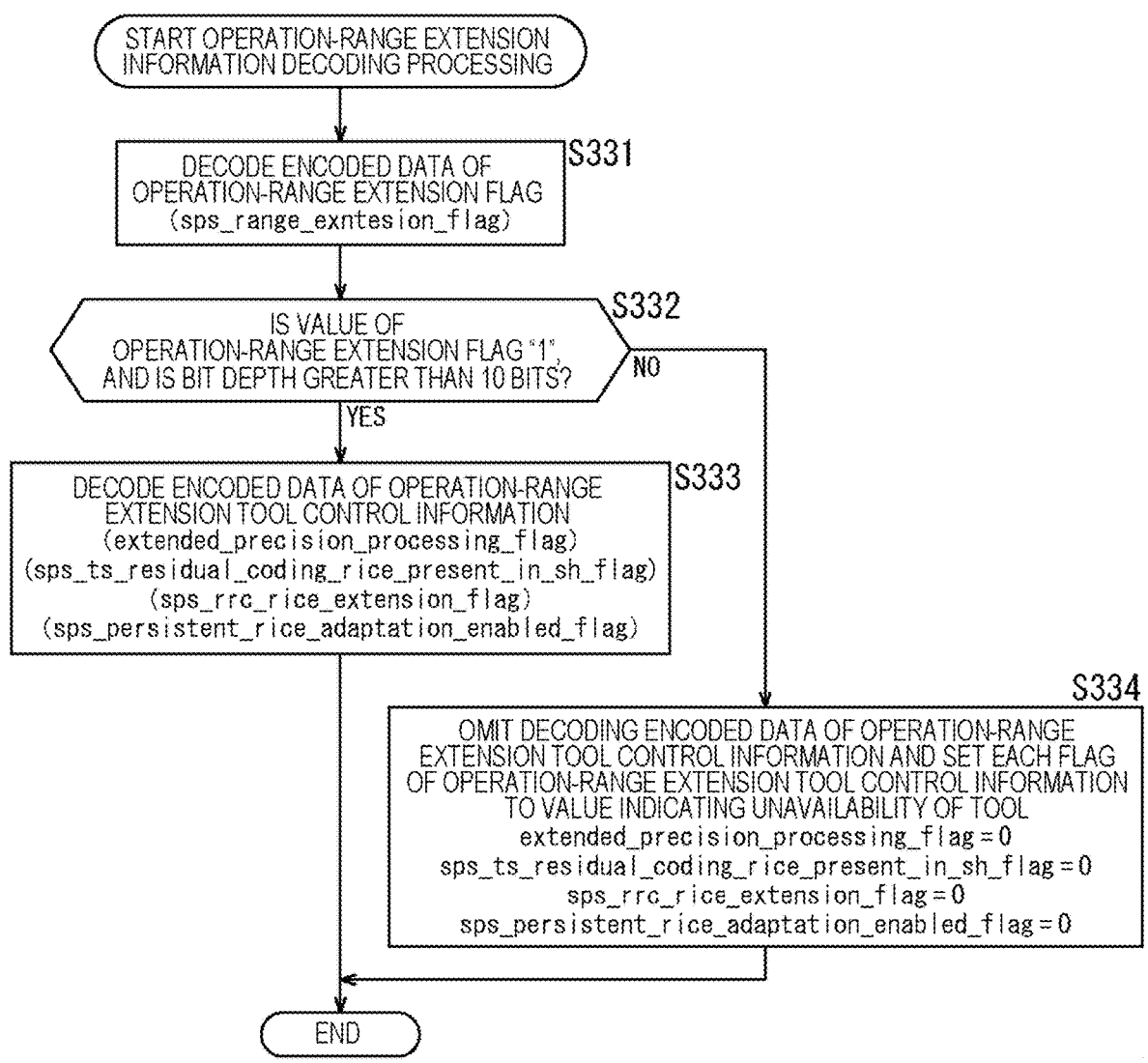
FIG. 22 is a flowchart illustrating an example of the flow of the operation-range extension information decoding processing.

When the operation-range extension information decoding processing is started, in step S331 of FIG. 22, the operation-range extension flag decoding unit 211 decodes the encoded data of the operation-range extension flag (sps_range_extension_flag) and generates (restores) the operation-range extension flag.

The operation-range extension tool control information decoding unit 212 may decode the encoded data of the operation-range extension tool control information in accordance with the operation-range extension flag and the bit depth (BitDepth) of the image. For example, in a case where the operation-range extension flag is false or the bit depth of the image is not extended, the operation-range extension tool control information decoding unit 212 may skip (omit) decoding the encoded data of the operation-range extension tool control information. Furthermore, the operation-range extension tool control information decoding unit 212 may set the operation-range extension tool control information to a value indicating the unavailability of the operation-range extension tool. For example, in a case where the operation-range extension flag is true and the bit depth of the image is extended, the operation-range extension tool control information decoding unit 212 may decode the encoded data of the operation-range extension tool control information.

For example, in a case where the operation-range extension flag is false or the bit depth is 10 bits or less, the operation-range extension tool control information decoding unit 212 may skip (omit) decoding the encoded data of the operation-range extension tool control information. Furthermore, the operation-range extension tool control information decoding unit 212 may set the operation-range extension tool control information to a value indicating the unavailability of the operation-range extension tool. For example, in a case where the operation-range extension flag is true and the bit depth of the image is greater than 10 bits, the operation-range extension tool control information decoding unit 212 may decode the encoded data of the operation-range extension tool control information.

In step S332, the operation-range extension tool control information decoding unit 212 determines whether or not the operation-range extension flag is true (e.g., "1") and the bit depth of the image is greater than 10 bits. In a case where it is determined that the operation-range extension flag is true and the bit depth of the image is greater than 10 bits, the procedure proceeds to step S333.

In step S333, the operation-range extension tool control information decoding unit 212 decodes the encoded data of the operation-range extension tool control information, and generates (restores) the operation-range extension tool control information. When the processing in step S333 ends, the operation-range extension information decoding processing ends.

Furthermore, in a case where it is determined in step S332 that the operation-range extension flag is false or the bit depth of the image is 10 bits or less, the procedure proceeds to step S334. In step S334, the operation-range extension tool control information decoding unit 212 omits the decoding of the encoded data of the operation-range extension tool control information. Then, the operation-range extension tool control information decoding unit 212 sets each control flag of the operation-range extension tool control information to a value indicating the unavailability of the tool. When the processing in step S334 ends, the operation-range extension information decoding processing ends.

By executing each processing in this manner, the operation-range extension information decoding device 200 can correctly decode the encoded data of the operation-range extension information generated by the operation-range extension information encoding device 100. That is, the decoder can use the encoding tool for bit-depth extension while maintaining compatibility with the specification that does not extend the bit depth of the image. In addition, an increase in the code amount can be reduced.

6. Embodiment (Image Encoding Device)

<Image Encoding Device>

The present technology described above can be applied to any configuration. For example, the present technology can be applied to an image encoding device.

Figure 23:
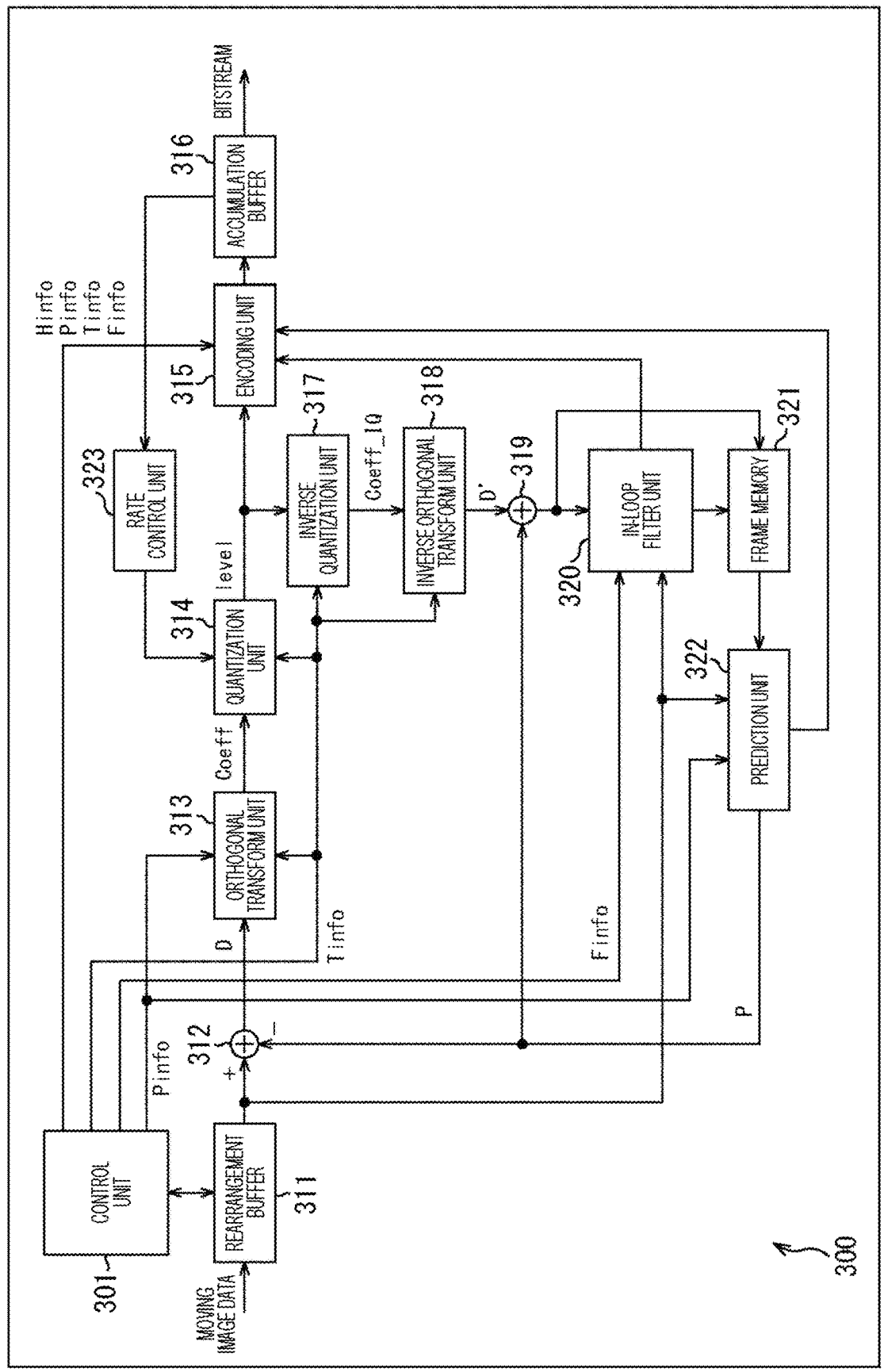
FIG. 23 is a block diagram illustrating an example of a main configuration of an image encoding device.

FIG. 23 is a block diagram illustrating an example of a configuration of an image encoding device that is one aspect of an image processing device to which the present technology is applied. An image encoding device 300 illustrated in FIG. 23 is a device that encodes image data of a moving image. For example, the image encoding device 300 can encode image data of a moving image by an encoding method described in any one of the above-described Non-Patent Documents.

Note that, in FIG. 23, main processing units (blocks), main data flows, and the like are illustrated, and those illustrated in FIG. 23 are not necessarily all. That is, the image encoding device 300 may include a processing unit not illustrated as a block in FIG. 23. In addition, the image encoding device 300 may have processing or a data flow that is not illustrated as an arrow or the like in FIG. 23.

As illustrated in FIG. 23, the image encoding device 300 includes a control unit 301, a rearrangement buffer 311, a calculation unit 312, an orthogonal transform unit 313, a quantization unit 314, an encoding unit 315, an accumulation buffer 316, an inverse quantization unit 317, an inverse orthogonal transform unit 318, a calculation unit 319, an in-loop filter unit 320, a frame memory 321, a prediction unit 322, and a rate control unit 323.

<Control Unit>

The control unit 301 divides moving image data held by the rearrangement buffer 311 into blocks (CU, PU, transform block, etc.) serving as units of processing on the basis of a block size in units of processing specified outside or in advance. Furthermore, the control unit 301 determines an encoding parameter (header information Hinfo, prediction mode information Pinfo, transform information Tinfo, filter information Finfo, etc.) to be supplied to each block on the basis of, for example, rate-distortion optimization (RDO).

Details of these encoding parameters will be described later. When determining the encoding parameters as described above, the control unit 301 supplies the encoding parameters to each block. Specifically, details are as follows.

The header information Hinfo is supplied to each block. The prediction mode information Pinfo is supplied to the encoding unit 315 and the prediction unit 322. The transform information Tinfo is supplied to the encoding unit 315, the orthogonal transform unit 313, the quantization unit 314, the inverse quantization unit 317, and the inverse orthogonal transform unit 318. The filter information Finfo is supplied to the in-loop filter unit 320.

<Rearrangement Buffer>

Each of fields (input images) of moving image data is input to the image encoding device 300 in order of regeneration (order of display) thereof. The rearrangement buffer 311 acquires and holds (stores) each of the input images in order of reproduction (order of display) thereof. The rearrangement buffer 311 rearranges the input images in order of encoding (order of decoding) or partitions the input images into blocks serving as units of processing on the basis of control by the control unit 301. The rearrangement buffer 311 supplies each of the processed input images to the calculation unit 312. Furthermore, the rearrangement buffer 311 also supplies each of the input images (original images) to the prediction unit 322 and the in-loop filter unit 320.

<Calculation Unit>

The calculation unit 312 uses an image I corresponding to the block serving as the unit of processing and a predicted image P supplied from the prediction unit 322 as inputs, subtracts the predicted image P from the image I as shown in the following equation, and derives a prediction residual D, and supplies the prediction residual D to the orthogonal transform unit 313.

$$D = I - P$$

<Orthogonal Transform Unit>

The orthogonal transform unit 313 uses the prediction residual D supplied from the calculation unit 312 and the transform information Tinfo supplied from the control unit 301 as inputs, performs orthogonal transform on the prediction residual D on the basis of the transform information Tinfo, and derives a transform coefficient Coeff. For example, the orthogonal transform unit 313 performs primary transform on the prediction residual D to generate a primary transform coefficient, and performs secondary transform on the primary transform coefficient on the basis of an ST identifier to generate a secondary transform coefficient. The orthogonal transform unit 313 supplies the obtained secondary transform coefficient to the quantization unit 314 as the transform coefficient Coeff. Note that the orthogonal transform unit 313 can perform an arbitrary coefficient transform, not limited to the orthogonal transform. That is, the transform coefficient Coeff may be derived by performing arbitrary coefficient transform on the prediction residual D. Therefore, the orthogonal transform unit 313 can also be referred to as a coefficient transform unit.

<Quantization Unit>

The quantization unit 314 uses the transform coefficient Coeff supplied from the orthogonal transform unit 313 and the transform information Tinfo supplied from the control unit 301 as inputs, and scales (quantizes) the transform coefficient Coeff on the basis of the transform information Tinfo. Note that the rate of the quantization is controlled by the rate control unit 323. The quantization unit 314 supplies a quantization coefficient level (also referred to as a quantization coefficient qcoeff), which is a level value of the transform coefficient quantized in this manner, to the encoding unit 315 and the inverse quantization unit 317.

<Encoding Unit>

The encoding unit 315 uses, as inputs, the quantization coefficient level supplied from the quantization unit 314, various encoding parameters (header information Hinfo, prediction mode information Pinfo, transform information Tinfo, filter information Finfo, etc.) supplied from the control unit 301, information regarding filtering, such as a filter coefficients, supplied from the in-loop filter unit 320, and information regarding the optimum prediction mode supplied from the prediction unit 322. The encoding unit 315 performs variable-length encoding (e.g., arithmetic encoding) on the quantization coefficient level and generates a bit string (encoded data).

Moreover, the encoding unit 315 includes, in the filter information Finfo, information regarding filtering supplied from the in-loop filter unit 320 and includes, in the prediction mode information Pinfo, information regarding the optimum prediction mode supplied from the prediction unit 322. Then, the encoding unit 315 encodes the above-described various encoding parameters (header information Hinfo, prediction mode information Pinfo, transform information Tinfo, filter information Finfo, etc.), and generates a bit string.

Furthermore, the encoding unit 315 multiplexes the bit string (encoded data) of various information generated as described above and generates a bitstream of the encoded data. The encoding unit 315 supplies the bitstream to the accumulation buffer 316.

<Accumulation Buffer>

The accumulation buffer 316 temporarily holds the bitstream of encoded data obtained in the encoding unit 315. The accumulation buffer 316 outputs the held bitstream of the encoded data to the outside of the image encoding device 300 at a predetermined timing. For example, the bitstream is transmitted to the decoding side via an arbitrary recording medium, an arbitrary transmission medium, an arbitrary information processing device, or the like. That is, the accumulation buffer 316 is also a transmission unit that transmits a bitstream (encoded data).

<Inverse Quantization Unit>

The inverse quantization unit 317 performs processing related to inverse quantization. For example, the inverse quantization unit 317 uses the quantization coefficient level supplied from the quantization unit 314 and the transform information Tinfo supplied from the control unit 301 as inputs, and scales (inversely quantizes) a value of the quantization coefficient level on the basis of the transform information Tinfo. Note that this inverse quantization is the inverse processing of the quantization performed in the quantization unit 314. The inverse quantization unit 317 supplies a transform coefficient Coeff_IQ obtained by such inverse quantization to the inverse orthogonal transform unit 318.

<Inverse Orthogonal Transform Unit>

The inverse orthogonal transform unit 318 performs processing related to inverse orthogonal transform. For example, the inverse orthogonal transform unit 318 uses the transform coefficient Coeff IQ supplied from the inverse quantization unit 317 and the transform information Tinfo supplied from the control unit 301 as inputs, performs inverse orthogonal transform on the transform coefficient Coeff_IQ on the basis of the transform information Tinfo, and derives a prediction residual D'. Note that this inverse orthogonal transform is the inverse processing of the orthogonal transform performed by the orthogonal transform unit 313. The inverse orthogonal transform unit 318 supplies the prediction residual D' obtained by such inverse orthogonal transform to the calculation unit 319.

In other words, the inverse orthogonal transform unit 318 executes the inverse processing of the processing executed by the orthogonal transform unit 313. That is, similarly to the case of the orthogonal transform unit 313, the inverse orthogonal transform unit 318 can perform an arbitrary inverse coefficient transform, not limited to the inverse orthogonal transform. This inverse coefficient transform is the inverse processing of the coefficient transform executed by the orthogonal transform unit 313. That is, the prediction residual D' may be derived by performing arbitrary inverse coefficient transform on the transform coefficient Coeff_IQ. Therefore, the inverse orthogonal transform unit 318 can also be referred to as an inverse coefficient transform unit.

<Calculation Unit>

The calculation unit 319 uses the prediction residual D' supplied from the inverse orthogonal transform unit 318 and the predicted image P supplied from the prediction unit 322 as inputs. The calculation unit 319 adds the prediction residual D' and the predicted image P corresponding to the prediction residual D', and derives a locally decoded image Rlocal. The calculation unit 319 supplies the derived locally decoded image Rlocal to the in-loop filter unit 320 and the frame memory 321.

<In-Loop Filter Unit>

The in-loop filter unit 320 performs processing related to in-loop filter processing. For example, the in-loop filter unit 320 uses the locally decoded image Rlocal supplied from the calculation unit 319, the filter information Finfo supplied from the control unit 301, and the input image (original image) supplied from the rearrangement buffer 311 as inputs. Note that the information to be input to the in-loop filter unit 320 is arbitrary, and information other than these pieces of information may be input. For example, a prediction mode, motion information, a code amount target value, a quantization parameter QP, a picture type, information of a block (CU, CTU, etc.), and the like may be input to the in-loop filter unit 320 as necessary.

The in-loop filter unit 320 appropriately performs filter processing on the locally decoded image Rlocal on the basis of the filter information Finfo. The in-loop filter unit 320 also uses an input image (original image) or other input information for the filter processing as necessary.

For example, as described in Non-Patent Document 11, the in-loop filter unit 320 applies four in-loop filters of a bilateral filter, a deblocking filter (DBF), an adaptive offset filter (sample adaptive offset (SAO)), and an adaptive loop filter (ALF) in this order. Note that which filters are applied in which order is arbitrary, and can be selected as appropriate.

Needless to say, the filter processing performed by the in-loop filter unit 320 is arbitrary and is not limited to the above example. For example, the in-loop filter unit 320 may apply a wiener filter or the like.

The in-loop filter unit 320 supplies the locally decoded image Rlocal subjected to the filter processing to the frame memory 321. Note that, for example, in a case where information regarding filtering such as filter coefficients are transmitted to the decoding side, the in-loop filter unit 320 supplies the information regarding filtering to the encoding unit 315.

<Frame Memory>

The frame memory 321 performs processing related to storage of data related to an image. For example, the frame memory 321 uses the locally decoded image Rlocal supplied from the calculation unit 319 or the locally decoded image Rlocal subjected to the filter processing and supplied from the in-loop filter unit 320 as an input, and holds (stores) the locally decoded image Rlocal. Furthermore, the frame memory 321 reconstructs a decoded image R in each picture unit using the locally decoded image Rlocal, and holds (stores in the buffer in the frame memory 321) the decoded image R. The frame memory 321 supplies the decoded image R (or a part thereof) to the prediction unit 322 in response to a request from the prediction unit 322.

<Prediction Unit>

The prediction unit 322 performs processing related to generation of a predicted image. For example, the prediction unit 322 uses the prediction mode information Pinfo supplied from the control unit 301, the input image (original image) supplied from the rearrangement buffer 311, and the decoded image R (or a part thereof) read from the frame memory 321 as inputs. The prediction unit 322 performs prediction processing such as inter prediction or intra prediction using the prediction mode information Pinfo and the input image (original image), performs prediction with reference to the decoded image R as a reference image, performs motion compensation processing on the basis of the prediction result, and generates the predicted image P. The prediction unit 322 supplies the generated predicted image P to the calculation unit 312 and the calculation unit 319. Furthermore, the prediction unit 322 supplies information regarding the prediction mode selected by the above processing, that is, the optimum prediction mode, to the encoding unit 315 as necessary.

<Rate Control Unit>

The rate control unit 323 performs processing related to rate control. For example, the rate control unit 323 controls the rate of the quantization operation of the quantization unit 314 so that overflow or underflow does not occur on the basis of the code amount of the encoded data accumulated in the accumulation buffer 316.

Note that these processing units (control unit 301, rearrangement buffer 311 to rate control unit 323) have an arbitrary configuration. For example, each processing unit may be configured by a logic circuit that implements the above-described processing. Alternatively, each processing unit may include a central processing unit (CPU), a read-only memory (ROM), a random-access memory (RAN), and the like, for example, and execute a program by using them to realize the above-described processing. Needless to say, each processing unit may have both the configurations, and a part of the above-described processing may be achieved by the logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Encoding Unit>

Figure 24:
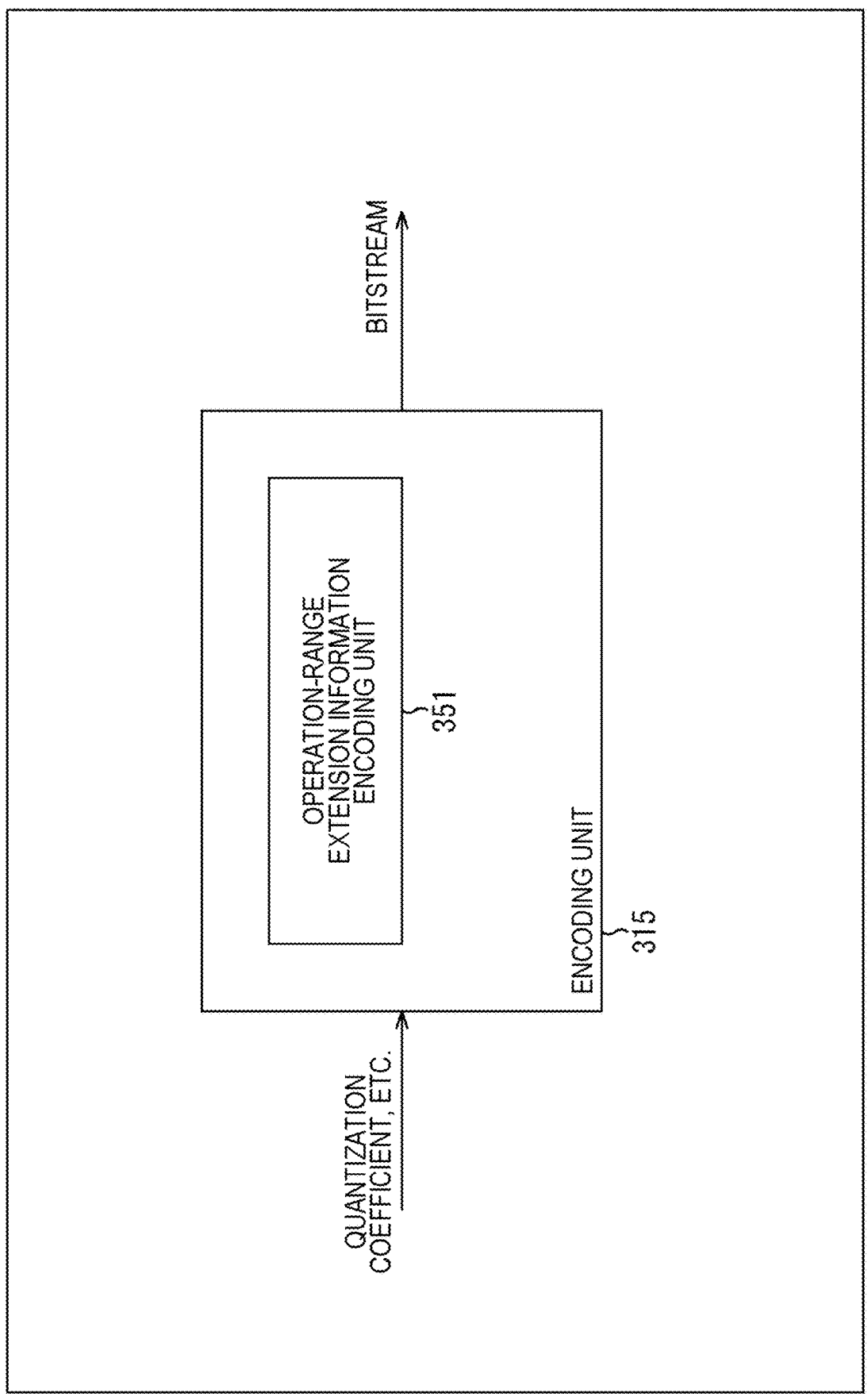
FIG. 24 is a block diagram illustrating an example of a main configuration of an encoding unit.

FIG. 24 is a block diagram illustrating an example of the main configuration of the encoding unit 315. As illustrated in FIG. 24, the encoding unit 315 includes an operation-range extension information encoding unit 351. The operation-range extension information encoding unit 351 executes processing related to encoding of the operation-range extension information. For example, the operation-range extension information encoding unit 351 may acquire the operation-range extension information supplied as an encoding parameter from the control unit 301. Furthermore, the operation-range extension information encoding unit 351 may acquire the parameter (BitDepth) indicating the bit depth of the image supplied as an encoding parameter from the control unit 301. The operation-range extension information encoding unit 351 may perform processing related to the encoding of the operation-range extension information by using these pieces of information.

Furthermore, the operation-range extension information encoding unit 351 may appropriately output the encoded data of the operation-range extension information and the like as a processing result. The encoded data is stored in a bitstream including encoded data of an image in the encoding unit 315. The bitstream is output to the outside of the image encoding device 300 via the accumulation buffer 316. The bitstream is supplied to the decoding side. Furthermore, the operation-range extension information encoded by the operation-range extension information encoding unit 351, the operation-range extension information set by the operation-range extension information encoding unit 351, or internal variables corresponding thereto are supplied as encoding parameters to an arbitrary processing unit of the image encoding device 300 and used. For example, the operation-range extension information (or internal variable) may be supplied to the encoding unit 315 and used for encoding and the like. Furthermore, the operation-range extension information (or internal variable) may be supplied to the orthogonal transform unit 313 and used for orthogonal transform or the like. Also, the operation-range extension information (or internal variable) may be supplied to the inverse orthogonal transform unit 318 and used for inverse orthogonal transform or the like.

In the encoding unit 315 having the above configuration, each of the above-described methods (Method 1, Method 2, or Method 3) of the present technology may be applied.

For example, the operation-range extension information encoding unit 351 may have a configuration similar to that of the operation-range extension information encoding device 100 illustrated in FIG. 8 and execute the operation-range extension information encoding processing illustrated in FIG. 9. In this manner, the image encoding device 300 can obtain the effect described above in <3. Control of operation-range extension flag> (the effect in the case of applying Method 1). That is, the image encoding device 300 can use the encoding tool for bit-depth extension while maintaining compatibility with the specification that does not extend a bit depth of an image.

Furthermore, for example, the operation-range extension information encoding unit 351 may have a configuration similar to that of the operation-range extension information encoding device 100 illustrated in FIG. 16 and execute the operation-range extension information encoding processing illustrated in FIG. 17. In this manner, the image encoding device 300 can obtain the effect described above in <4. Control of value of operation-range extension tool control information> (the effect in the case of applying Method 2). That is, the image encoding device 300 can use the encoding tool for bit-depth extension while maintaining compatibility with the specification that does not extend a bit depth of an image.

Furthermore, for example, the operation-range extension information encoding unit 351 may have a configuration similar to that of the operation-range extension information encoding device 100 illustrated in FIG. 16 and execute the operation-range extension information encoding processing illustrated in FIG. 20. In this manner, the image encoding device 300 can obtain the effect described above in <5. Transmission control of operation-range extension tool control information> (the effect in the case of applying Method 3). That is, the image encoding device 300 can use the encoding tool for bit-depth extension while maintaining compatibility with the specification that does not extend a bit depth of an image. In addition, an increase in the code amount can be reduced.

<Flow of Image Encoding Processing>

Figure 25:
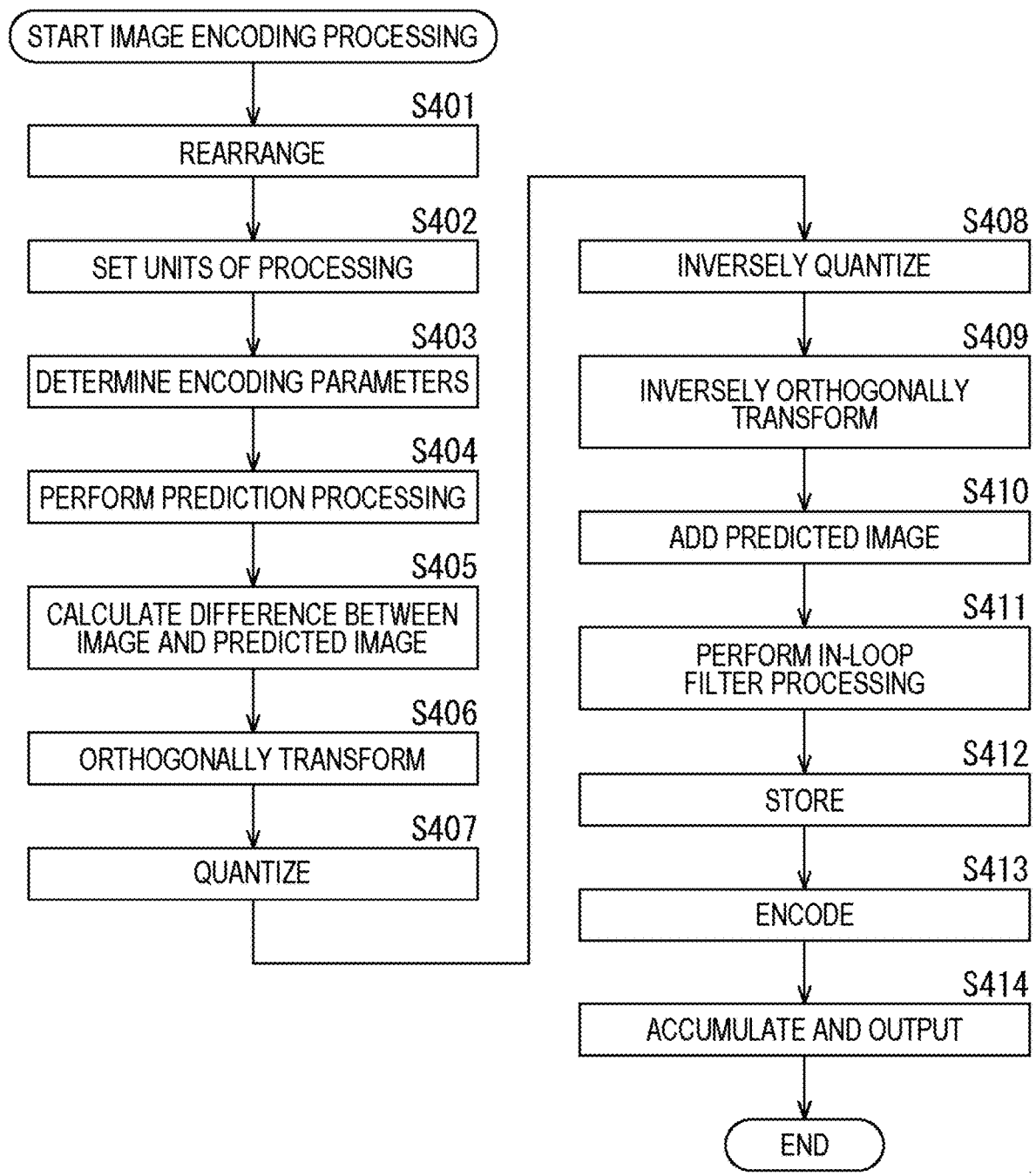
FIG. 25 is a flowchart illustrating an example of a flow of image encoding processing.

Next, an example of a flow of image encoding processing executed by the image encoding device 300 having the above-described configuration will be described with reference to a flowchart in FIG. 25.

When the image encoding processing is started, in step S401, the rearrangement buffer 311 is controlled by the control unit 301 to rearrange the order of the frames of the input moving image data from the order of display to the order of encoding.

In step S402, the control unit 301 sets units of processing (performs block division) for the input image held by the rearrangement buffer 311.

In step S403, the control unit 301 determines (sets) the encoding parameters for the input image held by the rearrangement buffer 311.

In step S404, the prediction unit 322 performs prediction processing and generates a predicted image or the like in the optimum prediction mode. For example, in the prediction processing, the prediction unit 322 performs intra prediction to generate a predicted image or the like in the optimum intra prediction mode, performs inter prediction to generate a predicted image or the like in the optimum inter prediction mode, and selects the optimum prediction mode from the predicted image on the basis of a cost function value or the like.

In step S405, the calculation unit 312 calculates a difference between the input image and the predicted image in the optimum mode selected by the prediction processing in step S304. That is, the calculation unit 312 generates the prediction residual D between the input image and the predicted image. The prediction residual D obtained in this manner has a smaller amount of data than the original image data. Therefore, the amount of data can be compressed compared to a case where an image is encoded as it is.

In step S406, the orthogonal transform unit 313 performs orthogonal transform processing on the prediction residual D generated by the processing in step S405, and derives the transform coefficient Coeff.

In step S407, the quantization unit 314 quantizes the transform coefficient Coeff obtained by the processing in step S406 by using the quantization parameter calculated by the control unit 301 or the like, and derives the quantization coefficient level.

In step S408, the inverse quantization unit 317 inversely quantizes the quantization coefficient level generated by the processing in step S407 with a characteristic corresponding to the quantization characteristic in step S407, and derives the transform coefficient Coeff_IQ.

In step S409, the inverse orthogonal transform unit 318 inversely orthogonally transforms the transform coefficient Coeff_IQ obtained by the processing in step S408 by a method corresponding to the orthogonal transform processing in step S406, and derives the prediction residual D'.

In step S410, the calculation unit 319 adds the predicted image obtained by the prediction processing in step S404 to the prediction residual D' derived by the processing in step S409, thereby generating a locally decoded image.

In step S411, the in-loop filter unit 320 performs in-loop filter processing on the locally decoded image derived by the processing in step S410.

In step S412, the frame memory 321 stores the locally decoded image derived by the processing of step S410 and the locally decoded image subjected to the filter processing in step S411.

In step S413, the encoding unit 315 encodes the quantization coefficient level, various encoding parameters, and the like obtained by the processing in step S407, and generates a bitstream of the encoded data.

In step S414, the accumulation buffer 316 accumulates the bitstream obtained in step S413 and outputs the bitstream to the outside of the image encoding device 300. This bitstream is transmitted to the decoding side via a transmission path or a recording medium, for example. In addition, the rate control unit 323 performs rate control as necessary.

When the processing in step S414 ends, the image encoding processing ends.

In step S413 of such image encoding processing, each of the above-described methods (Method 1, Method 2, or Method 3) of the present technology may be applied.

For example, in step S413, (the operation-range extension information encoding unit 351 of) the encoding unit 315 may execute the operation-range extension information encoding processing illustrated in FIG. 9 to encode the operation-range extension information (encoding parameter). In this manner, the image encoding device 300 can obtain the effect described above in <3. Control of operation-range extension flag> (the effect in the case of applying Method 1). That is, the image encoding device 300 can use the encoding tool for bit-depth extension while maintaining compatibility with the specification that does not extend a bit depth of an image.

Furthermore, for example, in step S413, (the operation-range extension information encoding unit 351 of) the encoding unit 315 may execute the operation-range extension information encoding processing illustrated in FIG. 17 to encode the operation-range extension information (encoding parameter). In this manner, the image encoding device 300 can obtain the effect described above in <4. Control of value of operation-range extension tool control information> (the effect in the case of applying Method 2). That is, the image encoding device 300 can use the encoding tool for bit-depth extension while maintaining compatibility with the specification that does not extend a bit depth of an image.

Furthermore, for example, in step S413, (the operation-range extension information encoding unit 351 of) the encoding unit 315 may execute the operation-range extension information encoding processing illustrated in FIG. 20 to encode the operation-range extension information (encoding parameter). In this manner, the image encoding device 300 can obtain the effect described above in <5. Transmission control of operation-range extension tool control information> (the effect in the case of applying Method 3). That is, the image encoding device 300 can use the encoding tool for bit-depth extension while maintaining compatibility with the specification that does not extend a bit depth of an image. In addition, an increase in the code amount can be reduced.

7. Embodiment (Image Decoding Device)

<Image Decoding Device>

Figure 26:
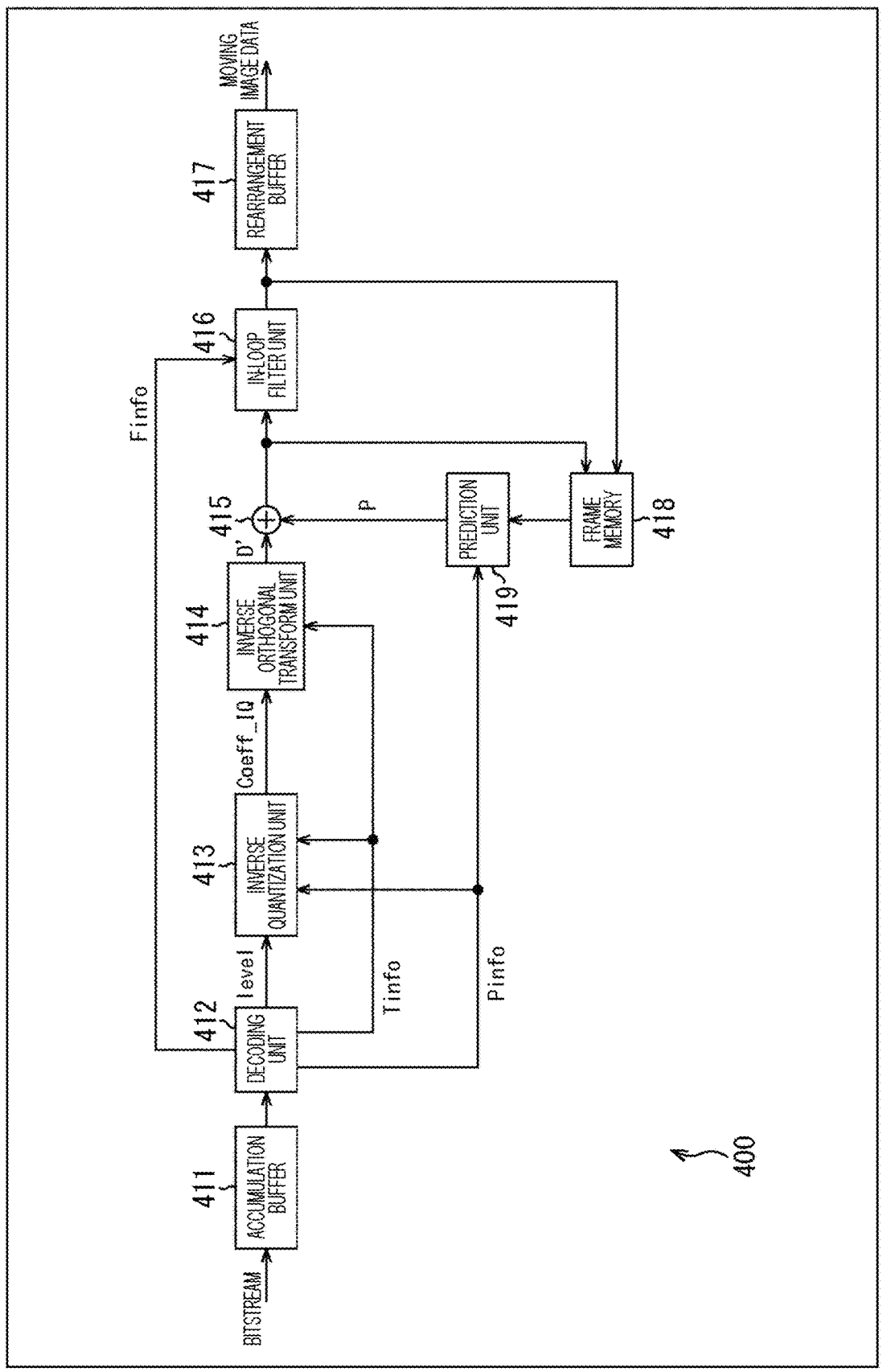
FIG. 26 is a block diagram illustrating an example of a main configuration of an image decoding device.

FIG. 26 is a block diagram illustrating an example of a configuration of an image decoding device that is one aspect of an image processing device to which the present technology is applied. The image decoding device 400 illustrated in FIG. 26 is a device that encodes encoded data of a moving image. For example, the image decoding device 400 can decode the encoded data by the decoding method described in any one of the above Non-Patent Documents. For example, the image decoding device 400 decodes the encoded data (bitstream) generated by the above-described image encoding device 300.

Note that, in FIG. 26, main processing units (blocks), main data flows, and the like are illustrated, and those illustrated in FIG. 26 are not necessarily all. That is, the image decoding device 400 may include a processing unit not illustrated as a block in FIG. 26. In addition, the image decoding device 400 may have processing or a data flow that is not illustrated as an arrow or the like in FIG. 26.

In FIG. 26, the image decoding device 400 includes an accumulation buffer 411, a decoding unit 412, an inverse quantization unit 413, an inverse orthogonal transform unit 414, a calculation unit 415, an in-loop filter unit 416, a rearrangement buffer 417, a frame memory 418, and a prediction unit 419. Note that the prediction unit 419 includes an intra prediction unit, an inter prediction unit, and the like (not illustrated). The image decoding device 400 is a device that generates moving image data by decoding a bitstream including encoded data of a moving image. For example, the image decoding device 400 can correctly decode a bitstream generated by the image encoding device 300.

<Accumulation Buffer>

The accumulation buffer 411 acquires and holds (stores) the bitstream input to the image decoding device 400. The accumulation buffer 411 supplies the accumulated bitstream to the decoding unit 412 at a predetermined timing or in a case where a predetermined condition is satisfied.

<Decoding Unit>

The decoding unit 412 performs processing related to image decoding. For example, the decoding unit 412 uses the bitstream supplied from the accumulation buffer 411 as an input, performs variable-length decoding on the syntax value of each syntax element from the bit string according to the definition of the syntax table, and derives a parameter.

The syntax element and the parameter derived from the syntax value of the syntax element include, for example, header information Hinfo, prediction mode information Pinfo, transform information Tinfo, filter information Finfo, and the like. That is, the decoding unit 412 parses (analyzes and acquires) these pieces of information from the bitstream. These pieces of information will be described below.

<Header Information Hinfo>

The header information Hinfo includes, for example, header information such as video parameter set (VPS)/sequence parameter set (SPS)/Picture Parameter Set (PPS)/slice header (SH). The header information Hinfo includes, for example, information defining an image size (width PicWidth, height PicHeight), a bit depth (luminance bitDepthY, color difference bitDepthC), a chroma array type ChromaArrayType, a maximum value MaxCUSize/minimum value MinCUSize of CU size, a maximum depth MaxQTDepth/a minimum depth MinQTDepth of quadtree partitioning (also referred to as Quad-tree partitioning), a maximum depth MaxBTDepth/minimum depth MinBTDepth of binary tree partitioning (Binary-tree partitioning), a maximum value MaxTSSize of a transform skip block (also referred to as a maximum transform skip block size), an on/off flag (also referred to as an enabled flag) of each encoding tool, and the like.

For example, as the on/off flag of the encoding tool included in the header information Hinfo, there is an on/off flag related to the following transform and quantization processing. Note that the on/off flag of the encoding tool can also be interpreted as a flag indicating whether or not syntax related to the encoding tool exists in the encoded data. Furthermore, in a case where the value of the on/off flag is one (true), it indicates the availability of the encoding tool, and in a case where the value of the on/off flag is zero (false), it indicates the unavailability of the encoding tool. Note that the interpretation of the flag value may be reversed.

A cross-component prediction enabled flag (ccp_enabled_flag): is flag information indicating whether or not cross-component prediction (cross-component prediction (CCP), also referred to as CC prediction) is available. For example, in a case where the flag information is "1" (true), it indicates the availability of the flag information, and in a case where the flag information is "0" (false), it indicates the unavailability of the flag information. Note that the CCP is also referred to as cross-component linear prediction (CCLM or CCLMP).

Furthermore, (the SPS of) the header information Hinfo may include the above-described operation-range extension information.

<Prediction Mode Information Pinfo>

The prediction mode information Pinfo includes, for example, information such as size information PBSize (predicted block size) of a processing target PB (predicted block), intra prediction mode information IPinfo, and motion prediction information MVinfo.

The intra-prediction mode information IPinfo includes, for example, prev_intra_luma_pred_flag, mpm_idx, rem_intra_pred_mode in JCTVC-W1005, 7.3.8.5 Coding Unit syntax, a luminance intra-prediction mode IntraPredModeY derived from the syntax, and the like.

Furthermore, the intra-prediction mode information IPinfo includes, for example, a cross-component prediction flag (ccp_flag(cclmp_flag)), a multi-class linear prediction mode flag (mclm_flag), a chroma sample position type identifier (chroma_sample_loc_type_idx), a chroma MPM identifier (chroma_mpm_idx), a luminance intra-prediction mode (IntraPredModeC) derived from these syntaxes, and the like.

The cross-component prediction flag (ccp_flag(cclmp_flag)) is flag information indicating whether or not to apply the cross-component linear prediction. For example, when ccp_flag=1, it indicates that the cross-component prediction is applied, and when ccp_flag=0, it indicates that the cross-component prediction is not applied.

The multi-class linear prediction mode flag (mclm_flag) is information regarding a mode of linear prediction (linear prediction mode information). More specifically, the multi-class linear prediction mode flag (mclm_flag) is flag information indicating whether or not to set the multi-class linear prediction mode. For example, in the case of "0", a one-class mode (single-class mode) (e.g., CCLMP) is indicated, and in the case of "1", a two-class mode (multi-class mode) (e.g., MCLMP) is indicated.

The chrominance sample position type identifier (chroma_sample_loc_type_idx) is an identifier that identifies a type (also referred to as a chrominance sample position type) of a pixel position of the chrominance component. For example, in a case where the chrominance array type (ChromaArrayType), which is information regarding a color format, indicates 420 format, the chrominance sample position type identifier is assigned as in the following expression.

chroma_sample_loc_type_idx==0:Type2 chroma_sample_loc_type_idx==1:Type3 chroma_sample_loc_type_idx==2:Type0 chroma_sample_loc_type_idx==3:Type1

Note that the chroma sample position type identifier (chroma_sample_loc_type_idx) is transmitted as (stored in) information regarding a pixel position of a chroma component (chroma sample_loc_info( )).

The chroma MPM identifier (chroma_mpm_idx) is an identifier indicating which prediction mode candidate in a chroma intra-prediction mode candidate list (intraPredModeCandListC) is specified as a chroma intra-prediction mode.

The motion prediction information MVinfo includes, for example, information such as merge_idx, merge_flag, inter_pred_idc, ref_idx_LX, mvp_lX_flag, X={0, 1}, and mvd (e.g., see JCTVC-W1005, 7.3.8.6 Prediction Unit Syntax).

Needless to say, the information included in the prediction mode information Pinfo is arbitrary, and information other than these pieces of information may be included.

<Transform Information Tinfo>

The transform information Tinfo includes, for example, the following information. Needless to say, the information included in the transform information Tinfo is arbitrary, and information other than these pieces of information may be included.

Lateral width size (TBWSize) and vertical width size (TBHSize) of transform block to be processed
    Transform skip flag (transform_skip_flag (also referred to as ts_flag))
    Scan Identifier (scanIdx)
    Quantization parameter (qp)
    Quantization matrix (scaling_matrix (e.g., JCTVC-W1005, 7.3.4 Scaling list data syntax))

Note that log 2TBWSize and log 2TBHSize may be included in the transform information Tinfo instead of TBWSize and TBHSize. log 2TBWSize is a logarithmic value of TBWSize with base 2. log 2TBHSize is the logarithmic value of TBHSize with base 2. Furthermore, in the image decoding device 400, the transform skip flag is a flag indicating whether or not to skip inverse coefficient transform (inverse primary transform and inverse secondary transform).

<Filter Information Finfo>

The filter information Finfo includes, for example, control information regarding each filter processing described below.

Control information regarding the deblocking filter (DBF)
    Control information regarding pixel adaptive offset (SAO)
    Control information regarding adaptive loop filter (ALF)
    Control information on other linear and nonlinear filters More specifically, for example, information for specifying a picture to which each filter is applied and a region in the picture, filter on/off control information in units of CUs, filter on/off control information regarding a boundary of slices or tiles, or the like is included. Needless to say, the information included in the filter information Finfo is arbitrary, and information other than these pieces of information may be included.

The description returns to the description of the decoding unit 412. The decoding unit 412 derives the quantization coefficient level with reference to syntax related to the quantization coefficient level obtained by decoding the bitstream. The decoding unit 412 supplies the quantization coefficient level to the inverse quantization unit 413.

Furthermore, the decoding unit 412 supplies encoding parameters such as the parsed header information Hinfo, prediction mode information Pinfo, transform information Tinfo, filter information Finfo, and the like to each block. For example, the decoding unit 412 supplies the header information Hinfo to the inverse quantization unit 413, the inverse orthogonal transform unit 414, the prediction unit 419, and the in-loop filter unit 416. Furthermore, the decoding unit 412 supplies the prediction mode information Pinfo to the inverse quantization unit 413 and the prediction unit 419. Also, the decoding unit 412 supplies the transform information Tinfo to the inverse quantization unit 413 and the inverse orthogonal transform unit 414. Furthermore, the decoding unit 412 supplies the filter information Finfo to the in-loop filter unit 416.

Needless to say, the above example is an example, and the present invention is not limited to this example. For example, each encoding parameter may be supplied to an arbitrary processing unit. Furthermore, other information may be supplied to an arbitrary processing unit.

<Inverse Quantization Unit>

The inverse quantization unit 413 has at least a configuration necessary for performing processing related to inverse quantization. For example, the inverse quantization unit 413 uses the transform information Tinfo and the quantization coefficient level supplied from the decoding unit 412 as inputs, scales (inversely quantizes) the value of the quantization coefficient level on the basis of the transform information Tinfo, and derives the transform coefficient Coeff_IQ after inverse quantization. The inverse quantization unit 413 supplies the derived transform coefficient Coeff_IQ to the inverse orthogonal transform unit 414.

Note that this inverse quantization is performed as the inverse processing of the quantization by the quantization unit 314 of the image encoding device 300. Furthermore, this inverse quantization is processing similar to the inverse quantization by the inverse quantization unit 317 of the image encoding device 300. That is, the inverse quantization unit 317 of the image encoding device 300 performs processing (inverse quantization) similar to the inverse quantization unit 413.

<Inverse Orthogonal Transform Unit>

The inverse orthogonal transform unit 414 performs processing related to inverse orthogonal transform. For example, the inverse orthogonal transform unit 414 uses the transform coefficient Coeff IQ supplied from the inverse quantization unit 413 and the transform information Tinfo supplied from the decoding unit 412 as inputs, performs inverse orthogonal transform processing on the transform coefficient Coeff_IQ on the basis of the transform information Tinfo, and derives the prediction residual D'. For example, the inverse orthogonal transform unit 414 performs inverse secondary transform on the transform coefficient Coeff_IQ on the basis of an ST identifier to generate a primary transform coefficient, and performs primary transform on the primary transform coefficient to generate the prediction residual D'. The inverse orthogonal transform unit 414 supplies the derived prediction residual D' to the calculation unit 415.

Note that this inverse orthogonal transform is performed as the inverse processing of the orthogonal transform by the orthogonal transform unit 313 of the image encoding device 300. Furthermore, this inverse orthogonal transform is processing similar to the inverse orthogonal transform by the inverse orthogonal transform unit 318 of the image encoding device 300. That is, the inverse orthogonal transform unit 318 of the image encoding device 300 performs processing (inverse orthogonal transform) similar to the inverse orthogonal transform unit 414.

Therefore, similarly to the inverse orthogonal transform unit 318 of the image encoding device 300, the inverse orthogonal transform unit 414 can perform an arbitrary inverse coefficient transform, not limited to the inverse orthogonal transform. This inverse coefficient transform is the inverse processing of the coefficient transform executed by the orthogonal transform unit 313 of the image encoding device 300. That is, the prediction residual D' may be derived by performing arbitrary inverse coefficient transform on the transform coefficient Coeff_IQ. Therefore, the inverse orthogonal transform unit 414 can also be referred to as an inverse coefficient transform unit.

<Calculation Unit>

The calculation unit 415 performs processing related to addition of information regarding an image. For example, the calculation unit 415 uses the prediction residual D' supplied from the inverse orthogonal transform unit 414 and the predicted image P supplied from the prediction unit 419 as inputs. The calculation unit 415 adds the prediction residual D' and the predicted image P (prediction signal) corresponding to the prediction residual D', and derives the locally decoded image Rlocal as expressed by the following formula. The calculation unit 415 supplies the derived locally decoded image Rlocal to the in-loop filter unit 416 and the frame memory 418.

$$Rlocal = D' + P$$

<In-Loop Filter Unit>

The in-loop filter unit 416 performs processing related to in-loop filter processing. For example, the in-loop filter unit 416 uses the locally decoded image Rlocal supplied from the calculation unit 415 and the filter information Finfo supplied from the decoding unit 412 as inputs. Note that the information to be input to the in-loop filter unit 416 is arbitrary, and information other than these pieces of information may be input.

The in-loop filter unit 416 appropriately performs filter processing on the locally decoded image Rlocal on the basis of the filter information Finfo.

For example, as described in Non-Patent Document 11, the in-loop filter unit 416 can apply four in-loop filters of a bilateral filter, a deblocking filter (DBF), an adaptive offset filter (sample adaptive offset (SAO)), and an adaptive loop filter (ALF) in this order. Note that which filters are applied in which order is arbitrary, and can be selected as appropriate.

The in-loop filter unit 416 performs filter processing corresponding to the filter processing performed by the encoding side (e.g., the in-loop filter unit 320 of the image encoding device 300). Needless to say, the filter processing performed by the in-loop filter unit 416 is arbitrary and is not limited to the above example. For example, the in-loop filter unit 416 may apply a wiener filter, or the like.

The in-loop filter unit 416 supplies the locally decoded image Rlocal subjected to the filter processing to the rearrangement buffer 417 and the frame memory 418.

<Rearrangement Buffer>

The rearrangement buffer 417 uses the locally decoded image Rlocal supplied from the in-loop filter unit 416 as an input, and holds (stores) the locally decoded image Rlocal. The rearrangement buffer 417 reconstructs the decoded image R in each picture unit using the locally decoded image Rlocal, and holds (stores in the buffer) the decoded image R. The rearrangement buffer 417 rearranges the obtained decoded images R from the order of decoding to the order of reproduction. The rearrangement buffer 417 outputs a group of the rearranged decoded images R to the outside of the image decoding device 400 as moving image data.

<Frame Memory>

The frame memory 418 performs processing related to storage of data related to an image. For example, the frame memory 418 uses the locally decoded image Rlocal supplied from the calculation unit 415 as an input, reconstructs the decoded image R in each picture unit, and stores the decoded image R in the buffer in the frame memory 418.

Furthermore, the frame memory 418 uses the locally decoded image Rlocal subjected to the in-loop filter processing and supplied from the in-loop filter unit 416 as an input, reconstructs the decoded image R in each picture unit, and stores the decoded image R in the buffer in the frame memory 418. The frame memory 418 appropriately supplies the stored decoded image R (or a part thereof) to the prediction unit 419 as a reference image.

Note that the frame memory 418 may store the header information Hinfo, the prediction mode information Pinfo, the transform information Tinfo, the filter information Finfo, and the like related to the generation of the decoded image.

<Prediction Unit>

The prediction unit 419 performs processing related to generation of a predicted image. For example, the prediction unit 419 uses the prediction mode information Pinfo supplied from the decoding unit 412 as an input, performs prediction by a prediction method specified by the prediction mode information Pinfo, and derives the predicted image P. During the derivation, the prediction unit 419 uses the decoded image R (or a part thereof) before filtering or after filtering stored in the frame memory 418, specified by the prediction mode information Pinfo, as a reference image. The prediction unit 419 supplies the derived predicted image P to the calculation unit 415.

Note that these processing units (accumulation buffer 411 to prediction unit 419) have an arbitrary configuration. For example, each processing unit may be configured by a logic circuit that implements the above-described processing. Furthermore, each processing unit may have, for example, a CPU, a ROM, a RAM, and the like, and execute a program by using the CPU, the ROM, the RAM, and the like to achieve the above-described processing. Needless to say, each processing unit may have both the configurations, and a part of the above-described processing may be achieved by the logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Decoding Unit>

Figure 27:
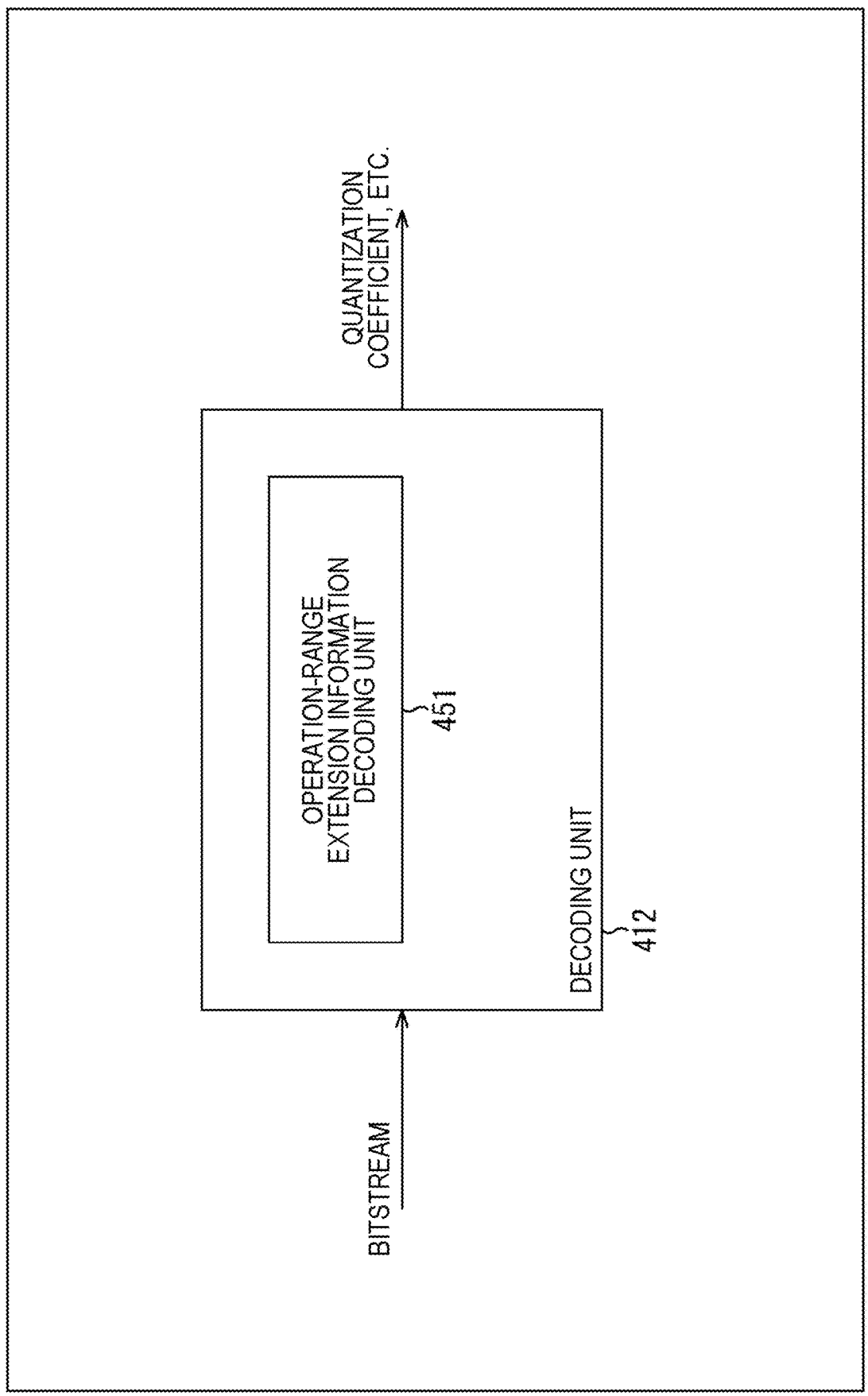
FIG. 27 is a block diagram illustrating an example of a main configuration of a decoding unit.

FIG. 27 is a block diagram illustrating an example of the main configuration of the decoding unit 412. As illustrated in FIG. 27, the decoding unit 412 includes an operation-range extension information decoding unit 451. The operation-range extension information decoding unit 451 executes processing related to the decoding of the encoded data of the operation-range extension information. For example, the operation-range extension information decoding unit 451 may acquire the operation-range extension information extracted from the bitstream by the decoding unit 412. Furthermore, the operation-range extension information decoding unit 451 may acquire the parameter (Bit-Depth) indicating the bit depth of the image extracted from the bitstream by the decoding unit 412. The operation-range extension information decoding unit 451 may perform processing related to the decoding of the encoded data of the operation-range extension information by using these pieces of information.

Furthermore, the operation-range extension information decoding unit 451 may appropriately output the operation-range extension information and the like as a processing result. The operation-range extension information or an internal variable corresponding thereto is supplied to an arbitrary processing unit of the image decoding device 400 as an encoding parameter and used. For example, the operation-range extension information (or internal variable) may be supplied to the decoding unit 412 and used for decoding or the like. Furthermore, the operation-range extension information (or internal variable) may be supplied to the inverse orthogonal transform unit 414 and used for inverse orthogonal transform or the like.

In the decoding unit 412 having the above configuration, each of the above-described methods (Method 1-1, Method 2-1, or Method 3) of the present technology may be applied.

For example, the operation-range extension information decoding unit 451 may have a configuration similar to that of the operation-range extension information decoding device 200 illustrated in FIG. 12 and execute the operation-range extension information decoding processing illustrated in FIG. 13. In this manner, the image decoding device 400 can obtain the effect described above in <3. Control of operation-range extension flag> (the effect in the case of applying Method 1-1). That is, the image decoding device 400 can prevent the decoding of an invalid bitstream. As a result, the image decoding device 400 can decode the bitstream more safely (prevent the occurrence of failure, etc.).

Furthermore, for example, the operation-range extension information decoding unit 451 may have a configuration similar to that of the operation-range extension information decoding device 200 illustrated in FIG. 12 and execute the operation-range extension information decoding processing illustrated in FIG. 18. In this manner, the image decoding device 400 can obtain the effect described above in <4. Control of value of operation-range extension tool control information> (the effect in the case of applying Method 2-1). That is, the image decoding device 400 can prevent the decoding of an invalid bitstream. As a result, the image decoding device 400 can decode the bitstream more safely (prevent the occurrence of failure, etc.).

Furthermore, for example, the operation-range extension information decoding unit 451 may have a configuration similar to that of the operation-range extension information decoding device 200 illustrated in FIG. 21 and execute the operation-range extension information decoding processing illustrated in FIG. 22. In this manner, the image decoding device 400 can obtain the effect described above in <5. Transmission control of operation-range extension tool control information> (the effect in the case of applying Method 3). That is, the image decoding device 400 can correctly decode the bitstream generated by the image encoding device 300. That is, the image decoding device 400 can use the encoding tool for bit-depth extension while maintaining compatibility with the specification that does not extend a bit depth of an image. In addition, an increase in the code amount can be reduced.

<Flow of Image Decoding Processing>

Figure 28:
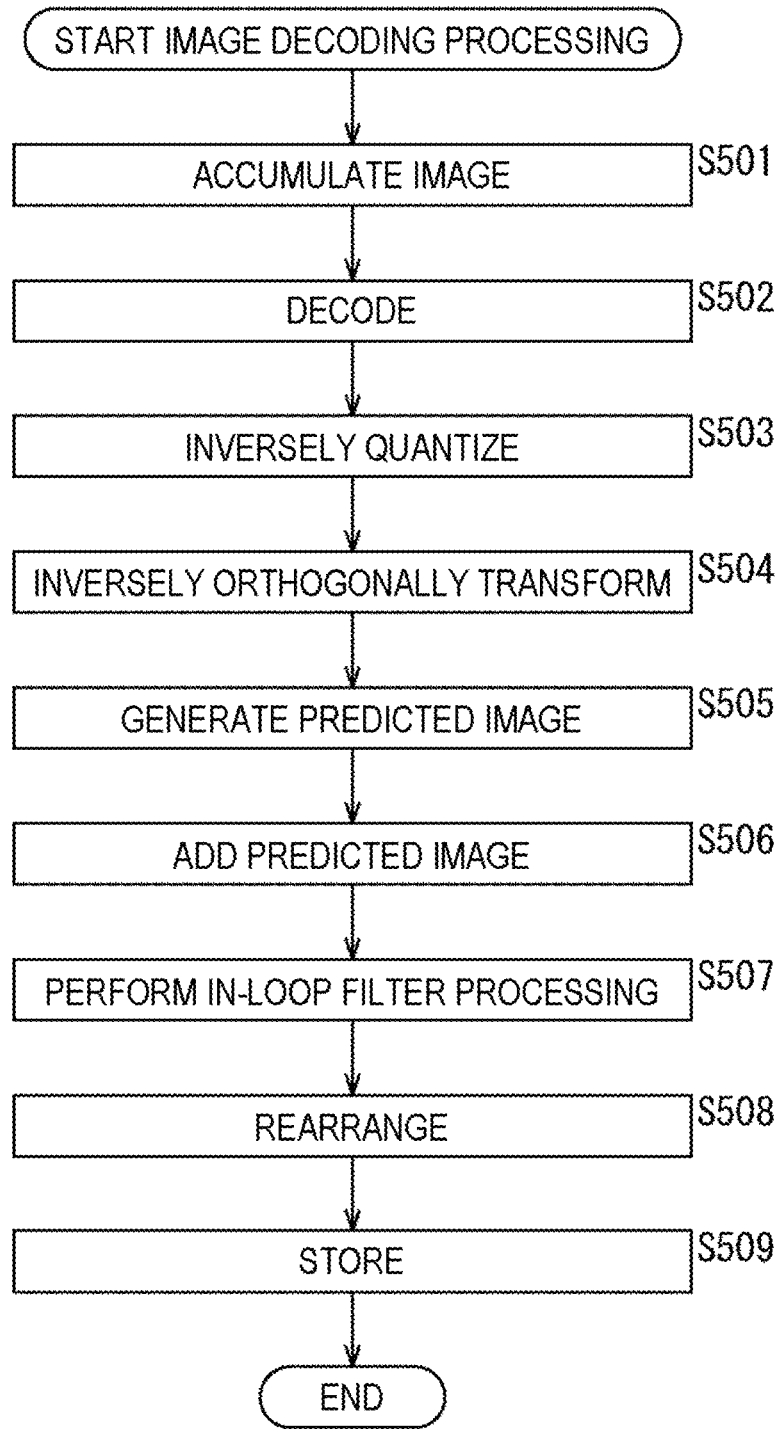
FIG. 28 is a flowchart illustrating an example of a flow of image decoding processing.

Next, an example of a flow of image decoding processing executed by the image decoding device 400 having such a configuration will be described with reference to a flowchart of FIG. 28.

When the image decoding processing is started, in step S501, the accumulation buffer 411 acquires and holds (accumulates) a bitstream (coded data) supplied from outside of the image decoding device 400.

In step S502, the decoding unit 412 executes decoding processing to decode the encoded data (bitstream) to obtain the quantization coefficient level. Furthermore, by perform this decoding, the decoding unit 412 parses (analyzes and acquires) various encoding parameters from the encoded data (bitstream).

In step S503, the inverse quantization unit 413 performs inverse quantization, which is the inverse processing of the quantization performed on the encoding side, on the quantization coefficient level obtained by the processing in step S502 to obtain the transform coefficient Coeff_IQ.

In step S504, the inverse orthogonal transform unit 414 performs an inverse orthogonal transform processing, which is the inverse processing of the orthogonal transform processing performed on the encoding side, on the transform coefficient Coeff IQ obtained in step S503 to obtain the prediction residual D'.

In step S505, the prediction unit 419 executes prediction processing by a prediction method designated by the encoding side on the basis of the information parsed in step S502, and generates the predicted image P with reference to the reference image stored in the frame memory 418 or the like.

In step S506, the calculation unit 415 adds the prediction residual D' obtained in step S504 and the predicted image P obtained in step S505, and derives the locally decoded image Rlocal.

In step S507, the in-loop filter unit 416 performs in-loop filter processing on the locally decoded image Rlocal obtained by the processing in step S506.

In step S508, the rearrangement buffer 417 derives the decoded image R using the locally decoded image Rlocal subjected to the filter processing, obtained by the processing in step S507, and rearranges the order of the group of the decoded images R from the order of decoding to the order of reproduction. The group of the decoded images R rearranged in the order of reproduction is output as a moving image to the outside of the image decoding device 400.

Furthermore, in step S509, the frame memory 418 stores at least one of the locally decoded image Rlocal obtained by the processing in step S506 or the locally decoded image Rlocal after the filter processing obtained by the processing in step S507.

When the processing of step S509 ends, the image decoding processing ends.

In step S502 of such an image decoding processing, each of the above-described methods (Method 1-1, Method 2-1, or Method 3) of the present technology may be applied.

For example, in step S502, (the operation-range extension information decoding unit 451 of) the decoding unit 412 may execute the operation-range extension information decoding processing illustrated in FIG. 13 to decode the encoded data of the operation-range extension information (encoding parameter). In this manner, the image decoding device 400 can obtain the effect described above in <3. Control of operation-range extension flag>(the effect in the case of applying Method 1-1). That is, the image decoding device 400 can prevent the decoding of an invalid bitstream. As a result, the image decoding device 400 can decode the bitstream more safely (prevent the occurrence of failure, etc.).

Furthermore, for example, in step S502, (the operation-range extension information decoding unit 451 of) the decoding unit 412 may execute the operation-range extension information decoding processing illustrated in FIG. 18. In this manner, the image decoding device 400 can obtain the effect described above in <4. Control of value of operation-range extension tool control information> (the effect in the case of applying Method 2-1). That is, the image decoding device 400 can prevent the decoding of an invalid bitstream. As a result, the image decoding device 400 can decode the bitstream more safely (prevent the occurrence of failure, etc.).

Furthermore, for example, in step S502, (the operation-range extension information decoding unit 451 of) the decoding unit 412 may execute the operation-range extension information decoding processing illustrated in FIG. 22. In this manner, the image decoding device 400 can obtain the effect described above in <5. Transmission control of operation-range extension tool control information> (the effect in the case of applying Method 3). That is, the image decoding device 400 can correctly decode the bitstream generated by the image encoding device 300. That is, the image decoding device 400 can use the encoding tool for bit-depth extension while maintaining compatibility with the specification that does not extend a bit depth of an image. In addition, an increase in the code amount can be reduced.

8. Appendix

<Bit Depth>

In the above description, BitDepth is used as the information indicating the bit depth of the image, but the information for obtaining the bit depth of the image is arbitrary and is not limited to this example. For example, sps_bitdepth_minus8, which is a parameter indicating "Bit depth −8", may be used. This parameter is stored in the sequence parameter set. By applying this parameter (sps_bitdepth_minus8), the above-described determination of "BitDepth<=10" can be expressed as "sps_bitdepth_minus8<=2". Furthermore, the above-described determination of "BitDepth>10" can be expressed as "sps_bitdepth_minus8>2".

<Storage Location>

Furthermore, in the above description, the operation-range extension information (operation-range extension flag, operation-range extension tool control information, etc.) is stored in the sequence parameter set. However, the storage location of the operation-range extension information is arbitrary and is not limited to this example. The operation-range extension information may be stored in, for example, a picture parameter set (PPS) or a slice header (slice header).

<Computer>

The above-described series of processes can be executed by hardware or software. In a case where the series of processes is executed by software, a program constituting the software is installed in a computer. Here, the computer includes a computer incorporated in dedicated hardware, a general-purpose personal computer capable of executing various functions by installing various programs, and the like, for example.

FIG. 29 is a block diagram illustrating a configuration example of hardware of a computer that executes the above-described series of processes by a program.

In a computer 900 illustrated in FIG. 29, a central processing unit (CPU) 901, a read-only memory (ROM) 902, and a random-access memory (RAN) 903 are interconnected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes a network interface, for example. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processes is performed. Furthermore, the RAM 903 also appropriately stores data and the like necessary for the CPU 901 to execute various processes.

The program executed by the computer can be applied by being recorded on, for example, the removable medium 921 as a package medium or the like. In this case, the program can be installed in the storage unit 913 via the input/output interface 910 by attaching the removable medium 921 to the drive 915.

Furthermore, this program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Applicable Target of the Present Technology>

The present technology can be applied to any image encoding system or decoding system. That is, the specifications of various processes related to the image encoding and decoding, such as transform (inverse transform), quantization (inverse quantization), encoding (decoding), and prediction are arbitrary as long as they do not contradict the present technology described above, and are not limited to the above-described examples. Furthermore, some of these processes may be omitted unless there is a contradiction with the present technology described above.

Furthermore, the present technology can be applied to a multi-view image encoding system that encodes a multi-view image including images of a plurality of viewpoints (views). Also, the present technology can be applied to a multi-view image decoding system that decodes encoded data of a multi-view image including images of a plurality of viewpoints (views). In that case, the present technology is only required to be applied to encoding and decoding of each viewpoint (view). is only required to Moreover, the present technology can be applied to a hierarchical image encoding (scalable encoding) system that encodes a hierarchical image layered (hierarchized) so as to have a scalability function for a predetermined parameter. Furthermore, the present technology can be applied to a hierarchical image decoding (scalable decoding) system that decodes encoded data of a hierarchical image layered (hierarchized) so as to have a scalability function for a predetermined parameter. In that case, the present technology is only required to be applied to encoding and decoding of each layer (layer).

Furthermore, the present technology can be applied to any configuration. For example, the present technology can be applied to various electronic devices such as a transmitter and a receiver (e.g., a television receiver and a mobile phone) in satellite broadcasting, cable broadcasting such as cable TV, distribution on the Internet, and distribution to a terminal by cellular communication, or a device (e.g., a hard disk recorder and a camera) that records an image on a medium such as an optical disk, a magnetic disk, and a flash memory, or reproduces an image from the storage medium.

Furthermore, for example, the present technology can also be implemented as a partial configuration of a device, such as a processor (e.g., a video processor) as a system large-scale integration (LSI) or the like, a module (e.g., a video module) using a plurality of processors or the like, a unit (e.g., a video unit) using a plurality of modules or the like, or a set (e.g., a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audiovisual (AV) device, a portable information processing terminal, or an Internet of Things (IoT) device.

Note that, in the present specification, a system means a set of a plurality of components (devices, modules (parts), etc.), and it does not matter whether or not all the components are in the same housing. Therefore, a plurality of devices housed in separate housings and connected via a network, and one device in which a plurality of modules is housed in one housing are all systems.

<Field and Application to which the Present Technology is Applicable>

The system, device, processing unit and the like to which the present technology is applied may be used in arbitrary fields such as traffic, medical care, crime prevention, agriculture, livestock industry, mining, beauty care, factory, household appliance, weather, and natural surveillance, for example. Furthermore, any application thereof may be used.

For example, the present technology can be applied to systems and devices used for providing content for appreciation and the like. Also, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife, and the like. Moreover, for example, the present technology can also be applied to systems and devices used for sports.

<Others>

Note that, in this specification, the "flag" is information for identifying a plurality of states, and includes not only information used for identifying two states of true (1) and false (0) but also information capable of identifying three or more states. Therefore, the value that may be taken by the "flag" may be, for example, a binary of 1/0 or a ternary or more. That is, the number of bits forming this "flag" is arbitrary, and may be one bit or a plurality of bits. Furthermore, identification information (including the flag) is assumed to include not only identification information thereof in a bitstream but also difference information of the identification information with respect to a certain reference information in the bitstream, and thus, in the present description, the "flag" and "identification information" include not only the information thereof but also the difference information with respect to the reference information.

Furthermore, various information (such as metadata) related to encoded data (bitstream) may be transmitted or recorded in any form as long as it is associated with the encoded data. Here, the term "associate" means, for example, that one piece of data can be used (linked) when the other piece of data is processed. That is, the data associated with each other may be collected as one piece of data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that the "association" may be for a part of information instead of the entire information. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", "insert", and the like mean, for example, to combine a plurality of objects into one, such as to combine encoded data and metadata into one piece of data, and mean one method of "associating" described above.

Furthermore, the embodiments of the present technology are not limited to the above-described embodiments, and various modifications are possible without departing from the scope of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configurations may be added to the configuration of each device (or each processing unit). Moreover, when the configuration and operation of the entire system are substantially the same, a part of the configuration of a certain device (or processing unit) may be included in the configuration of another device (or another processing unit).

Furthermore, for example, the above-described program may be executed in any device. In this case, the device is only required to have a necessary function (functional block, etc.) and obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can also be executed as processes of a plurality of steps. Conversely, the processes described as a plurality of steps can be collectively executed as one step.

Furthermore, the program executed by the computer may have the following features. For example, the processes of the steps describing the program may be executed in time series in the order described in the present specification. In addition, the processes of the steps describing the program may be executed in parallel. Moreover, the processes of the steps describing the program may be individually executed at the necessary timing, such as when the program is called. That is, the respective processes of the steps may be executed in an order different from the above-described order as long as there is no contradiction. In addition, processes of steps describing this program may be executed in parallel with processes of another program. Moreover, the processes of the steps describing this program may be executed in combination with the processes of another program.

Furthermore, for example, a plurality of techniques related to the present technology can be implemented independently as a single body as long as there is no contradiction. Needless to say, any two or more of the present technologies can also be used and implemented in combination. For example, a part or all of the present technologies described in any of the embodiments can be implemented in combination with a part or all of the present technologies described in other embodiments. Furthermore, a part or all of any of the present technologies described above can be implemented using together with another technology that is not described above.

Note that the present technology may also have the following configurations.

(1) An image processing device including:
an operation-range extension flag encoding unit that encodes an operation-range extension flag in accordance with a bit depth of an image; and
an operation-range extension tool control information encoding unit that encodes operation-range extension tool control information in accordance with the operation-range extension flag,
in which
the operation-range extension flag is flag information regarding extension of an operation range of the image, and
the operation-range extension tool control information is control information of an operation-range extension tool used in a case where the operation range is extended.

(2) The image processing device according to (1), in which
the operation-range extension flag encoding unit sets the operation-range extension flag to false and encodes the operation-range extension flag in a case where the bit depth is not extended, and
the operation-range extension flag encoding unit encodes the operation-range extension flag in a case where the bit depth is extended.

(3) The image processing device according to (2), in which
the operation-range extension flag encoding unit sets the operation-range extension flag to false and encodes the operation-range extension flag in a case where the bit depth is 10 bits or less, and
the operation-range extension flag encoding unit encodes the operation-range extension flag in a case where the bit depth is greater than 10 bits.

(4) The image processing device according to (2) or (3), in which
the operation-range extension tool control information encoding unit skips encoding the operation-range extension tool control information in a case where the operation-range extension flag is false.

(5) The image processing device according to (4), in which
the operation-range extension tool control information encoding unit sets the operation-range extension tool control information to a value indicating the unavailability of the operation-range extension tool.

(6) The image processing device according to (4) or (5), in which
the operation-range extension tool control information encoding unit encodes the operation-range extension tool control information in a case where the operation-range extension flag is true.

(7) The image processing device according to any one of (1) to (6), in which
the operation-range extension tool control information includes a control flag related to extension of internal calculation precision of orthogonal transform.

(8) The image processing device according to (7), in which
the operation-range extension tool control information encoding unit sets an internal variable related to extension of internal calculation precision of the orthogonal transform to a value of the control flag.

(9) The image processing device according to any one of (1) to (8), in which
the operation-range extension tool control information includes a control flag related to extension of a Rice parameter of transform skip residual coding (TSRC).

(10) The image processing device according to any one of (1) to (9), in which
the operation-range extension tool control information includes a control flag related to extension of a Rice parameter of regular residual coding (RRC).

(11) An image processing method including:
encoding an operation-range extension flag in accordance with a bit depth of an image; and
encoding operation-range extension tool control information in accordance with the operation-range extension flag,
in which
the operation-range extension flag is flag information regarding extension of an operation range of the image, and the operation-range extension tool control information is control information of an operation-range extension tool used in a case where the operation range is extended.

(21) An image processing device including:
an operation-range extension flag encoding unit that encodes an operation-range extension flag; and
an operation-range extension tool control information encoding unit that encodes operation-range extension tool control information in accordance with a bit depth of an image,
in which
the operation-range extension flag is flag information regarding extension of an operation range of the image, and
the operation-range extension tool control information is control information of an operation-range extension tool used in a case where the operation range is extended.

(22) The image processing device according to (21), in which
the operation-range extension tool control information encoding unit sets the operation-range extension tool control information to a value indicating unavailability of the operation-range extension tool and encodes the operation-range extension tool control information in a case where the operation-range extension flag is true and the bit depth is not extended, and
the operation-range extension tool control information encoding unit encodes the operation-range extension tool control information in a case where the operation-range extension flag is true and the bit depth is extended.

(23) The image processing device according to (22), in which
the operation-range extension tool control information encoding unit sets the operation-range extension tool control information to a value indicating unavailability of the operation-range extension tool and encodes the operation-range extension tool control information in a case where the operation-range extension flag is true and the bit depth is 10 bits or less, and
the operation-range extension tool control information encoding unit encodes the operation-range extension tool control information in a case where the operation-range extension flag is true and the bit depth is greater than 10 bits.

(24) The image processing device according to (22) or (23), in which
the operation-range extension tool control information encoding unit skips encoding the operation-range extension tool control information in a case where the operation-range extension flag is false.

(25) The image processing device according to (24), in which
the operation-range extension tool control information encoding unit sets the operation-range extension tool control information to a value indicating unavailability of the operation-range extension tool.

(26) The image processing device according to any one of (21) to (25), in which
the operation-range extension tool control information includes a control flag related to extension of internal calculation precision of orthogonal transform.

(27) The image processing device according to (26), in which
the operation-range extension tool control information encoding unit sets an internal variable related to extension of internal calculation precision of the orthogonal transform to a value of the control flag.

(28) The image processing device according to any one of (21) to (27), in which
the operation-range extension tool control information includes a control flag related to extension of a Rice parameter of transform skip residual coding (TSRC).

(29) The image processing device according to any one of (21) to (28), in which
the operation-range extension tool control information includes a control flag related to extension of a Rice parameter of regular residual coding (RRC).

(30) An image processing method including:
encoding an operation-range extension flag; and
encoding operation-range extension tool control information in accordance with a bit depth of an image,
in which
the operation-range extension flag is flag information regarding extension of an operation range of the image, and
the operation-range extension tool control information is control information of an operation-range extension tool used in a case where the operation range is extended.

(41) An image processing device including:
an operation-range extension flag decoding unit that decodes encoded data of an operation-range extension flag;
an operation-range extension tool control information decoding unit that decodes encoded data of operation-range extension tool control information in accordance with the operation-range extension flag; and
a checking unit that checks whether there is a constraint violation in a bitstream of an image,
in which
the operation-range extension flag is flag information regarding extension of an operation range of the image, and
the operation-range extension tool control information is control information of an operation-range extension tool used in a case where the operation range is extended.

(42) The image processing device according to (41), in which
the checking unit checks whether there is a constraint violation in the bitstream in a case where the operation-range extension flag is true.

(43) The image processing device according to (42), in which
the checking unit checks whether a bit depth of the image has been extended in the bitstream.

(44) The image processing device according to (43), in which
the checking unit checks whether the bit depth is greater than 10 bits in the bitstream.

(45) The image processing device according to any one of (42) to (44), in which
the operation-range extension tool control information decoding unit decodes the encoded data of the operation-range extension tool control information in a case where there is no constraint violation in the bitstream.

(46) The image processing device according to any one of (42) to (45), in which
the checking unit provides notification that the bitstream does not satisfy the constraint in a case where there is a constraint violation in the bitstream.
(47) The image processing device according to any one of (41) to (46), in which
in a case where the operation-range extension flag is true,
the operation-range extension tool control information decoding unit decodes the encoded data of the operation-range extension tool control information, and
the checking unit checks whether there is a constraint violation in the bitstream by using the operation-range extension tool control information.
(48) The image processing device according to (47), in which
the checking unit checks whether the bit depth of the image has not been extended in the bitstream and whether the operation-range extension tool control information is not a value indicating the unavailability of the operation-range extension tool.
(49) The image processing device according to (48), in which
the checking unit checks whether the bit depth is 10 bits or less in the bitstream and whether the operation-range extension tool control information is not a value indicating the unavailability of the operation-range extension tool.
(50) The image processing device according to any one of (47) to (49), in which
the checking unit provides notification that the bitstream does not satisfy the constraint in a case where there is a constraint violation in the bitstream.
(51) The image processing device according to any one of (41) to (50) in which
in a case where the operation-range extension flag is false,
the operation-range extension tool control information decoding unit skips decoding the encoded data of the operation-range extension tool control information and set the operation-range extension tool control information to a value indicating the unavailability of the operation-range extension tool.
(52) The image processing device according to any one of (41) to (51), in which
the operation-range extension tool control information includes a control flag related to extension of internal calculation precision of orthogonal transform.
(53) The image processing device according to (52), in which
the operation-range extension tool control information decoding unit sets an internal variable related to extension of internal calculation precision of the orthogonal transform to a value of the control flag.
(54) The image processing device according to any one of (41) to (53), in which
the operation-range extension tool control information includes a control flag related to extension of a Rice parameter of transform skip residual coding (TSRC).
(55) The image processing device according to any one of (41) to (54), in which
the operation-range extension tool control information includes a control flag related to extension of a Rice parameter of regular residual coding (RRC).
(56) An image processing method including:
decoding encoded data of an operation-range extension flag;
decoding encoded data of operation-range extension tool control information in accordance with the operation-range extension flag; and
checking whether there is a constraint violation in a bitstream of an image.
in which
the operation-range extension flag is flag information regarding extension of an operation range of the image, and
the operation-range extension tool control information is control information of an operation-range extension tool used in a case where the operation range is extended.
(61) An image processing device including:
an operation-range extension flag encoding unit that encodes an operation-range extension flag and
an operation-range extension tool control information encoding unit that encodes operation-range extension tool control information in accordance with the operation-range extension flag and a bit depth of an image,
in which
the operation-range extension flag is flag information regarding extension of an operation range of the image, and
the operation-range extension tool control information is control information of an operation-range extension tool used in a case where the operation range is extended.
(62) The image processing device according to (61), in which
the operation-range extension tool control information encoding unit skips encoding the operation-range extension tool control information flag in a case where the operation-range extension flag is false or the bit depth is not extended, and
the operation-range extension tool control information encoding unit encodes the operation-range extension tool control information in a case where the operation-range extension flag is true and the bit depth is extended.
(63) The image processing device according to (62), in which
the operation-range extension tool control information encoding unit skips encoding the operation-range extension tool control information in a case where the operation-range extension flag is false or the bit depth is 10 bits or less, and
the operation-range extension tool control information encoding unit encodes the operation-range extension tool control information in a case where the operation-range extension flag is true and the bit depth is greater than 10 bits.
(64) The image processing device according to (62) or (63), in which
the operation-range extension tool control information encoding unit further sets the operation-range extension tool control information to a value indicating the unavailability of the operation-range extension tool in a case where the operation-range extension flag is false or the bit depth of the image is not extended.
(65) The image processing device according to (64), in which
the operation-range extension tool control information encoding unit further sets the operation-range extension tool control information to a value indicating the unavailability of the operation-range extension tool in a case where the operation-range extension flag is false or the bit depth is 10 bits or less.

(66) The image processing device according to any one of (61) to (65), in which
the operation-range extension tool control information includes a control flag related to extension of internal calculation precision of orthogonal transform.

(67) The image processing device according to (66), in which
the operation-range extension tool control information encoding unit sets an internal variable related to extension of internal calculation precision of the orthogonal transform to a value of the control flag.

(68) The image processing device according to any one of (61) to (67), in which
the operation-range extension tool control information includes a control flag related to extension of a Rice parameter of transform skip residual coding (TSRC).

(69) The image processing device according to any one of (61) to (68), in which
the operation-range extension tool control information includes a control flag related to extension of a Rice parameter of regular residual coding (RRC).

(70) An image processing method including:
encoding an operation-range extension flag; and
encoding operation-range extension tool control information in accordance with the operation-range extension flag and a bit depth of an image,
in which
the operation-range extension flag is flag information regarding extension of an operation range of the image, and
the operation-range extension tool control information is control information of an operation-range extension tool used in a case where the operation range is extended.

(81) An image processing device including:
an operation-range extension flag decoding unit that decodes encoded data of an operation-range extension flag; and
an operation-range extension tool control information decoding unit that decodes encoded data of operation-range extension tool control information in accordance with the operation-range extension flag and a bit depth of an image,
in which
the operation-range extension flag is flag information regarding extension of an operation range of the image, and
the operation-range extension tool control information is control information of an operation-range extension tool used in a case where the operation range is extended.

(82) The image processing device according to (81), in which
the operation-range extension tool control information decoding unit skips decoding the operation-range extension tool control information flag in a case where the operation-range extension flag is false or the bit depth is not extended, and
the operation-range extension tool control information decoding unit decodes the encoded data of the operation-range extension tool control information in a case where the operation-range extension flag is true and the bit depth is extended.

(83) The image processing device according to (82), in which
the operation-range extension tool control information decoding unit skips decoding the operation-range extension tool control information flag and sets the operation-range extension tool control information to a value indicating unavailability of the operation-range extension tool in a case where the operation-range extension flag is false or the bit depth is 10 bits or less, and
the operation-range extension tool control information decoding unit decodes the encoded data of the operation-range extension tool control information in a case where the operation-range extension flag is true and the bit depth is greater than 10 bits.

(84) The image processing device according to any one of (81) to (83), in which
the operation-range extension tool control information includes a control flag related to extension of internal calculation precision of orthogonal transform.

(85) The image processing device according to (84), in which
the operation-range extension tool control information decoding unit sets an internal variable related to extension of internal calculation precision of the orthogonal transform to a value of the control flag.

(86) The image processing device according to any one of (81) to (85), in which
the operation-range extension tool control information includes a control flag related to extension of a Rice parameter of transform skip residual coding (TSRC).

(87) The image processing device according to any one of (81) to (86), in which
the operation-range extension tool control information includes a control flag related to extension of a Rice parameter of regular residual coding (RRC).

(88) An image processing method including:
decoding encoded data of an operation-range extension flag; and
decoding encoded data of operation-range extension tool control information in accordance with the operation-range extension flag and a bit depth of an image,
in which
the operation-range extension flag is flag information regarding extension of an operation range of the image, and
the operation-range extension tool control information is control information of an operation-range extension tool used in a case where the operation range is extended.

REFERENCE SIGNS LIST

100 Operation-range extension information encoding DEVICE
111 Operation-range extension flag encoding unit
112 Operation-range extension tool control information encoding unit
200 Operation-range extension information decoding device
211 Operation-range extension flag decoding unit
212 Operation-range extension tool control information decoding unit
213 Constraint violation processing unit
300 Image encoding device
315 Encoding unit
351 Operation-range extension information encoding unit
400 Image decoding device
412 Decoding unit 451 Operation-range extension information decoding unit
900 Computer

The invention claimed is:

1. An image processing device comprising:
circuitry configured to
set an operation-range extension flag to false and encode the operation-range extension flag in a case where a bit depth of an image is 10 bits or less,
encode the operation-range extension flag in a case where the bit depth is greater than 10 bits; and
encode operation-range extension tool control information in accordance with the operation-range extension flag,
wherein
the operation-range extension flag is flag information regarding extension of an operation range of the image,
the operation-range extension tool control information is control information of an operation-range extension tool used in a case where the operation range is extended,
the operation-range extension tool control information includes a control flag related to extension of internal calculation precision of an orthogonal transform, and
the circuitry is configured to set an internal variable related to extension of internal calculation precision of the orthogonal transform to a value of the control flag.

2. The image processing device according to claim 1, wherein
the circuitry is configured to skip encoding the operation-range extension tool control information in a case where the operation-range extension flag is false.

3. The image processing device according to claim 2, wherein
the circuitry is configured to set the operation-range extension tool control information to a value indicating unavailability of the operation-range extension tool.

4. The image processing device according to claim 1, wherein
the operation-range extension tool control information includes a control flag related to extension of a Rice parameter of transform skip residual coding (TSRC).

5. The image processing device according to claim 1, wherein
the operation-range extension tool control information includes a control flag related to extension of a Rice parameter of regular residual coding (RRC).

6. The image processing device according to claim 1, wherein the operation-range extension flag is an sps_range_extension_flag and the circuitry sets the operation-range extension flag to false by setting a value of the sps_range_extension_flag to 0.

7. The image processing device according to claim 1, wherein the control flag is extended_precision_processing_flag and the internal variable is ExtendedPrecisionFlag,
a value of 1 for the extended_precision_processing_flag indicates that extended dynamic range can be used for transform coefficients and transform, and
a value of 0 for the extended_precision_processing_flag indicates that the extended dynamic range cannot be used for transform coefficients and transform.

8. The image processing device according to claim 6, wherein the control flag is extended_precision_processing_flag and the internal variable is ExtendedPrecisionFlag,
a value of 1 for the extended_precision_processing_flag indicates that extended dynamic range can be used for transform coefficients and transform, and
a value of 0 for the extended_precision_processing_flag indicates that the extended dynamic range cannot be used for transform coefficients and transform.

9. An image processing method comprising:
setting an operation-range extension flag to false and encoding the operation-range extension flag in a case where a bit depth of an image is 10 bits or less;
encoding the operation-range extension flag in a case where the bit depth is greater than 10 bits; and
encoding operation-range extension tool control information in accordance with the operation-range extension flag,
wherein
the operation-range extension flag is flag information regarding extension of an operation range of the image,
the operation-range extension tool control information is control information of an operation-range extension tool used in a case where the operation range is extended,
the operation-range extension tool control information includes a control flag related to extension of internal calculation precision of an orthogonal transform, and
the method further comprises setting an internal variable related to extension of internal calculation precision of the orthogonal transform to a value of the control flag.

10. An image processing device including:
circuitry configured to
decode encoded data of an operation-range extension flag;
decode encoded data of operation-range extension tool control information in accordance with the operation-range extension flag; and
check whether there is a constraint violation in a bitstream of an image in a case where the operation-range extension flag is true, wherein there is a constraint violation if the bit depth is 10 bits or less in the bitstream,
wherein
the operation-range extension flag is flag information regarding extension of an operation range of the image, and
the operation-range extension tool control information is control information of an operation-range extension tool used in a case where the operation range is extended,
the operation-range extension tool control information includes a control flag related to extension of internal calculation precision of orthogonal transform, and
the circuitry is configured to set an internal variable related to extension of internal calculation precision of the orthogonal transform to a value of the control flag.

11. The image processing device according to claim 10, wherein
the circuitry is configured to decode the encoded data of the operation-range extension tool control information in a case where there is no constraint violation in the bitstream.

12. The image processing device according to claim 10, wherein
the circuitry is configured to provide notification that the bitstream does not satisfy the constraint in a case where there is a constraint violation in the bitstream.

13. The image processing device according to claim 11, wherein
the circuitry is configured to provide notification that the bitstream does not satisfy the constraint in a case where there is a constraint violation in the bitstream.

14. The image processing device according to claim 10, wherein in a case where the operation-range extension flag is true, the circuitry is configured to decode the encoded data of the operation-range extension tool control information, and the circuitry is configured to check whether there is a constraint violation in the bitstream by using the operation-range extension tool control information.

15. The image processing device according to claim 14, wherein the circuitry is configured to check whether the bit depth of the image has not been extended in the bitstream and whether the operation-range extension tool control information is not a value indicating the unavailability of the operation-range extension tool.

16. The image processing device according to claim 15, wherein the circuitry is configured to check whether the bit depth is 10 bits or less in the bitstream and whether the operation-range extension tool control information is not a value indicating the unavailability of the operation-range extension tool.

17. An image processing method including:

decoding encoded data of an operation-range extension flag;

decoding encoded data of operation-range extension tool control information in accordance with the operation-range extension flag; and checking whether there is a constraint violation in a bitstream of an image in a case where the operation-range extension flag is true, wherein there is a constraint violation if the bit depth is 10 bits or less in the bitstream, wherein the operation-range extension flag is flag information regarding extension of an operation range of the image, and the operation-range extension tool control information is control information of an operation-range extension tool used in a case where the operation range is extended, the operation-range extension tool control information includes a control flag related to extension of internal calculation precision of orthogonal transform, and the method further comprises setting an internal variable related to extension of internal calculation precision of the orthogonal transform to a value of the control flag.

* * * * *